(12) United States Patent
Mihara et al.

(10) Patent No.: US 8,203,799 B2
(45) Date of Patent: Jun. 19, 2012

(54) LENS COMPONENT, IMAGE FORMING OPTICAL SYSTEM, AND ELECTRONIC IMAGE PICKUP APPARATUS USING THE SAME

(75) Inventors: Shinichi Mihara, Tama (JP); Hisashi Goto, Tokyo (JP); Masaki Arakawa, Hachioji (JP); Toyoki Kon, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 93 days.

(21) Appl. No.: 12/925,753

(22) Filed: Oct. 28, 2010

(65) Prior Publication Data

US 2011/0102660 A1    May 5, 2011

(30) Foreign Application Priority Data

Oct. 29, 2009  (JP) ................................ 2009-249064

(51) Int. Cl.
*G02B 9/00* (2006.01)
(52) U.S. Cl. ........ 359/796; 359/793; 359/795; 359/676; 359/683; 359/692; 359/717; 359/740; 348/335
(58) Field of Classification Search .................. 359/793, 359/795, 796, 676, 683–692, 713–717, 740; 348/335
See application file for complete search history.

(56) References Cited

U.S. PATENT DOCUMENTS

| | | | | | |
|---|---|---|---|---|---|
| 4,690,512 | A | * | 9/1987 | Forsyth | 359/796 |
| 5,504,628 | A | * | 4/1996 | Borchard | 359/796 |
| 5,657,168 | A | * | 8/1997 | Maruyama et al. | 359/719 |
| 6,710,932 | B2 | * | 3/2004 | Kitaoka et al. | 359/686 |
| 6,816,322 | B2 | * | 11/2004 | Abe et al. | 359/796 |
| 2003/0107824 | A1 | * | 6/2003 | Takeuchi | 359/796 |
| 2007/0091472 | A1 | * | 4/2007 | Alkemper et al. | 359/796 |

FOREIGN PATENT DOCUMENTS

| | | |
|---|---|---|
| JP | 06-273670 | 9/1994 |
| JP | 2005-128194 | 5/2005 |
| JP | 2008-310133 | 12/2008 |

* cited by examiner

*Primary Examiner* — Evelyn A. Lester
(74) *Attorney, Agent, or Firm* — Kenyon & Kenyon LLP

(57) ABSTRACT

A lens component of the present invention is made by cementing a lens LA and a lens LB having a refracting power smaller than a refracting power of the lens LA, and satisfies predetermined conditional expressions. Moreover, in an image forming optical system of the present invention which includes a lens group B having a negative refracting power, a lens group C having a positive refracting power and which moves only toward an object side at the time of zooming from a wide angle end to a telephoto end, and one or two more lens groups additionally, one of the lens components of the present invention is used in the lens group B.

23 Claims, 43 Drawing Sheets

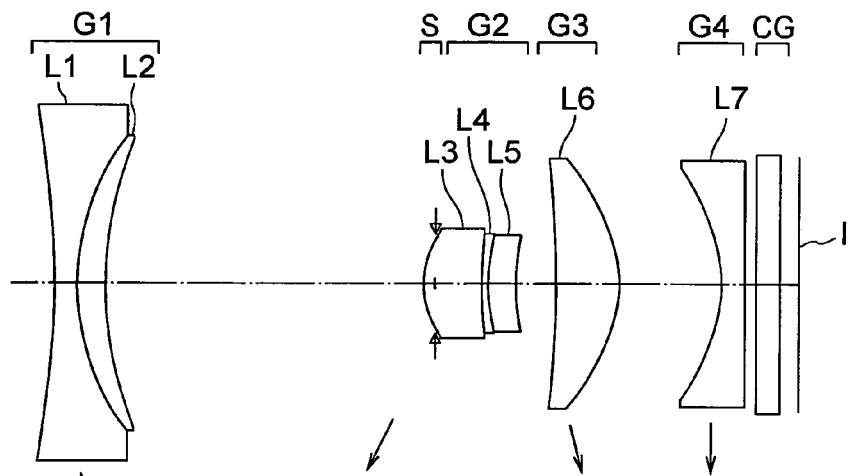
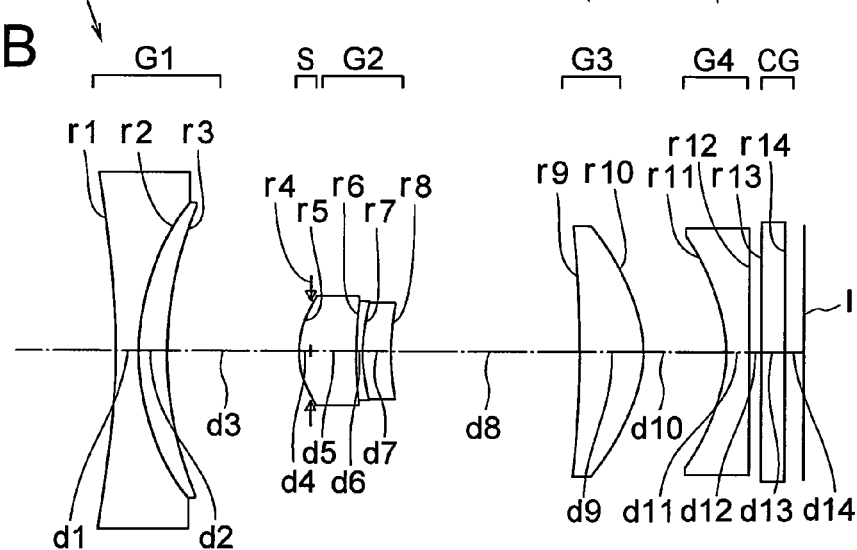
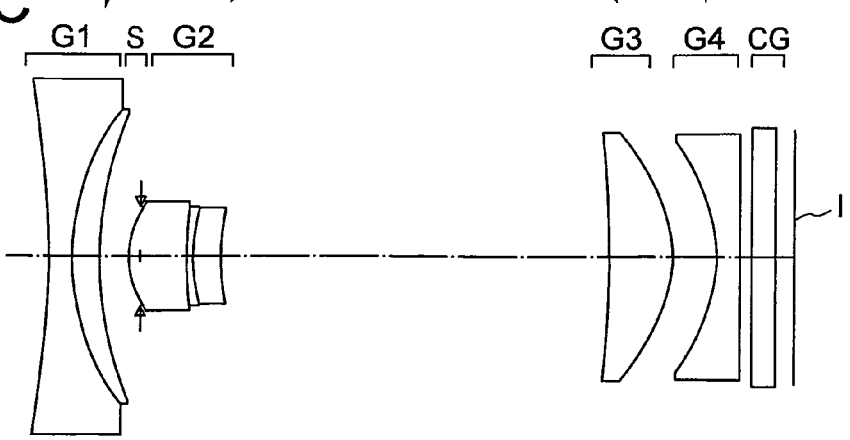

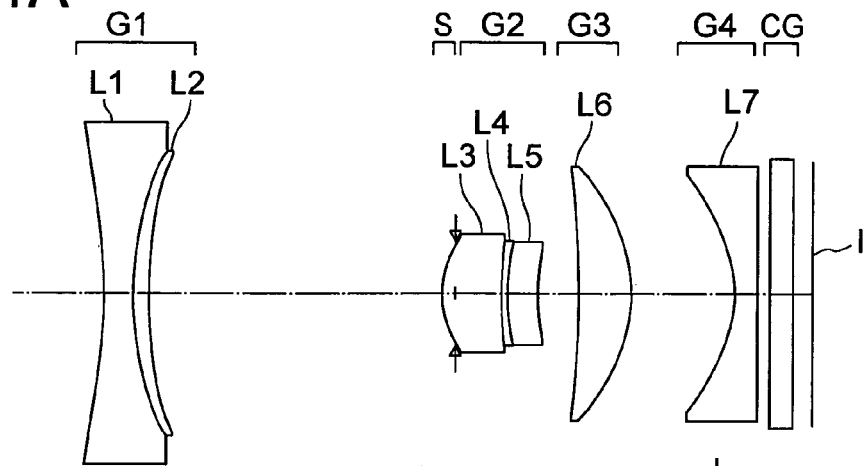
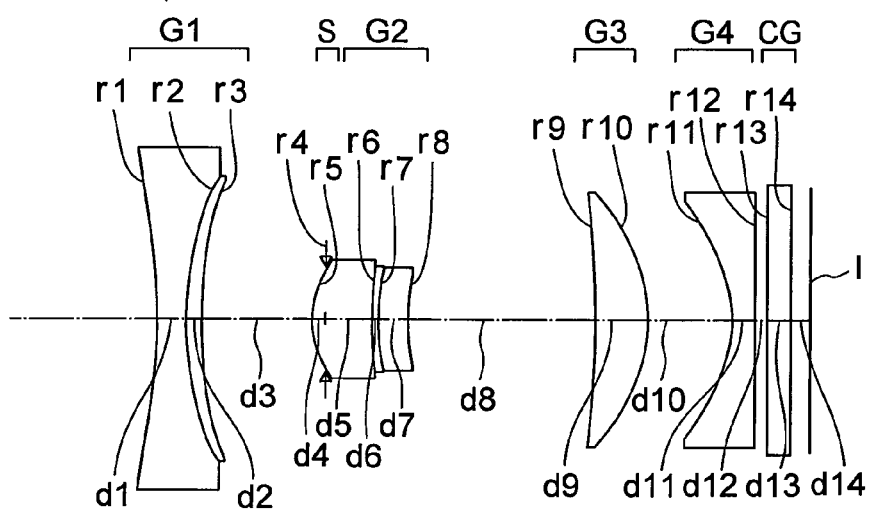
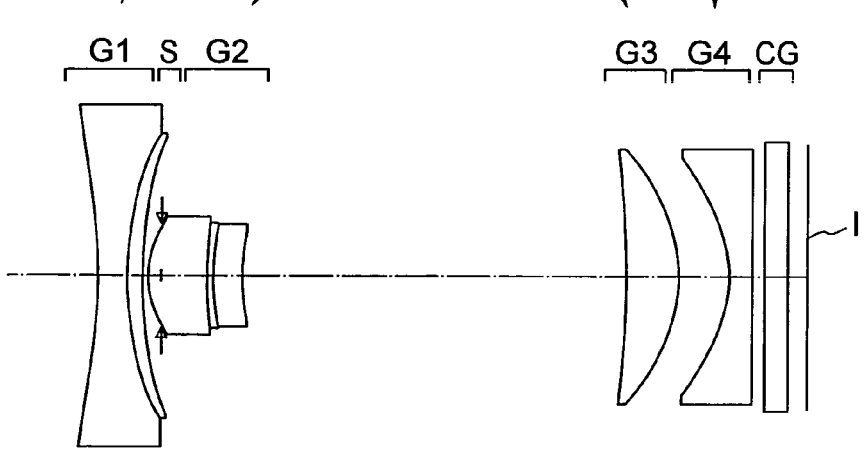

LENS COMPONENT, IMAGE FORMING OPTICAL SYSTEM, AND ELECTRONIC IMAGE PICKUP APPARATUS USING THE SAME

CROSS-REFERENCE TO RELATED APPLICATION

The present application is based upon and claims the benefit of priority from the prior Japanese Patent Application No. 2009-249064 filed on Oct. 29, 2009; the entire contents of which are incorporated herein by reference.

BACKGROUND OF THE INVENTION

1. Field of the Invention

The present invention relates to a lens component which is to be incorporated particularly in an optical system, and an image forming optical system using the lens component, and to an electronic image pickup apparatus such as a video camera and a digital camera having this image forming optical system.

2. Description of the Related Art

With the degree of maturation of the market of electronic image pickup apparatuses such as digital still cameras and video cameras, balancing of functional specifications has strongly been sought to even higher level. Here, the functional specifications are small size, slimness, light weight, low cost, and high image quality etc. From among the functional specifications, for the light weight, using an organic optical material having a low specific gravity in designing of an optical system has been taken into consideration, and has been used in some of the products.

However, since the organic optical materials have a problem of design constraints such as (i) the change in properties with respect to the temperature change is substantial as compared to that of glass, (ii) low refractive index, and (iii) when combined with glass, a difference in coefficient of expansion with that of glass is substantial, it has not yet been introduced proactively.

In most of the cases in which an organic optical material is used in an image forming optical system, the organic optical material is introduced in the last lens unit. This is because the last lens unit is a lens unit having a small effect paraxially or on aberration. There are also examples in which an organic optical material has been introduced proactively while taking into consideration properties of organic optical material as in embodiments described in Japanese Patent Application Laid-open Publication Nos. Hei 6-273670, 2005-128194, and 2008-310133.

SUMMARY OF THE INVENTION

A lens component according to a first aspect of the present invention is a cemented lens which includes a lens LA and a lens LB, and an absolute value of a refracting power of the lens LB is smaller than an absolute value of a refracting power of the lens LA, and the lens component satisfies the following conditional expressions (1) and (3).

$$0.01 \leq 1/\nu 2 - 1/\nu 1 \leq 0.06 \quad (1)$$

$$0.5 \times \nu 2/\nu 1 < Tv2/Tv1 < 10 \times \nu 2/\nu 1 \quad (3)$$

where,

ν1 denotes Abbe's number (nd1−1)/(nF1−nC1) of the lens LA,

ν2 denotes Abbe's number (nd2−1)/(nF2−nC2) of the lens LB, nd1, nC1, nF1, and ng1 denote refractive indices of the lens LA for a d-line, a C-line, an F-line, and a g-line respectively, nd2, nC2, nF2, and ng2 denote refractive indices of the lens LB for the d-line, the c-line, the F-line, and the g-line respectively, Tv1 denotes a reciprocal of a temperature dispersion of the lens LA, Tv2 is a reciprocal of a temperature dispersion of the lens LB, and a reciprocal Tvd of the temperature dispersion is expressed by the following expression $$Tvd=(nd20-1)/(nd00-nd40)$$

where, nd00 is a refractive index of the d-line of a lens medium at 0° C., nd20 is a refractive index of the d-line of the lens medium at 20° C., and nd40 is a refractive index of the d-line of the lens medium at 40° C.

Moreover, an image forming optical system according to a second aspect of the present invention includes in order from an object side, a lens group B having a negative refracting power, a lens group C having a positive refracting power, and one or two more lens groups additionally, and the lens group C moves only toward the object side at the time of zooming from a wide angle end to a telephoto end, and one of the lens components described above is used in the lens group B.

Moreover, an electronic image pickup apparatus according to a third aspect of the present invention includes one of the image forming optical systems described above, and an electronic image pickup element which picks up an image which has been formed through the image forming optical system.

An electronic image pickup apparatus according to a fourth aspect of the present invention includes an image forming optical system, an image pickup element, and an image processing means which outputs data as image data in which, a shape of the image has been changed by processing image data obtained by picking up an image by the electronic image pickup element, which has been formed through the image forming optical system, and zoom lens system satisfies the following conditional expression (A) at the time of infinite object point focusing.

$$0.7 < y_{07}/(fw \cdot \tan \omega_{07w}) < 0.97 \quad (A)$$

where, $y_{07}$ is expressed as $y_{07}=0.7 \cdot y_{10}$ when a distance (maximum image height) from a center up to the farthest point in an effective image pickup surface (a surface capable of picking up an image) of the electronic image pickup element is let to be $y_{10}$, $\omega_{07w}$ denotes an angle with an optical axis in a direction of an object point corresponding to an image point connecting to a position of $y_{07}$ from a center on the image pickup surface at the wide angle end, and fw denotes a focal length of the overall image forming optical system at the wide angle end.

BRIEF DESCRIPTION OF THE DRAWINGS

FIG. 1A shows a state at a wide angle end, FIG. 1B shows an intermediate state, and FIG. 1C shows a state at a telephoto end;

FIG. 2A shows a state at the wide angle end, FIG. 2B shows an intermediate state, and FIG. 2C shows a state at the telephoto end;

FIG. 3A shows a state at a wide angle end, FIG. 3B shows an intermediate state, and FIG. 3C shows a state at a telephoto end;

FIG. 4A shows a state at the wide angle end, FIG. 4B shows an intermediate state, and FIG. 4C shows a state at the telephoto end;

FIG. 5A shows a state at a wide angle end, FIG. 5B shows an intermediate state, and FIG. 5C shows a state at a telephoto end;

FIG. 6A shows a state at the wide angle end, FIG. 6B shows an intermediate state, and FIG. 6C shows a state at the telephoto end;

FIG. 7A shows a state at a wide angle end, FIG. 7B shows an intermediate state, and FIG. 7C shows a state at a telephoto end;

FIG. 8A shows a state at the wide angle end, FIG. 8B shows an intermediate state, and FIG. 8C shows a state at the telephoto end;

FIG. 9A, FIG. 9B, and FIG. 9C are cross-sectional views along an optical axis showing an optical arrangement at the time of infinite object point focusing of a zoom lens according to a fifth embodiment of the present invention, where, FIG. 9A shows a state at a wide angle end, FIG. 9B shows an intermediate state, and FIG. 9C shows a state at a telephoto end;

FIG. 10A shows a state at the wide angle end, FIG. 10B shows an intermediate state, and FIG. 10C shows a state at the telephoto end;

FIG. 11A, FIG. 11B, and FIG. 11C are cross-sectional views along an optical axis showing an optical arrangement at the time of infinite object point focusing of a zoom lens according to a sixth embodiment of the present invention, where, FIG. 11A shows a state at a wide angle end, FIG. 11B shows an intermediate state, and FIG. 11C shows a state at a telephoto end;

FIG. 12A shows a state at the wide angle end; FIG. 12B shows an intermediate state, and FIG. 12C shows a state at the telephoto end;

FIG. 13A shows a state at a wide angle end, FIG. 13B shows an intermediate state, and FIG. 13C shows a state at a telephoto end;

FIG. 14A shows a state at the wide angle end, FIG. 14B shows an intermediate state, and FIG. 14C shows a state at the telephoto end;

FIG. 15A shows a state at a wide angle end, FIG. 15B shows an intermediate state, and FIG. 15C shows a state at the telephoto end;

FIG. 16A shows a state at the wide angle end, FIG. 16B shows an intermediate state, and FIG. 16C shows a state at the telephoto end;

FIG. 17A shows a state at a wide angle end, FIG. 17B shows an intermediate state, and FIG. 17C shows a state at a telephoto end;

FIG. 18A shows a state at the wide angle end, FIG. 18B shows an intermediate state, and FIG. 18C shows a state at the telephoto end;

FIG. 19A shows a state at a wide angle end, FIG. 19B shows an intermediate state, and FIG. 19C shows a state at a telephoto end;

FIG. 20A shows a state at the wide angle end, FIG. 20B shows an intermediate state, and FIG. 20C shows a state at the telephoto end;

FIG. 21A shows a state at a wide angle end, FIG. 21B shows an intermediate state, and FIG. 21C shows a state at a telephoto end;

FIG. 22A shows a state at the wide angle end, FIG. 22B shows an intermediate state, and FIG. 22C shows a state at the telephoto end;

FIG. 23A shows a state at a wide angle end, FIG. 23B shows an intermediate state, and FIG. 23C shows a state at a telephoto end;

FIG. 24A shows a state at the wide angle end, FIG. 24B shows an intermediate state, and FIG. 24C shows a state at the telephoto end;

FIG. 25A shows a state at a wide angle end, FIG. 25B shows an intermediate state, and FIG. 25C shows a state at a telephoto end;

FIG. 26A shows a state at the wide angle end, FIG. 26B shows an intermediate state, and FIG. 26C shows a state at the telephoto end;

FIG. 27A shows a state at a wide angle end, FIG. 27B shows an intermediate state, and FIG. 27C shows a state at a telephoto end;

FIG. 28A shows a state at the wide angle end, FIG. 28B shows an intermediate state, and FIG. 28C shows a state at the telephoto end;

FIG. 29A shows a state at a wide angle end, FIG. 29B shows an intermediate state, and FIG. 29C shows a state at a telephoto end;

FIG. 30A shows a state at the wide angle end, FIG. 30B shows an intermediate state, and FIG. 30C shows a state at the telephoto end;

FIG. 31A shows a state at a wide angle end, FIG. 31B shows an intermediate state, and FIG. 31C shows a state at a telephoto end;

FIG. 32A shows a state at the wide angle end, FIG. 32B shows an intermediate state, and FIG. 32C shows a state at the telephoto end;

FIG. 33A shows a state at a wide angle end, FIG. 33B shows an intermediate state, and FIG. 33C shows a state at a telephoto end;

FIG. 34A shows a state at the wide angle end, FIG. 34B shows an intermediate state, and FIG. 34C shows a state at the telephoto end;

FIG. 35A shows a state at a wide angle end, FIG. 35B shows an intermediate state, and FIG. 35C shows a state at a telephoto end;

FIG. 36A shows a state at the wide angle end, FIG. 36B, shows an intermediate state, and FIG. 36C shows a state at the telephoto end;

FIG. 43A is a front view of a mobile telephone, FIG. 43B is a side view of the mobile telephone 400, and FIG. 43C is a cross-sectional view of a photographic optical system 405.

DETAILED DESCRIPTION OF THE PREFERRED EMBODIMENTS

Figure 1A:
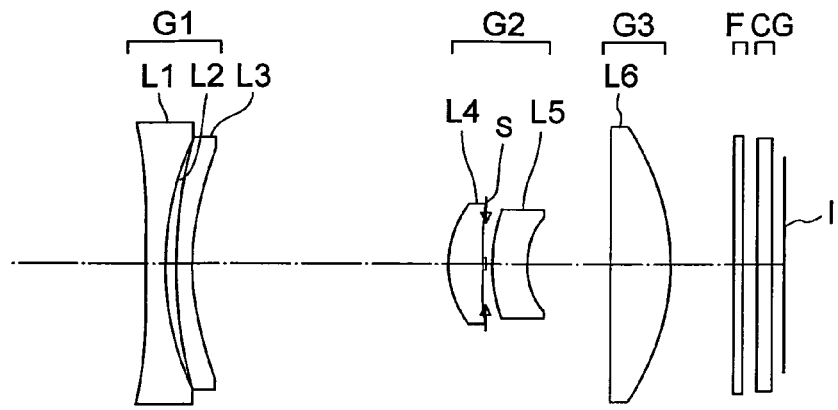
FIG. 1A, FIG. 1B, and FIG. 1C are cross-sectional views along an optical axis showing an optical arrangement at the time of infinite object point focusing of a zoom lens according to a first embodiment of the present invention, where.

Prior to description of embodiments, an action and an effect of an image forming optical system will be described below. In the following description, a lens having a positive value of a paraxial focal length is let to be a positive lens and a lens having a negative value of a paraxial focal length is let to be a negative lens.

A lens component according to the embodiments is a cemented lens which includes a lens LA and a lens LB, and an absolute value of a refracting power of the lens LB is smaller than an absolute value of a refracting power of the lens LA, and the lens component satisfies the following conditional expressions (1) and (3).

$$0.01 \leq 1/v2 - 1/v1 \leq 0.06 \quad (1)$$

$$0.5 \times v2/v1 < Tv2/Tv1 < 10 \times v2/v1 \quad (3)$$

where, $v1$ denotes Abbe's number $(nd1-1)/(nF1-nC1)$ of the lens LA, $v2$ denotes Abbe's number $(nd2-1)/(nF2-nC2)$ of the lens LB, $nd1, nC1, nF1$, and $ng1$ denote refractive indices of the lens LA for a d-line, a C-line, an F-line, and a g-line respectively, $nd2, nC2, nF2$, and $ng2$ denote refractive indices of the lens LB for the d-line, the c-line, the F-line, and the g-line respectively, $Tv1$ denotes a reciprocal of a temperature dispersion of the lens LA, $Tv2$ is a reciprocal of a temperature dispersion of the lens LB, and a reciprocal $Tvd$ of the temperature dispersion is expressed by the following expression $$Tvd = (nd20-1)/(nd00-nd40)$$

where, $nd00$ is a refractive index of the d-line of a lens medium at $0°$ C., $nd20$ is a refractive index of the d-line of the lens medium at $20°$ C., and $nd40$ is a refractive index of the d-line of the lens medium at $40°$ C.

Conditional expression (1) is a condition necessary for correction of a chromatic aberration, and when a lower limit value of the conditional expression (1) is surpassed, insufficient correction of the chromatic aberration is susceptible to occur when the lens component is introduced in an optical system. Whereas, when an upper limit value of the conditional expression (1) is surpassed, there is no problem whatsoever from a view point of correction of the chromatic aberration. However, a material of the lens may not exist in nature.

The lens LA and the lens LB are cemented with an object of correction of the chromatic aberration in particular. However, when a material of any one of the lens LA and the lens LB is an organic optical material, an image point movement due to a temperature cannot be neglected. Consequently, it is better to cancel the image point movement due to a change in temperature such that both cancel the chromatic aberration. For this, it is ideal to satisfy the following relational expression (3a).

$$v2/v1 = Tv2/Tv1 \quad (3a)$$

However, canceling of the image point movement is not necessarily as strict as correction of the chromatic aberration. Therefore, even if relational expression (3a) is not satisfied, and conditional expression (3) is satisfied, it is possible to have canceling of the image point movement and correction of the chromatic aberration. However, when an upper limit of conditional expression (3) is surpassed, or when a lower limit of conditional expression (3) is surpassed, the image point movement becomes excessively substantial when the lens component is introduced in the optical system. In this case, for adjustment of focus, large space for movement of the lens is necessary. In this manner, when conditional expression (3) is not satisfied, it is not preferable for thinning.

When an organic optical material is used for the lens LA and the lens LB, it has been known that it is favorable to make a surface aspheric. In the embodiments, the lens LA and the lens LB are cemented to make the overall optical system thin. Moreover, targeting an effect by making the cemented surface aspheric, the effect is used for aberration correction. For instance, by allowing to differ dispersion of the lens LA and the lens LB and by letting cemented surfaces of differing dispersion to be aspheric surfaces, correction of chromatic aberration of higher order (spherical aberration of color, chromatic coma aberration, and chromatic aberration of magnification) related to an aperture and an angle of field, in addition to a chromatic aberration of first order has been made possible.

However, on the other hand, when a difference in the refractive indices is excessively substantial, other aberrations are susceptible to have an adverse effect. Therefore, in the lens component of the embodiments, it is desirable that the cemented surface of the cemented lens is an aspheric surface and satisfies the following conditional expression (5).

$$-0.05 < n2 - n1 < 0.3 \quad (5)$$

where, $n1$ denotes a refractive index of the lens LA for the d-line, and $n2$ denotes a refractive index of the lens LB for the d-line.

When an upper limit value of conditional expression (5) is surpassed, or when a lower limit value of conditional expression (5) is surpassed, it is possible to correct the chromatic aberration of magnification and a range between wavelengths of the spherical aberration and the coma aberration, but since the spherical aberration, the coma aberration, and distortion of reference wavelength are susceptible to deteriorate, it is not preferable.

Incidentally, apart from the abovementioned change in the refracting index with temperature change, a coefficient of linear expansion is one of the properties of an organic optical material. Both these properties have an effect on optical characteristics of an optical system. For making the difference in dispersion of the lens LA and the lens LB substantial, a difference in linear expansion of the lens LA and linear expansion of the lens LB becomes substantial essentially. As a result, there is an effect on optical performance of the optical system. On the other hand, when organic materials are materials having a small difference of dispersion, since the basic properties resemble, the aberration correction becomes difficult. Therefore, the lens LB is to be sandwiched by the lens LA and the lens LC, and a material having basic properties resembling with basic properties of the lens LA is to be used as a material of the lens LC. When such an arrangement is made, the effect of the difference in the coefficient of linear expansion becomes small.

Therefore, it is preferable that the lens component of the embodiments further includes the lens LC, and that the lens LA, the lens LB, and the lens LC are cemented in order of the lens LA, the lens LB, and the lens LC in the cemented lens, and the lens component satisfies the following conditional expressions (2) and (4).

$$0.01 \leq 1/v2 - 1/v13 \leq 0.06 \qquad (2)$$

$$0.5 \times v2/v13 < Tv2/Tv13 < 10 \times v2/v13 \qquad (4)$$

where, v3 denotes Abbe's number (nd3−1)/(nF3−nC3) of the lens LC, nd3, nC3, nF3, and ng3 denote refractive indices of the lens LC for the d-line, the C-line, the F-line, and the g-line respectively, v13 denotes a harmonic mean value of the Abbe's number v1 and the Abbe's number v3, Tv3 denotes a reciprocal of a temperature dispersion of the lens LC, and Tv13 denotes a harmonic mean value of the Tv1 and the Tv3.

In the lens component of the embodiments, the cemented lens includes three lenses. Here, when the lens LA and the lens LC are combined and considered as one lens, conditional expression (2) is equivalent to conditional expression (1). Moreover, conditional expression (4) is equivalent to conditional expression (3). Therefore, technical significance of conditional expression (2) and conditional expression (4) is same as technical significance of conditional expression (1) and conditional expression (3).

The harmonic mean is an inverse number of 'an arithmetic mean of 1256619064537_0' of $x_1, \ldots, x_n$. For example, Tv13 becomes Tv13=2/[(1/Tv1)+(1/Tv3)]

Moreover, in the lens component of the embodiments, it is preferable that a cemented surface of a cemented lens is an aspheric surface, and the lens component satisfies the following conditional expressions (5) and (6).

$$-0.05 < n2 - n1 < 0.3 \qquad (5)$$

$$-0.05 < n2 - n3 < 0.3 \qquad (6)$$

When an upper limit value in both the conditional expressions (5) and (6) is surpassed, or when a lower limit value in both the conditional expressions (5) and (6) is surpassed, it is possible to carry out correction of spherical aberration of color, the chromatic coma aberration, and the chromatic aberration of magnification, but at the same time, the distortion, the coma aberration, and the spherical aberration of the reference wavelength are susceptible to be deteriorated, and therefore it is not preferable.

It is preferable that the lens component satisfies the following conditional expressions (1'), (2'), (3'), (4'), (5'), and (6') instead of conditional expressions (1) to (6).

$$0.015 \leq 1/v2 - 1/v1 \leq 0.05 \qquad (1')$$

$$0.015 \leq 1/v2 - 1/v13 \leq 0.05 \qquad (2')$$

$$0.7 \times v2/v1 < Tv2/Tv1 < 7 \times v2/v1 \qquad (3')$$

$$0.7 \times v2/v13 < Tv2/Tv13 < 7 \times v2/v13 \qquad (4')$$

$$-0.02 < n2 - n1 < 0.25 \qquad (5')$$

$$-0.02 < n2 - n3 < 0.25 \qquad (6')$$

It is preferable that the lens component satisfies the following conditional expressions (1"), (2"), (3"), (4"), (5"), and (6") instead of conditional expressions (1) to (6).

$$0.02 \leq 1/v2 - 1/v1 \leq 0.04 \qquad (1")$$

$$0.02 \leq 1/v2 - 1/v13 \leq 0.04 \qquad (2")$$

$$v2/v1 < Tv2/Tv1 < 4 \times v2/v1 \qquad (3")$$

$$v2/v13 < Tv2/Tv13 < 4 \times v2/v13 \qquad (4")$$

$$-0.0 < n2 - n1 < 0.15 \qquad (5")$$

$$-0.0 < n2 - n3 < 0.15 \qquad (6")$$

When a plurality of conditional expressions is satisfied simultaneously, one of the plurality conditional expressions can be replaced. For example, when conditional expression (1) and conditional expression (3) are satisfied, conditional expression (1) may be replaced by conditional expression (1'), and an arrangement may be made such that conditional expression (1') and conditional expression (3) are satisfied.

Moreover, in the lens component of the embodiments, when a straight line indicated by $$\theta gF = \alpha gF \times v2 + \beta gF$$

is set in an orthogonal coordinate system in which, a horizontal axis is let to be vd and a vertical axis is let to be θgF, it is preferable that θgF and v2 of the lens LB are included in both areas namely, an area which is determined by a straight line when θgF and v2 of the lens LB are lower limit values of a range in the following conditional expression (7) and a straight line when θgF and v2 of the lens LB are upper limit values of the range in the following conditional expression (7), and an area which is determined by the following conditional expression (8)

$$0.7000 < \beta gF < 0.8000 \qquad (7)$$

$$3 \leq v2 \leq 27 \qquad (8)$$

where,

αgF=−0.00264, and

θgF is a partial dispersion ratio (ng2−nF2)/(nF2−nC2) of the lens LB.

When a lower limit value of conditional expression (7) is surpassed, correction of the chromatic aberration by a secondary spectrum, or in other words, correction of chromatic aberration of g-line when an achromatism is carried out by an F-line and a C-line is not sufficient. Therefore, in an image which is picked up, it becomes difficult to secure sharpness of the image. Whereas, when an upper limit value of conditional expression (7) is surpassed, there is an excessive correction of the secondary spectrum, and in an image which is picked up, it becomes difficult to secure the sharpness of the image.

Moreover, when an upper limit value of conditional expression (8) is surpassed, or when a lower limit value of conditional expression (8) is surpassed, the achromatism for the F-line and the C-line becomes difficult, and a fluctuation in the chromatic aberration at the time of zooming becomes substantial. Therefore, in the image which is picked up, it becomes difficult to secure the sharpness of the image. Particularly, when the upper limit value is surpassed, the correction of the chromatic aberration becomes even more difficult.

It is preferable that the following conditional expression (7') is satisfied instead of conditional expression (7).

$$0.7100 < \beta gF < 0.7800 \qquad (7')$$

Furthermore, it is most preferable that the following conditional expression (7") is satisfied instead of conditional expression (7).

$$0.7200 < \beta gF < 0.7600 \quad (7'')$$

Moreover, it is desirable that the following conditional expression (8') is satisfied instead of conditional expression (8).

$$10 \leq \nu 2 \leq 25.5 \quad (8')$$

Furthermore, it is most preferable that the following conditional expression (8") is satisfied instead of conditional expression (8).

$$15 \leq \nu 2 \leq 24 \quad (8'')$$

Moreover, in the lens component of the embodiments, when a straight line indicated by $$\theta hg = \alpha\, hg \times \nu 2 + \beta\, hg$$

is set in an orthogonal coordinate system in which, a horizontal axis is let to be νd and a vertical axis is let to be θhg, it is preferable that θhg and ν2 of the lens LB are included in both areas namely, an area which is determined by a straight line when θhg and ν2 of the lens LB are lower limit values of a range in the following conditional expression (9) and a straight line when θhg and ν2 of the lens LB are upper limit values of the range in the following conditional expression (9), and an area which is determined by the following conditional expression (8)

$$0.6900 < \beta hg < 0.8200 \quad (9)$$

$$3 \leq \nu 2 \leq 27 \quad (8)$$

where,

αhg=−0.00388,

θhg is a partial dispersion ratio (nh2−ng2)/(nF2−nC2) of the lens LB, and nh2 is a refractive index of the lens LB at an h-line.

When a lower limit value in conditional expression (9) is surpassed, correction of the chromatic aberration by the secondary spectrum, or in words, correction of the chromatic aberration of h-line when an achromatism is carried out by the F-line and the C-line is not sufficient any more. Therefore, in an image which is picked up, color spreading and color flare of violet (purple) in the image are susceptible to occur. Whereas, when an upper limit value of conditional expression (9) is surpassed, the correction of the chromatic aberration by the secondary spectrum when a glass material is used for a negative (concave) lens, or in other words, correction of chromatic aberration of h-line when achromatism is carried out by F-line and C-line becomes insufficient. Therefore, in the image which is picked up, the color spreading and color flare of violet are suspected to occur.

It is desirable that the following conditional expression (9') is satisfied instead of conditional expression (9).

$$0.7000 < \beta hg < 0.8000 \quad (9')$$

Furthermore, it is most preferable that the following conditional expression (9") is satisfied instead of conditional expression (9).

$$0.7100 < \beta hg < 0.7800 \quad (9'')$$

Moreover, in the lens component according to the embodiments, it is preferable to make an arrangement such that the lens LA and the lens LB have a refracting power of mutually opposite sign. When such an arrangement is made, the correction of chromatic aberration and temperature correction can be carried out favorably.

In the lens component of the embodiments, it is preferable that the lens LA and the lens LB have a refracting power of the same sign. When such an arrangement is made, the correction of chromatic aberration and temperature correction can be carried out favorably.

In the lens component of the embodiment, it is preferable that the lens LC and the lens LA have a refracting power of same sign, and satisfy the following conditional expression (10).

$$-2.0 < \log(\phi 3/\phi 1) < 0 \quad (10)$$

where,

φ1 denotes the refracting power of the lens LA, and

φ3 denotes the refracting power of the lens LC.

When an upper limit in conditional expression (10) is surpassed, although there is no loss of an effect of reducing an effect of the coefficient of linear expansion by cementing three lenses, power is concentrated in one of the lenses. In this case, a merit from a view point of aberration correction due to the increase in number of lenses cannot be used fully, and there is an increase in thickness of the overall lens component.

It is desirable that the following conditional expression (10') is satisfied instead of conditional expression (10).

$$-1.5 < \log(\phi 3/\phi 1) < 0 \quad (10')$$

Furthermore, it is most preferable that the following conditional expression (10") is satisfied instead of conditional expression (10).

$$-1.0 < \log(\phi 3/\phi 1) < 0 \quad (10'')$$

It is preferable that the lens component of the embodiments has a negative refracting power as a whole. When such an arrangement is made, it is easy to use in an image forming optical system.

An image forming optical system of the embodiments includes in order from an object side, a lens group B having a negative refracting power, a lens group C having a positive refracting power, and one or two more lens groups additionally, and the lens group C moves only to the object side at the time of zooming from the wide angle end to the telephoto end, and the abovementioned lens component is used in the first lens group B.

More favorably, it is preferable that the above-mentioned lens component is used for a lens component having a negative refracting power, among lens components in the lens group B.

In the image forming optical system of the embodiments, it is preferable that the lens group B includes only the lens component.

Moreover, in the image forming optical system of the embodiments, it is preferable that the abovementioned lens component is used for a negative lens component Bn2 which is second from the object side, of the lens group B.

In the image forming optical system of the embodiments, it is preferable to make an arrangement such that there is a lens group A which is on the object side than the lens group B.

In the image forming optical system of the embodiments, it is preferable to make an arrangement such that the lens group A has a negative lens and a reflecting optical element for folding an optical path, in order from the object side, along a direction of traveling of light.

An image forming optical system of the embodiment may be let to be an image forming optical system which includes in order from an object side, a lens group A having a positive refracting power, a lens group B having a negative refracting power, a lens group C having a positive refracting power and which moves only toward the object side at the time of zooming from a wide angle end to a telephoto end, and one or two more lens groups.

In the image forming optical system of the embodiments, it is preferable that the abovementioned lens component is used for the negative lens component Bn2 which is second from the object side, of the lens group B.

Moreover, it is preferable that the image forming optical system of the embodiments includes a negative lens component Bn1 which is first from the object side, of the lens group B, and which satisfies the following conditional expression (17).

$$1.85 < nBn1 < 2.35 \qquad (17)$$

where, nBn1 denotes a refractive index for a d-line of the negative lens component Bn1.

Moreover, it is desirable that the following conditional expression (17') is satisfied instead of conditional expression (17).

$$1.90 < nBn1 < 2.30 \qquad (17')$$

Furthermore, it is most preferable that the following conditional expression (17") is satisfied instead of conditional expression (17).

$$2.00 < nBn1 < 2.25 \qquad (17'')$$

It is preferable that the image forming optical system according to the embodiments includes a negative lens component Bn1 which is first from the object side, of the lens group B, and a positive lens component Bp which is disposed toward an image side of the negative lens component Bn2, and satisfies the following conditional expression (18).

$$-0.10 < nBn1 - nBp < 0.40 \qquad (18)$$

where, nB1 denotes a refractive index for the d-line of the negative lens component Bn1, and nBp denotes a refractive index for the d-line of the positive lens component Bp.

When an upper limit value of conditional expression (18) is surpassed, a fluctuation in the coma aberration at the time of zooming of the image forming optical system is susceptible to be substantial. Whereas, when a lower limit value of conditional expression (18) is surpassed, Petzval's sum is susceptible to take a negative value.

Moreover, it is desirable that the following conditional expression (18') is satisfied instead of conditional expression (18).

$$0.0 < nBn1 - nBp < 0.20 \qquad (18')$$

Furthermore, it is most preferable that the following conditional expression (18") is satisfied instead of conditional expression (18).

$$0.03 < nBn1 - nBp < 0.08 \qquad (18'')$$

Moreover, it is preferable that the image forming optical system of the embodiments includes a negative lens component Bn1 which is first from the object side of the lens group B, and a negative lens component Bn2, and satisfies the following conditional expression (19).

$$0.05 < \phi Bn2/\phi Bn1 < 0.80 \qquad (19)$$

where, $\phi Bn1$ denotes a refracting power of the negative lens component Bn1, and $\phi Bn2$ denotes a refracting power of the negative lens component Bn2.

When a lower limit value in conditional expression (19) is surpassed, there is an excessive load on the negative lens component Bn1. Therefore, it is not favorable for correction of the coma aberration, the astigmatism, and the distortion particularly at a wide angle side. Moreover, when an upper limit value in conditional expression (19) is surpassed, it is not favorable for small-sizing and thinning, and thereby for shortening of the overall length.

Moreover, it is desirable that the following conditional expression (19') is satisfied instead of conditional expression (19).

$$0.10 < \phi Bn2/\phi Bn1 < 0.70 \qquad (19')$$

Furthermore, it is most preferable that the following conditional expression (19") is satisfied instead of conditional expression (19).

$$0.15 < \phi Bn2/\phi Bn1 < 0.60 \qquad (19'')$$

Moreover, it is preferable that the image forming optical system of the embodiments satisfies the following conditional expression (20).

$$-0.05 < (\Delta z_1(h) - \Delta z_4(h))/(fw \cdot \tan \omega_{10w}) < 0.08 \qquad (20)$$

where, $z_1$ denotes a shape of an air-contact surface I of the lens LA, and is a shape according to conditional expression (11) when a paraxial radius of curvature R is let to be $R_1$, $\Delta z_1$ denotes an aspheric surface component of the air-contact surface I of the lens LA, and is a component according to conditional expression (12) when the paraxial radius of curvature R is let to be $R_1$, $z_4$ denotes a shape of an air-contact surface IV of the lens LC, and is a shape according to conditional expression (11) when the paraxial radius of curvature R is let to be $R_4$, $\Delta z_4$ denotes an aspheric surface component of the air-contact surface IV of the lens LC, and is a component according to conditional expression (12) when the paraxial radius of curvature R is let to be $R_4$, $\omega_{10w}$ denotes a maximum angle of field at the wide angle end, fw denotes a focal length of the overall system at the wide angle end, of the image forming optical system.

When the lens LC is not there, $z_3$ which denotes a shape of an air-contact surface III of the lens LB, $\Delta z_3$, and $R_3$ are to be used instead of $z_4$ which denotes the shape of the air-contact surface IV of the lens LC, $\Delta z_4$, and $R_4$.

When a lower limit value of conditional expression (20) is surpassed, a correction level of the coma aberration, the astigmatism, and the distortion particularly at the wide angle end is susceptible to be insufficient. Whereas, when an upper limit value of conditional expression (20) is surpassed, one of the abovementioned aberrations is susceptible to be rather deteriorated in an opposite direction.

Moreover, it is more desirable that the following conditional expression (20') is satisfied instead of conditional expression (20).

$$-0.03 < (\Delta z_1(h) - \Delta z_4(h))/(fw \cdot \tan \omega_{10w}) < 0.06 \qquad (20')$$

Furthermore, it is most desirable that the following conditional expression (20") is satisfied instead of conditional expression (20).

$$-0.01 < (\Delta z_1(h) - \Delta z_4(h))/(fw \cdot \tan \omega_{10w}) < 0.04 \qquad (20'')$$

Moreover, according to an electronic image pickup apparatus of the embodiments, it is preferable that the electronic image pickup apparatus includes the above-mentioned image forming optical system, and an electronic image pickup element which picks up an image which has been formed through the image forming optical system.

The electronic image pickup apparatus according to the embodiments includes a lens LC, and a cemented surface II is formed by the lens LA and the lens LB, and a cemented surface III is formed by the lens LB and the lens LC, and when coordinate axes are let to be such that, an optical axial direction is let to be z and a direction perpendicular to the optical axis is let to be h, R is let to be a radius of curvature on the optical axis of an aspheric surface component, k is let to be a conical constant, and A4, A6, A8, A10, . . . are let to be aspheric surface coefficients, when a shape of the aspheric surface is expressed by the following expression (11)

$$z=h^2/R[1+\{1-(1+k)h^2/R^2\}^{1/2}]+A_4h^4+A_6h^6+A_8h^8++A_{10}h^{10}+ \quad (11)$$

and when an amount of deviation is expressed by the following expression (12)

$$\Delta z=z-h^2/R[1+\{1-h^2/R^2\}^{1/2}] \quad (12)$$

it is preferable that P which is defined by the following expression (13) satisfies the following conditional expression (14).

$$-5.0e-4<P\cdot\phi<5.0e-4 \quad (14)$$

where,

P denotes a parameter related to a dispersion and the aspheric surface of the cemented surface II, and is expressed by the following expression (13)

$$P=\Delta z_2(h)\cdot\{(1/\nu 1)-(1/\nu 2)\}+\Delta z_3(h)\cdot\{(1/\nu 2)-(1/\nu 3)\} \quad (13)$$

where, $R_2$ denotes a paraxial radius of curvature of the cemented surface II, $R_3$ denotes a paraxial radius of curvature of the cemented surface III, $z_2$ denotes a shape of the cemented surface II, and is according to expression (11), $\Delta z_2$ denotes an aspheric surface component of the cemented surface II, and is a component according to expression (12), $z_3$ denotes a shape of the cemented surface III, and is according to expression (11), and $\Delta z_3$ denotes an aspheric surface component of the cemented surface III, and is a component according to expression (12), and when $1/\nu 3$ is let to be 0 ($1/\nu 3=0$) when the lens LC is not there, $$h=m\cdot a$$

where, $\phi$ is a refracting power of the lens component, m=1 only when the lens group A is on the object side of the lens group B, m=1.4 when has a prism for folding an optical path to the lens group A, and m=2.5 in rest of the cases, and the lens group A is a lens group having a focal length shorter than a focal length of the overall system at the telephoto end, and a is an amount according to the following expression (15)

$$a=(y_{10})^2\cdot\log_{10}\gamma/fw \quad (15)$$

where, $y_{10}$ denotes a distance from a center up to the farthest point in an effective image pickup surface of the electronic image pickup element which is disposed near an image forming position of the image forming optical system, fw denotes a focal length of the overall system at the wide angle end of the image forming optical system, and γ denotes a zoom ratio (a focal length of the overall system at the telephoto end/a focal length of the overall system at the wide angle end), and for letting an apex of each surface to be an origin, z(0) is 0 all the time (z(0)=0).

When a lower limit value of conditional expression (14) is surpassed, it becomes difficult to correct chromatic aberration of higher order while correcting the coma aberration, particularly at the wide angle side, or in other words, it becomes difficult to correct a high-order component (distortion of color) related to an image height of the spherical aberration of color, the chromatic aberration, and the chromatic aberration of magnification while correcting the coma aberration, particularly at the wide angle side. Whereas, when an upper limit value of conditional expression (14) is surpassed, the correction of these chromatic aberrations of higher order becomes excessive but, an aberration for wavelengths which are reference, such as d-line, is deteriorated.

It is more preferable that the following conditional expression (14') is satisfied instead of conditional expression (14).

$$-4.0e-4<P\cdot\phi<3.0e-4 \quad (14')$$

Furthermore, it is even more preferable that the following conditional expression (14") is satisfied instead of conditional expression (14).

$$-3.0e-4<P\cdot\phi<1.5e-4 \quad (14'')$$

Here, h=m·a

Moreover, it is preferable that the electronic image pickup apparatus described above includes a lens LC, and a cemented surface II is formed by the lens LA and the lens LB, and a cemented surface III is formed by the lens LB and the lens LC, and when coordinate axes are let to be such that an optical axial direction is let to be z and a direction perpendicular to the optical axis is let to be h, R is let to be a radius of curvature on the optical axis of an aspheric surface component, k is let to be a conical constant, and A4, A6, A8, A10, . . . are let to be aspheric surface coefficients, when a shape of the aspheric surface is expressed by the following expression (11)

$$z=h^2/R[1+\{1-(1+k)h^2/R^2\}^{1/2}]+A_4h^4+A_6h^6+A_8h^8++A_{10}h^{10}+ \quad (11)$$

the following conditional expression (16) is satisfied $$0.05\leq|z_2(h)-z_3(h)|/t2\leq 0.95 \quad (16)$$

where, $z_2$ denotes a shape of the cemented surface II, and is according to expression (11), $z_3$ denotes a shape of the cemented surface III or a shape of an air-contact surface of the lens LB, and is according to expression (11), $t_2$ denotes an optical axial thickness of the lens LB, and $$h=m\cdot a$$

where, m=1 only when the lens group A is on the object side of the lens group B, m=1.4 when has a prism for folding an optical path to the lens group A, and m=2.5 in rest of the cases, and the lens group A is a lens group having a focal length shorter than a focal length of the overall system at the telephoto end, and a is an amount according to the following expression (15)

$$a=(y_{10})^2\cdot\log_{10}\gamma/fw \quad (15)$$

where, $y_{10}$ denotes a distance from a center up to the farthest point in an effective image pickup surface of the electronic image pickup element which is disposed near an image forming position of the image forming optical system, fw denotes a focal length of the overall system at the wide angle end of the image forming optical system, and γ denotes a zoom ratio (a focal length of the overall system at the telephoto end/a focal length of the overall system at the wide angle end), and for letting an apex of each surface to be an origin, z(0) is let to be 0 all the time (z(0)=0).

When a lower limit value of conditional expression (16) is surpassed, the correction of the chromatic aberration is susceptible to be insufficient. When an upper limit value of conditional expression (16) is surpassed, it becomes difficult to secure edge thickness of a surrounding portion when thinning process of a positive lens is taken into consideration.

It is more desirable that the following conditional expression (16') is satisfied instead of conditional expression (16).

$$0.08 \leq |z_2(h) - z_3(h)|/t_2 \leq 0.80 \quad (16')$$

Here, h=m·a

Furthermore, it is most favorable that the following conditional expression (16") is satisfied instead of conditional expression (16).

$$0.10 \leq |z_2(h) - z_3(h)|/t_2 \leq 0.65 \quad (16'')$$

Moreover, it is desirable that an electronic image pickup apparatus of the embodiments includes an image forming optical system described above, an image pickup element, and an image processing means which outputs data as image data in which, a shape of the image has been changed by processing image data obtained by picking up an image by the electronic image pickup element which has been formed through the image forming optical system, and the image forming optical system satisfies the following conditional expression (A) at the time of infinite object point focusing $$0.7 < y_{07}/(fw \cdot \tan \omega_{07w}) < 0.97 \quad (A)$$

where, $y_{07}$ is expressed as $y_{07}=0.7 \cdot y_{10}$ when a distance (maximum image height) from a center up to the farthest point in an effective image pickup surface (a surface capable of picking up an image) of the electronic image pickup element is let to be $y_{10}$, $\omega_{07w}$ denotes an angle with an optical axis in a direction of object point corresponding to an image point connecting to a position of $y_{07}$ from a center on the image pickup surface at the wide angle end, and fw denotes a focal length of the overall image forming optical system at the wide angle end.

In the image forming optical system described above, it is possible to reduce the overall length of the optical system and thickness when collapsed. Therefore, when such image forming optical system is used in an electronic image pickup apparatus, it is possible to achieve an electronic image pickup apparatus which is thin, while obtaining a high quality image.

EMBODIMENTS

Exemplary embodiments of an image forming optical system and an electronic image pickup apparatus according to the present invention will be described below in detail by referring to the accompanying diagrams. However, the present invention is not restricted to the embodiments described below. Moreover, although there is a description of a lens shape in each embodiment, this indicates at least a paraxial shape. For instance, when a term 'meniscus lens' is used, it means that at least the paraxial shape is meniscus shape. Therefore, even when the term 'meniscus lens' is used, a lens surface which is an aspheric surface, it may be a biconcave shape or a biconvex shape at a peripheral portion as the case may be.

Figure 1B:
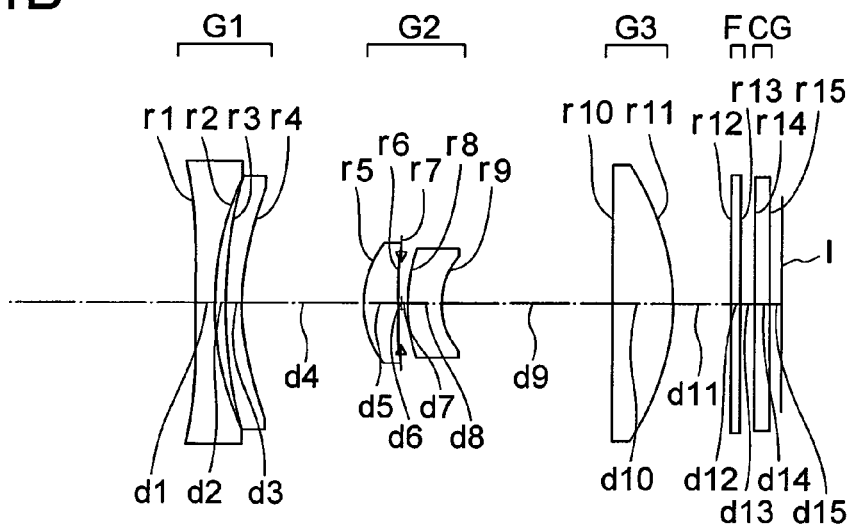
Figure 1C:
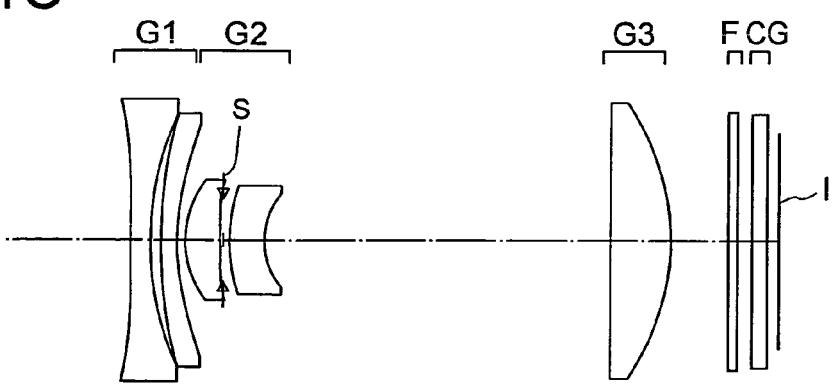

Next, a zoom lens according to a first embodiment of the present invention will be described below. FIG. 1A, FIG. 1B, and FIG. 1C are cross-sectional views along an optical axis showing an optical arrangement at the time of infinite object point focusing of the zoom lens according to the first embodiment of the present invention, where, FIG. 1A shows a state at a wide angle end, FIG. 1B shows an intermediate focal length state, and FIG. 1C shows a state at a telephoto end.

Figure 2A:
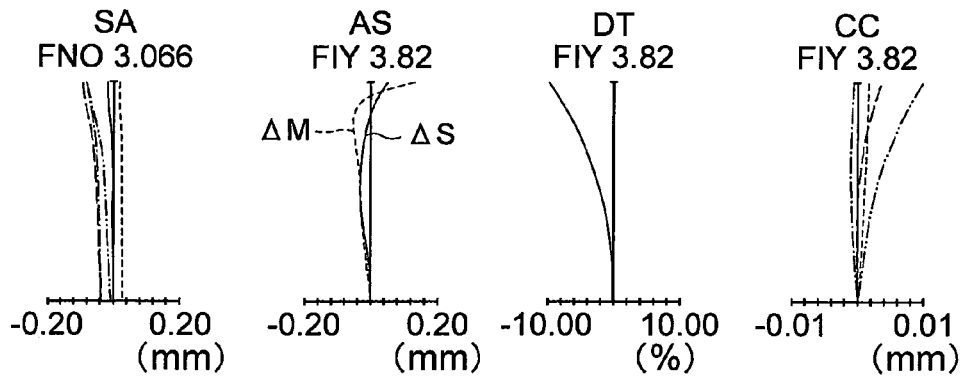
FIG. 2A, FIG. 2B, and FIG. 2C are diagrams showing a spherical aberration, an astigmatism, a distortion, and a chromatic aberration of magnification at the time of infinite object point focusing of the zoom lens according to the first embodiment, where.
Figure 2B:
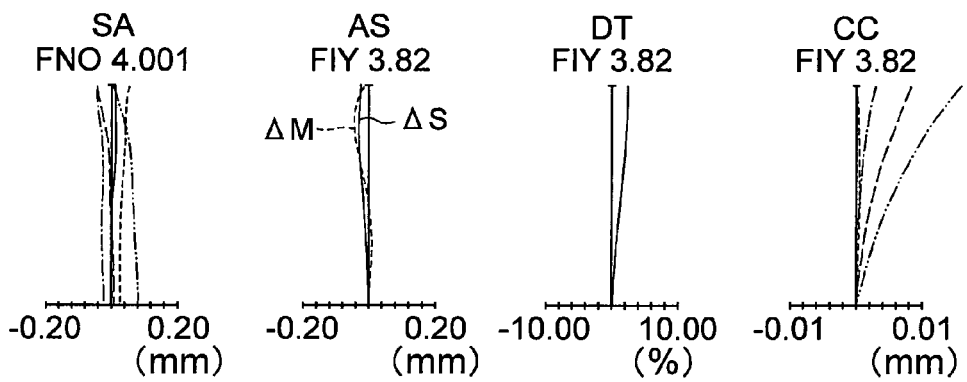
Figure 2C:
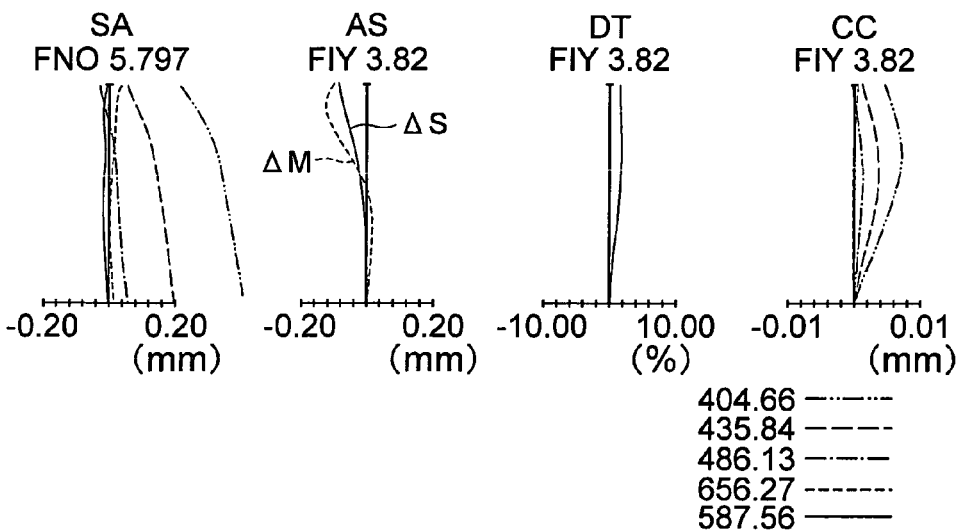

FIG. 2A, FIG. 2B, and FIG. 2C are diagrams showing a spherical aberration (SA), an astigmatism (AS), a distortion (DT), and a chromatic aberration of magnification (CC) at the time of infinite object point focusing of the zoom lens according to the first embodiment, where, FIG. 2A shows a state at the wide angle end, FIG. 2B shows an intermediate focal length state, and FIG. 2C shows a state at the telephoto end. Moreover, FIY denotes an image height. Symbols in the aberration diagrams are same even in the embodiments to be described later.

The zoom lens of the first embodiment, as shown in FIG. 1A, FIG. 1B, and FIG. 1C includes in order from an object side, a first lens group G1 having a negative refracting power, a second lens group G2 having a positive refracting power, and a third lens group G3 having a positive refracting power.

In all the following embodiments, in the lens cross-sectional views, LPF or F denotes a low pass filter, CG or C denotes a cover glass, and I denotes an image pickup surface of the electronic image pickup element.

The first lens group G1 includes in order from the object side, a cemented lens of a negative meniscus lens L1 having a convex surface directed toward the object side, a positive meniscus lens L2 having a convex surface directed toward the object side, and a negative meniscus lens L3 having a convex surface directed toward the object side, and has a negative refracting power as a whole.

The negative meniscus lens L1 corresponds to the lens LA, the positive meniscus lens L2 corresponds to the lens LB, and the negative meniscus lens L3 corresponds to the lens LC. Moreover, a glass material A is used for the lens LA and the lens LB, and a glass material C is used for the lens LB.

The second lens group G2 includes in order from the object side, a biconvex positive lens L4 and a negative meniscus lens L5 having a convex surface directed toward the object side, and has a positive refracting power as a whole.

An aperture stop S is disposed between the biconvex positive lens L4 and the negative meniscus lens L5.

The third lens group G3 includes a biconvex positive lens L6, and has a positive refracting power as a whole.

At the time of zooming from the wide angle end to the telephoto end, the first lens group G1, after moving toward an image side, moves toward the object side. The second lens group G2 moves toward the object side. The third lens group G3, after moving toward the image side, moves toward the object side. The aperture stop S moves along with the second lens group G2.

An aspheric surface is provided to seven surfaces namely, a surface on the object side of the negative meniscus lens L1 on the object side and a surface on the image side of the negative meniscus lens L3 in the first lens group G1, both surfaces of the biconvex positive lens L4 and both surfaces of the negative meniscus lens L5 in the second lens group G2, and a surface on the image side of the biconvex positive lens L6 in the third lens group G3.

Figure 3A:
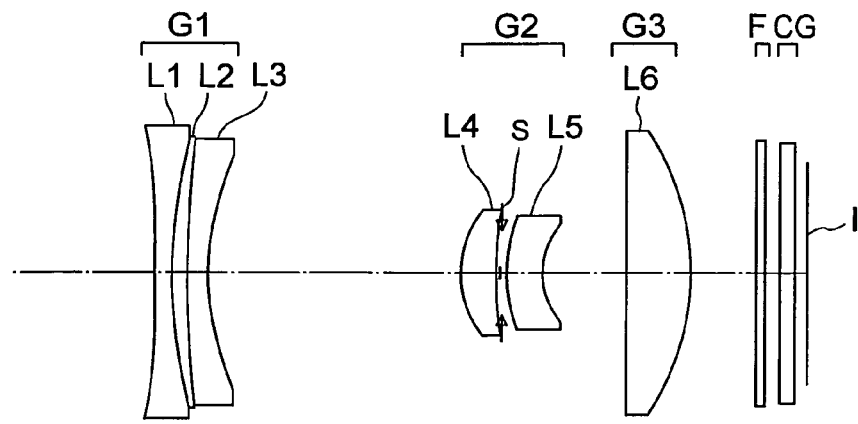
FIG. 3A, FIG. 3B, and FIG. 3C are cross-sectional views along an optical axis showing an optical arrangement at the time of infinite object point focusing of a zoom lens according to a second embodiment of the present invention, where.
Figure 3B:
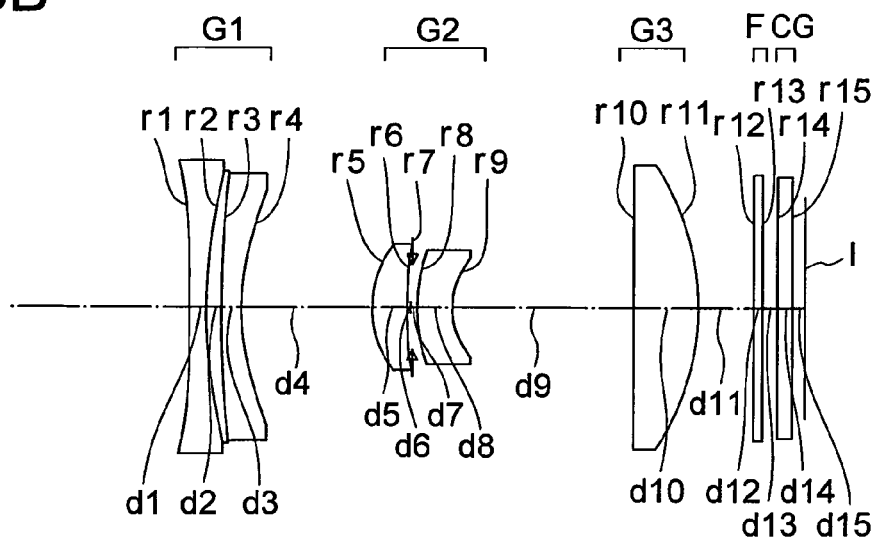
Figure 3C:
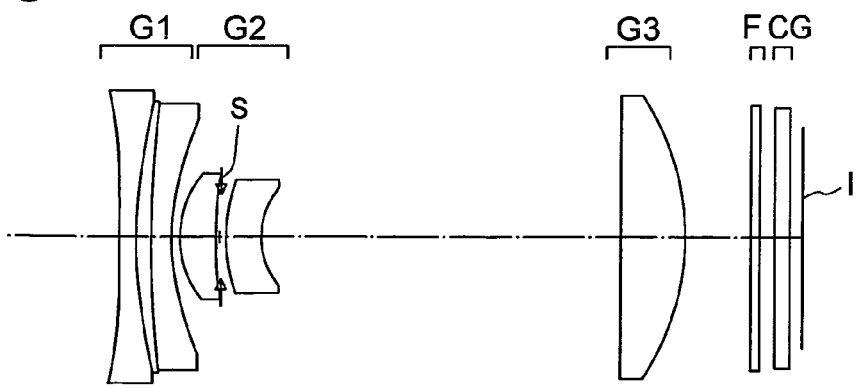

Next, a zoom lens according to a second embodiment of the present invention will be described below. FIG. 3A, FIG. 3B, and FIG. 3C are cross-sectional views along an optical axis showing an optical arrangement at the time of infinite object point focusing of the zoom lens according to the second embodiment of the present invention, where, FIG. 3A shows a state at a wide angle end, FIG. 3B shows an intermediate focal length state, and FIG. 3C shows a state at a telephoto end.

Figure 4A:
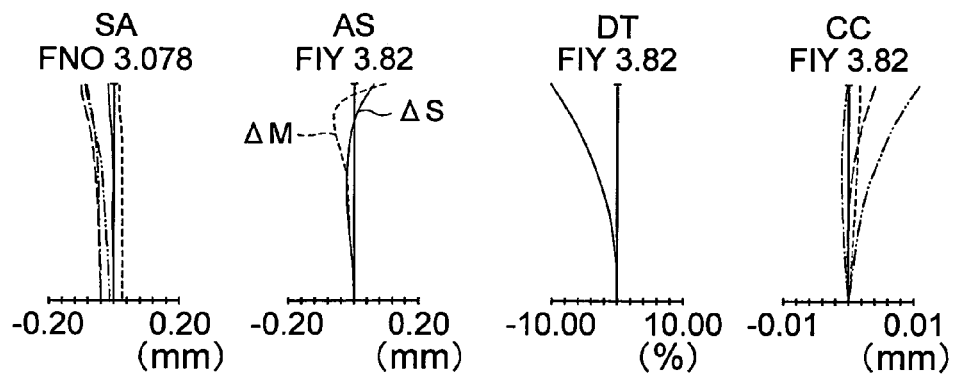
FIG. 4A, FIG. 4B, and FIG. 4C are diagrams showing a spherical aberration, an astigmatism, a distortion, and a chromatic aberration of magnification at the time of infinite object point focusing of the zoom lens according to the second embodiment, where.
Figure 4B:
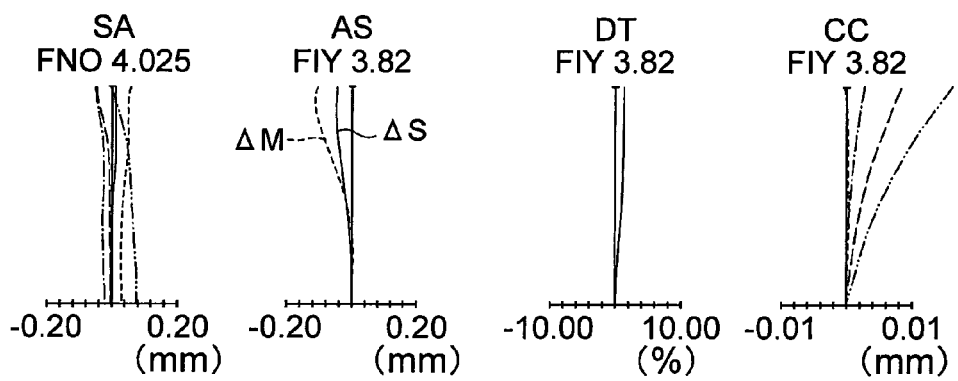
Figure 4C:
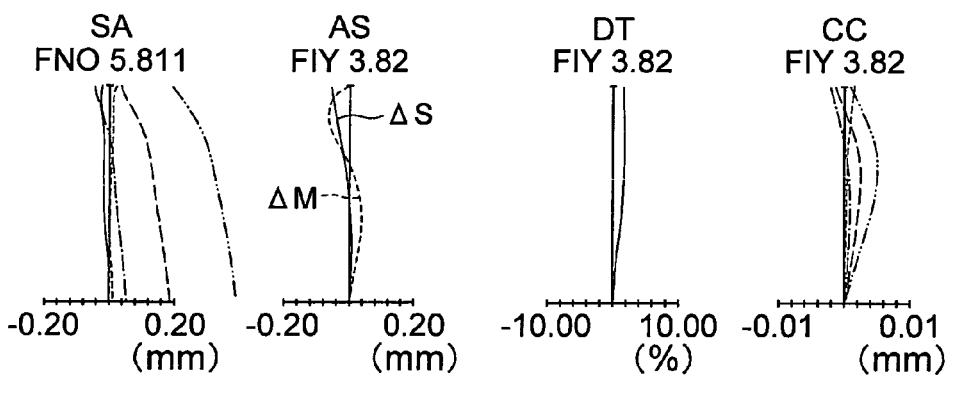

FIG. 4A, FIG. 4B, and FIG. 4C are diagrams showing a spherical aberration, an astigmatism, a distortion, and a chromatic aberration of magnification at the time of infinite object point focusing of the zoom lens according to the second embodiment, where, FIG. 4A shows a state at the wide angle end, FIG. 4B shows an intermediate focal length state, and FIG. 4c shows a state at the telephoto end.

The zoom lens of the second embodiment, as shown in FIG. 3A, FIG. 3B, and FIG. 3C, includes in order from an object side, a first lens group G1 having a negative refracting power, a second lens group G2 having a positive refracting power, and a third lens group G3 having a positive refracting power.

The first lens group G1 includes in order from the object side, a cemented lens of a negative meniscus lens L1 having a convex surface directed toward the object side, a positive meniscus lens L2 having a convex surface directed toward the object side, and a negative meniscus lens L3 having a convex surface directed toward the object side, and has a negative refracting power as a whole.

The negative meniscus lens L1 corresponds to the lens LC, the positive meniscus lens L2 corresponds to the lens LB, and the negative meniscus lens L3 corresponds to the lens LA. Moreover, a glass material A is used for the lens LA and the lens LC, and a glass material C is used for the lens LB.

The second lens group G2 includes in order from the object side, a biconvex positive lens L4 and a negative meniscus lens L5 having a convex surface directed toward the object side, and has a positive refracting power as a whole.

An aperture stop S is disposed between the biconvex positive lens L4 and the negative meniscus lens L5.

The third lens group G3 includes a biconvex positive lens L6 and has a positive refracting power as a whole.

At the time of zooming from the wide angle end to the telephoto end, the first lens group G1, after moving toward an image side, moves toward the object side. The second lens group G2 moves toward the object side. The third lens group G3, after moving toward the image side, moves toward the object side. The aperture stop S moves along with the second lens group G2.

An aspheric surface is provided to seven surfaces namely, a surface on the object side of the negative meniscus lens L1 on the object side and a surface on the image side of the negative meniscus lens L3 in the first lens group G1, both surfaces of the biconvex positive lens L4 and both surfaces of the negative meniscus lens L5 in the second lens group G2, and a surface on the image side of the biconvex positive lens L6 in the third lens group G3.

Figure 5A:
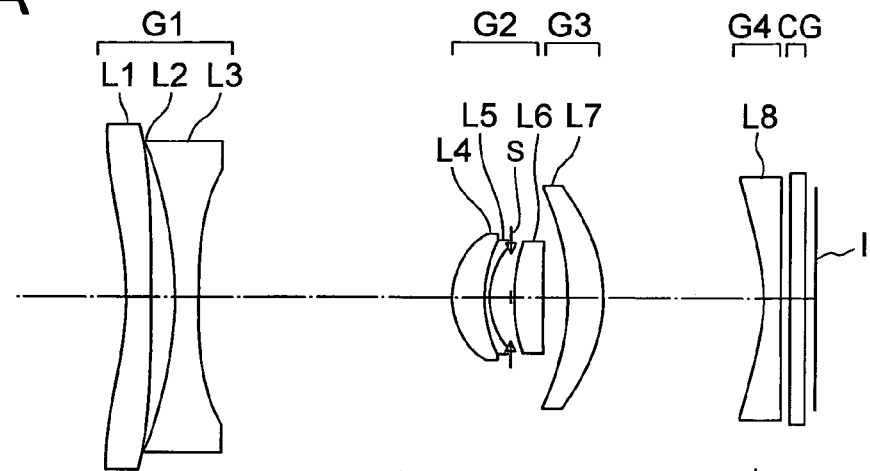
FIG. 5A, FIG. 5B, and FIG. 5C are cross-sectional views along an optical axis showing an optical arrangement at the time of infinite object point focusing of a zoom lens according to a third embodiment of the present invention, where.
Figure 5B:
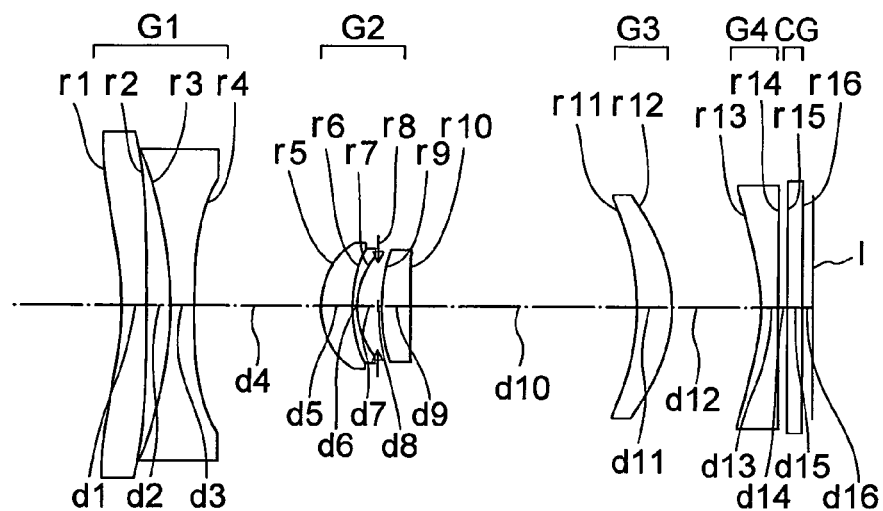
Figure 5C:
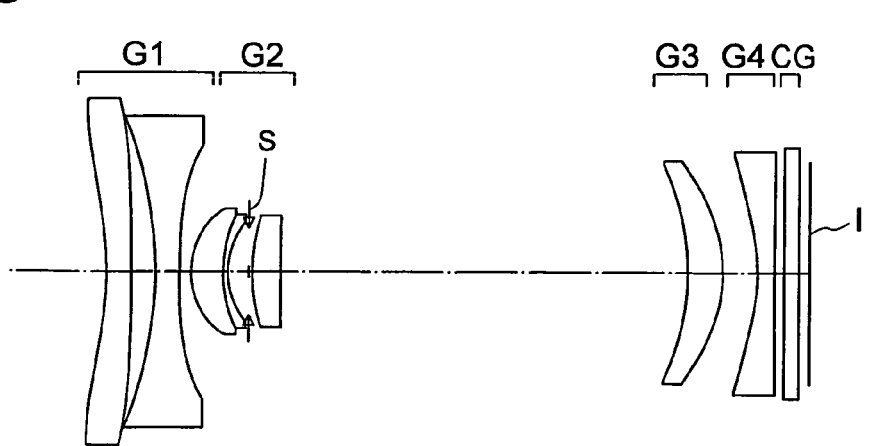

Next, a zoom lens according to a third embodiment of the present invention will be described below. FIG. 5A, FIG. 5B, and FIG. 5C are cross-sectional views along an optical axis showing an optical arrangement at the time of infinite object point focusing of the zoom lens according to the third embodiment, where, FIG. 5A shows a state at a wide angle end, FIG. 5B shows an intermediate focal length state, and FIG. 5C shows a state at a telephoto end.

Figure 6A:
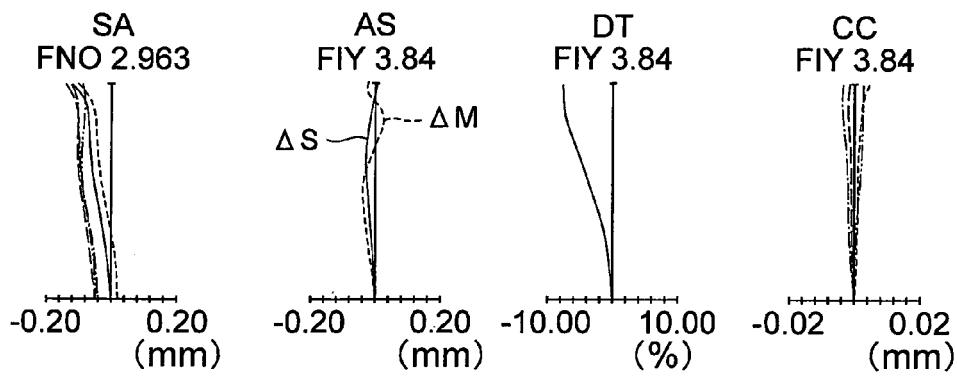
FIG. 6A, FIG. 6B, and FIG. 6C are diagrams showing a spherical aberration, an astigmatism, a distortion, and a chromatic aberration of magnification at the time of infinite object point focusing of the zoom lens according to the third embodiment, where.
Figure 6B:
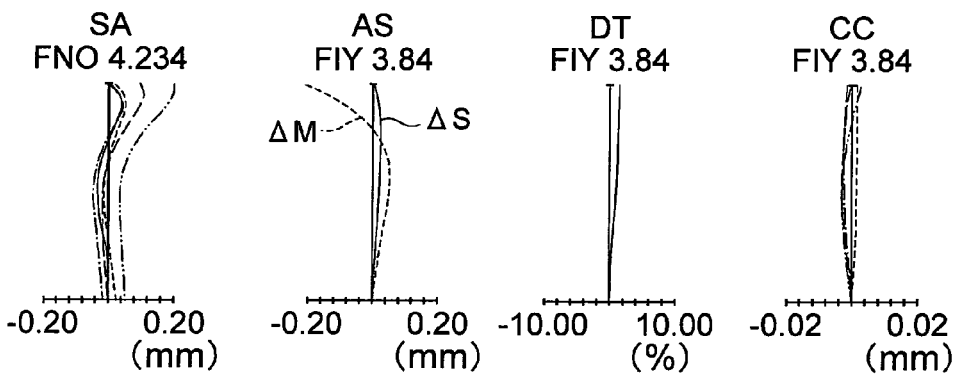
Figure 6C:
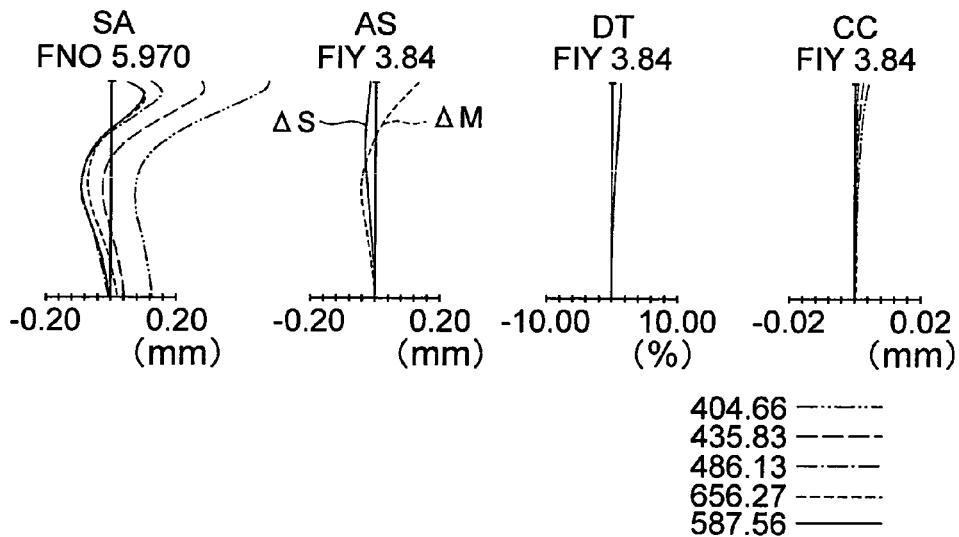

FIG. 6A, FIG. 6B, and FIG. 6C are diagrams showing a spherical aberration, an astigmatism, a distortion, and a chromatic aberration of magnification at the time of infinite object point focusing of the zoom lens according to the third embodiment, where, FIG. 6A shows a state at the wide angle end, FIG. 6B shows an intermediate focal length state, and FIG. 6C shows a state at the telephoto end.

The zoom lens of the third embodiment, as shown in FIG. 5A, FIG. 5B, and FIG. 5C, includes in order from an object side, a first lens group G1 having a negative refracting power, a second lens group G2 having a positive refracting power, a third lens group G3 having a positive refracting power, and a fourth lens group G4 having a negative refracting power.

The first lens group G5 includes a cemented lens of a negative meniscus lens L1 having a convex surface directed toward the object side, a positive meniscus lens L2 having a convex surface directed toward an image side, and a biconcave negative lens L3, and has a negative refracting power as a whole.

The negative meniscus lens L1 corresponds to the lens LC, the positive meniscus lens L2 corresponds to the lens LB, and the biconcave negative lens L3 corresponds to the lens LA. Moreover, a glass material A is used for the lens LA and the lens LC, and a glass material B is used for the lens LB.

The second lens group G2 includes in order from the object side, a cemented lens of a positive meniscus lens L4 having a convex surface directed toward the object side and a negative meniscus lens L5 having a convex surface directed toward the object side, and a positive meniscus lens L6 having a convex surface directed toward the object side, and has a positive refracting power as a whole.

An aperture stop S is disposed between the negative meniscus lens L5 and the positive meniscus lens L6.

The positive meniscus lens L4 corresponds to the lens LA, and the negative meniscus lens L5 corresponds to the lens LB. A glass material A is used for the lens LA and a glass material B is used for the lens LB.

The third lens group G3 includes a positive meniscus lens L7 having a convex surface directed toward the image side, and has a positive refracting power as a whole.

The fourth lens group G4 includes a biconcave negative lens L8, and has a negative refracting power as a whole.

At the time of zooming from the wide angle end to the telephoto end, the first lens group G1 moves toward the object side. The second lens group G2 moves toward the object side. The third lens group G3 moves toward the image side. The fourth lens group G4 is fixed. The aperture stop S moves along with the second lens group G2.

An aspheric surface is provided to eight surfaces namely, both surfaces of the negative meniscus lens L1 and a surface on the object side of the biconcave negative lens L3 in the first lens group G1, a surface on the object side of the positive meniscus lens L4 on the object side, a surface on the image side of the negative meniscus lens L5, and a surface on the object side of the positive meniscus lens L6 on the image side in the second lens group G2, a surface on the image side of the positive meniscus lens L7 in the third lens group G3, and a surface on the object side of the biconcave negative lens L8 in the fourth lens group G4.

Figure 7A:
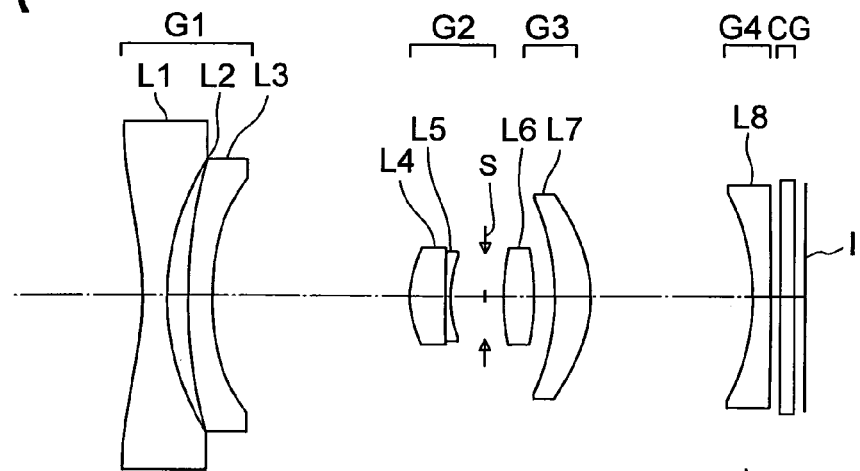
FIG. 7A, FIG. 7B, and FIG. 7C are cross-sectional views along an optical axis showing an optical arrangement at the time of infinite object point focusing of a zoom lens according to a fourth embodiment of the present invention, where.
Figure 7B:
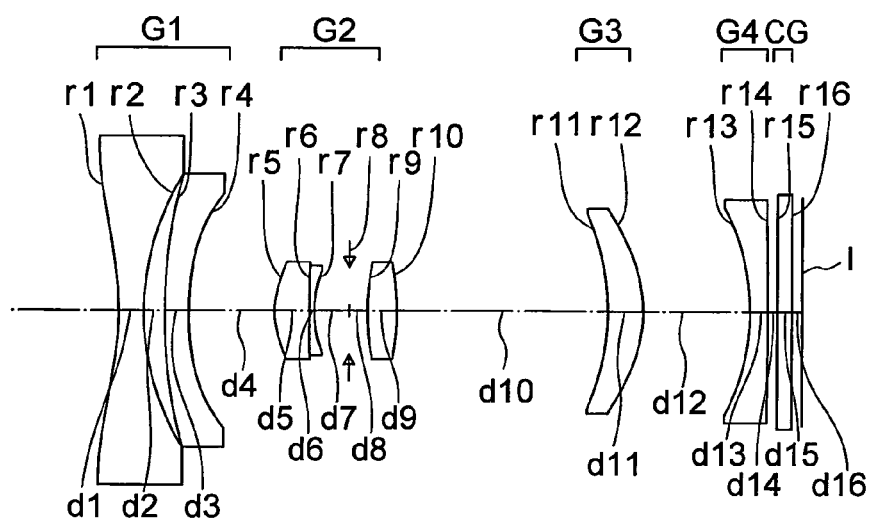
Figure 7C:
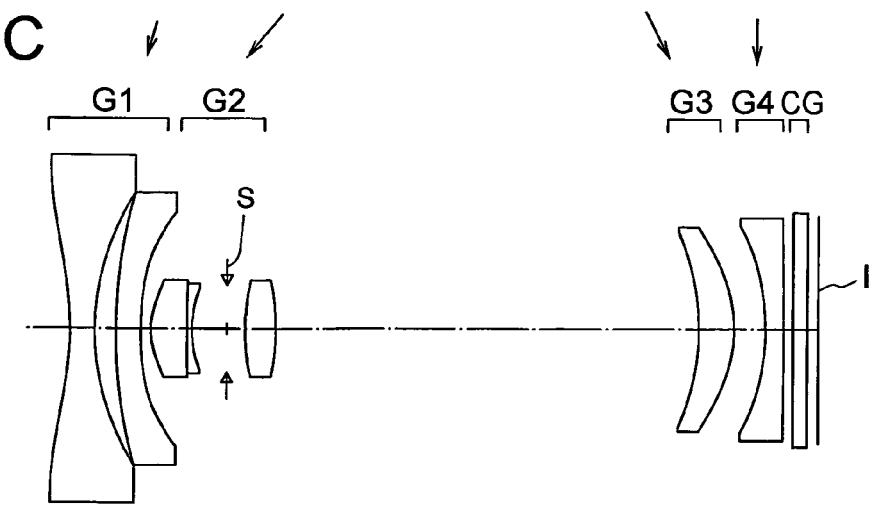

Next, a zoom lens according to a fourth embodiment of the present invention will be described below. FIG. 7A, FIG. 7B, and FIG. 7C are cross-sectional views along an optical axis showing an optical arrangement at the time of infinite object point focusing of the zoom lens according to the fourth embodiment, where, FIG. 7A shows a state at a wide angle end, FIG. 7B shows an intermediate focal length state, and FIG. 7C shows a state at a telephoto end.

Figure 8A:
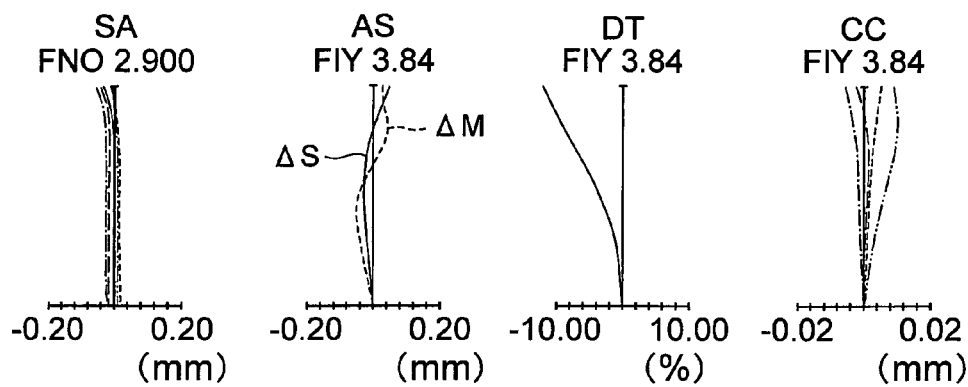
FIG. 8A, FIG. 8B, and FIG. 8C are diagrams showing a spherical aberration, an astigmatism, a distortion, and a chromatic aberration of magnification at the time of infinite object point focusing of the zoom lens according to the fourth embodiment, where.
Figure 8B:
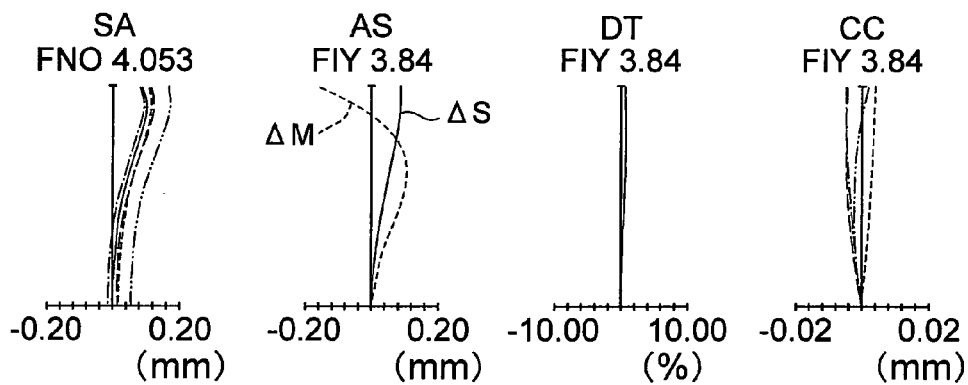
Figure 8C:
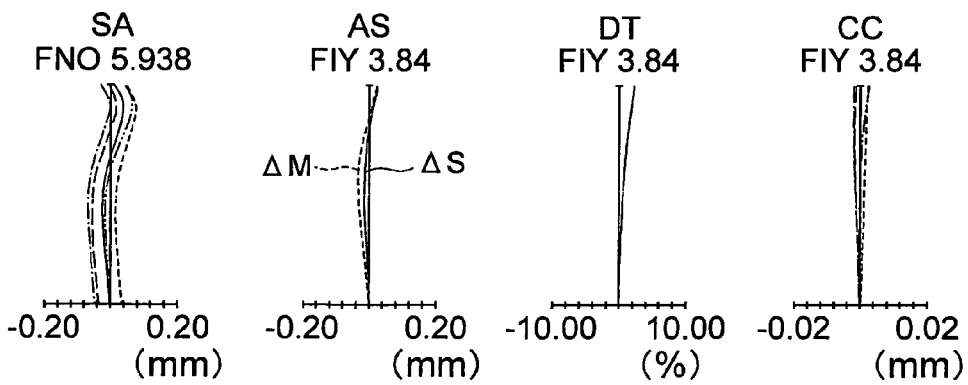

FIG. 8A, FIG. 8B, and FIG. 8C are diagrams showing a spherical aberration, an astigmatism, a distortion, and a chromatic aberration of magnification at the time of infinite object point focusing of the zoom lens according to the fourth embodiment, where, FIG. 8A shows a state at the wide angle end, FIG. 8B shows an intermediate focal length state, and FIG. 8C shows a state at the telephoto end.

The zoom lens of the fourth embodiment, as shown in FIG. 7A, FIG. 7B, and FIG. 7C, includes in order from an object side, a first lens group G1 having a negative refracting power, a second lens group G2 having a positive refracting power, a third lens group G3 having a positive refracting power, and a fourth lens group G4 having a negative refracting power.

The first lens group G1 includes in order from the object side, a cemented lens of a biconcave negative lens L1, a positive meniscus lens L2 having a convex surface directed toward the object side, and a negative meniscus lens L3 having a convex surface directed toward the object side, and has a negative refracting power as a whole.

The biconcave negative lens L1 corresponds to the lens LA, the positive meniscus lens L2 corresponds to the lens LB, and the negative meniscus lens L3 corresponds to the lens LC. Moreover, a glass material A is used for the lens LA and the lens LC, and a glass material B is used for the lens LB.

The second lens group G2 includes in order from the object side, a cemented lens of a positive meniscus lens L4 having a convex surface directed toward the object side and a negative meniscus lens L5 having a convex surface directed toward the object side, and a biconvex positive lens L6, and has a positive refracting power as a whole.

An aperture stop S is disposed between the negative meniscus lens L5 and the biconvex positive lens L6.

The positive meniscus lens L4 corresponds to the lens LA and the negative meniscus lens L5 corresponds to the lens LB. Moreover, a glass material A is used for the lens LA and a glass material B is used for the lens LB.

The third lens group G3 includes a positive meniscus lens L7 having a convex surface directed toward an image side, and has a positive refracting power as a whole.

The fourth lens group G4 includes a biconcave negative lens L8, and has a negative refracting power as a whole.

At the time of zooming from the wide angle end to the telephoto end, the first lens group G1 moves toward the object side. The second lens group G2 moves toward the object side. The third lens group G3 moves toward the image side. The fourth lens group G4 is fixed. The aperture stop S moves along with the second lens group G2.

An aspheric surface is provided to eight surfaces namely, both surfaces of the biconcave negative lens L1 and a surface on the image side of the negative meniscus lens L3 in the first lend group G1, a surface on the object side of the positive meniscus lens L4, a surface on the image side of the negative meniscus lens L5, and a surface on the object side of the biconvex positive lens L6 in the second lens group G2, a surface on the image side of the positive meniscus lens L7 in the third lens group G3, and a surface on the object side of the biconcave negative lens L8 in the fourth lens group G4.

Next, a zoom lens according to a fifth embodiment of the present invention will be described below. FIG. 9A, FIG. 9B, and FIG. 9C are cross-sectional views along an optical axis showing an optical arrangement at the time of infinite object point focusing of the zoom lens according to the fifth embodiment of the present invention, where, FIG. 9A shows a state at a wide angle end, FIG. 9B shows an intermediate focal length state, and FIG. 9C shows a state at a telephoto end.

Figure 10A:
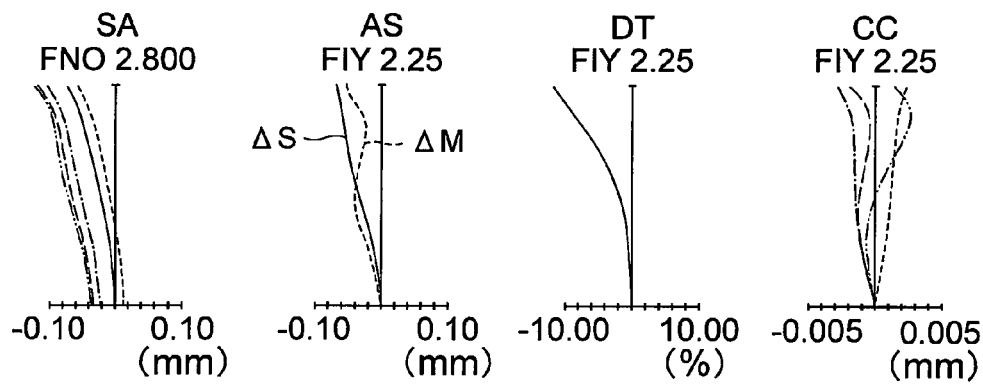
FIG. 10A, FIG. 10B, and FIG. 10C are diagrams showing a spherical aberration, an astigmatism, a distortion, and a chromatic aberration of magnification at the time of infinite object point focusing of the zoom lens according to the fifth embodiment, where.
Figure 10B:
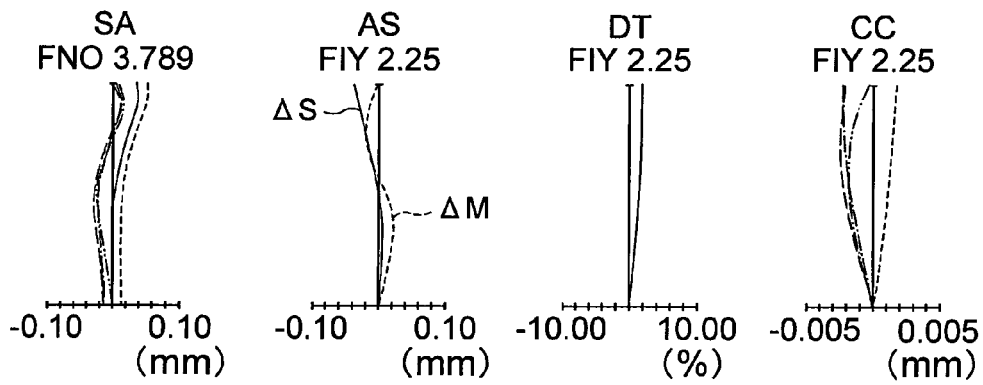
Figure 10C:
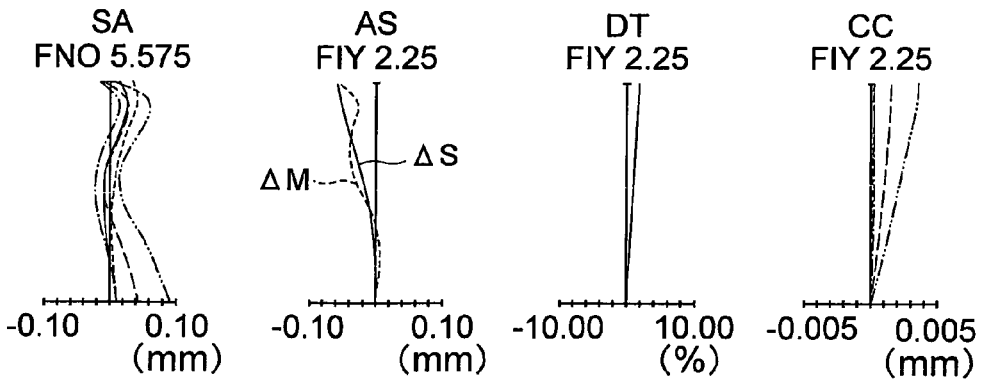

FIG. 10A, FIG. 10B, and FIG. 10C are diagrams showing a spherical aberration, an astigmatism, a distortion, and a chromatic aberration of magnification at the time of infinite object point focusing of the zoom lens according to the fifth embodiment, where, FIG. 10A shows a state at the wide angle end, FIG. 10B shows an intermediate focal length state, and FIG. 100 shows a state at the telephoto end.

The zoom lens of the fifth embodiment, as shown in FIG. 9A, FIG. 9B, and FIG. 9C, includes in order from an object side, a first lens group G1 having a negative refracting power, an aperture stop S, a second lens group G2 having a positive refracting power, a third lens group G3 having a positive refracting power, and a fourth lens group G4 having a negative refracting power.

The first lens group G1 includes in order from the object side, a cemented lens of a biconcave negative lens L1 and a positive meniscus lens L2 having a convex surface directed toward the object side, and has a negative refracting power as a whole.

The biconcave negative lens L1 corresponds to the lens LA and the positive meniscus lens L2 corresponds to the lens LB. Moreover, a glass material A is used for the lens LA and a glass material B is used for the lens LB.

The second lens group G2 includes in order from the object side, a cemented lens of a positive meniscus lens L3 having a convex surface directed toward the object side, a negative meniscus lens L4 having a convex surface directed toward the object side, and a positive meniscus lens L5 having a convex surface directed toward the object side, and has a positive refracting power as a whole.

The positive meniscus lens L3 corresponds to the lens LA, the negative meniscus lens L4 corresponds to the lens LB, and the positive meniscus lens L5 corresponds to the lens LC. Moreover, a glass material A is used for the lens LA and the lens LC, and a glass material B is used for the lens LB.

The lens group G3 includes a positive meniscus lens L6 having a convex surface directed toward an image side, and has a positive refracting power as a whole.

The fourth lens group G6 includes a biconcave negative lens L7, and has a negative refracting power as a whole.

At the time of zooming from the wide angle end to the telephoto end, the first lens group G1, after moving toward the image side, moves toward the object side. The second lens group G2 moves toward the object side. The third lens group G3 moves toward the image side, and the fourth lens group G4 is fixed. The aperture stop S moves along with the second lens group G2.

An aspheric surface is provided to eight surfaces namely, three surfaces of the cemented lens in the first lens group G1, a surface on the object side of the positive meniscus lens L3 on the object side and both surfaces of the positive meniscus lens L5 on the image side in the second lens group G2, a surface on the image side of the positive meniscus lens L6 in the third lens group G3, and a surface on the object side of the biconcave negative lens L7 in the fourth lens group G4.

Next, a zoom lens according to a sixth embodiment of the present invention will be described below. FIG. 11A, FIG. 11B, and FIG. 11C are cross-sectional views along an optical axis showing an optical arrangement at the time of infinite object point focusing of the zoom lens according to the sixth embodiment, where, FIG. 11A shows a state at a wide angle end, FIG. 11B shows an intermediate focal length state, and FIG. 11C shows a state at a telephoto end.

Figure 12A:
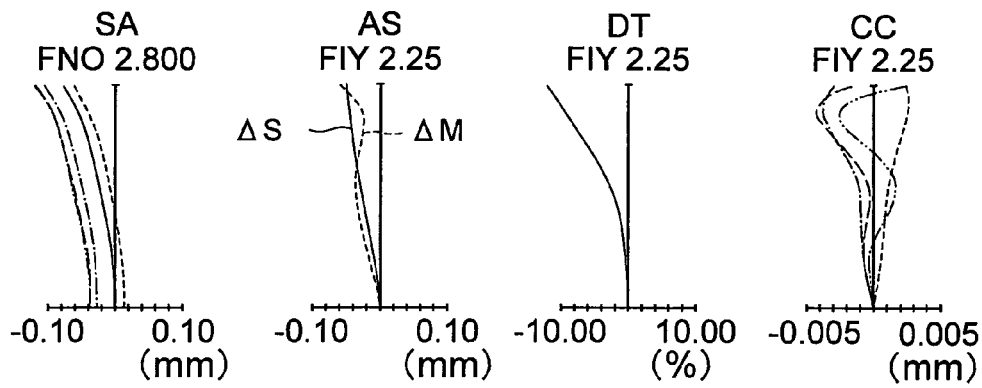
FIG. 12A, FIG. 12B, and FIG. 12C are diagrams showing a spherical aberration, an astigmatism, a distortion, and a chromatic aberration of magnification at the time of infinite object point focusing of the zoom lens according to the sixth embodiment, where.
Figure 12B:
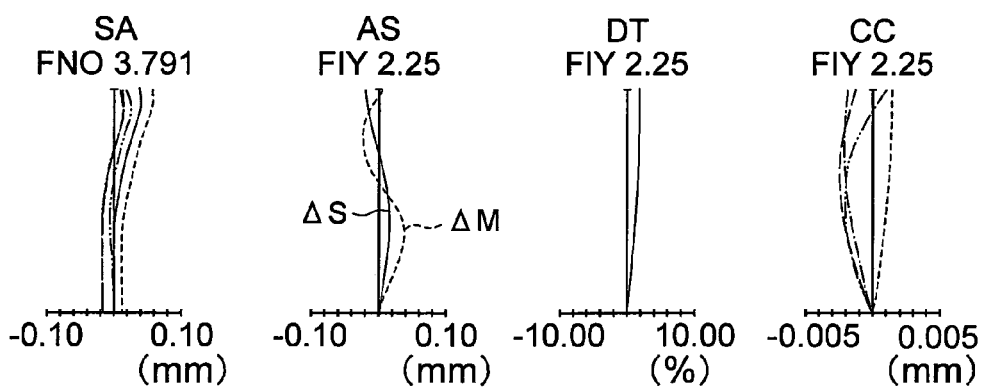
Figure 12C:
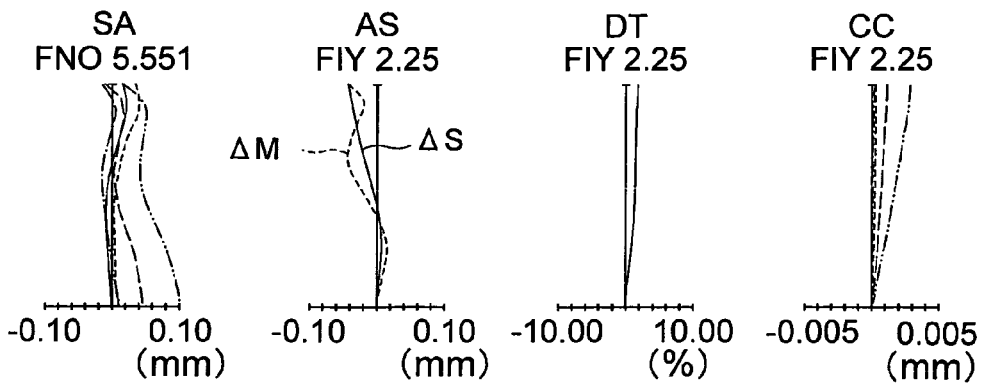

FIG. 12A, FIG. 12B, and FIG. 12C are diagrams showing a spherical aberration, an astigmatism, a distortion, and a chromatic aberration of magnification at the time of infinite object point focusing of the zoom lens according to the sixth embodiment, where, FIG. 12A shows a state at the wide angle end, FIG. 12B shows an intermediate focal length state, and FIG. 12C shows a state at the telephoto end.

The zoom lens of the sixth embodiment, as shown in FIG. 11A, FIG. 11B, and FIG. 11C, includes in order from an object side, a first lens group G1 having a negative refracting power, an aperture stop S, a second lens group G2 having a positive refracting power, a third lens group G3 having a positive refracting power, and a fourth lens group G4 having a negative refracting power.

The first lens group G1 includes in order from the object side, a cemented lens of a biconcave negative lens L1 and a positive meniscus lens L2 having a convex surface directed toward the object side, and has a negative refracting power as a whole.

The biconcave negative lens L1 corresponds to the lens LA and the positive meniscus lens L2 corresponds to the lens LB. Moreover, a glass material A is used for the lens LA and a glass material D is used from the lens LB.

The second lens group G2 includes in order from the object side, a cemented lens of a positive meniscus lens L3 having a convex surface directed toward the object side, a negative meniscus lens L4 having a convex surface directed toward the object side, and a positive meniscus lens L5 having a convex surface directed toward the object side, and has a positive refracting power as a whole.

The positive meniscus lens L3 corresponds to the lens LA, the negative meniscus lens L4 corresponds to the lens LB, and the positive meniscus lens L5 corresponds to the lens LC. Moreover, a glass material A is used for the lens LA and the lens LC, and a glass material D is used for the lens LB.

The third lens group G3 includes a positive meniscus lens L6 having a convex surface directed toward an image side, and has a positive refracting power as a whole.

The fourth lens group G4 includes a biconcave negative lens L7, and has a negative refracting power as a whole.

At the time of zooming from the wide angle end to the telephoto end, the first lens group G1, after moving toward the image side, moves toward the object side. The second lens group G2 moves toward the object side. The third lens group G3 moves toward the image side. The fourth lens group G4 is fixed. The aperture stop S moves along with the second lens group G2.

An aspheric surface is provided to eight surfaces namely, three surfaces of the cemented lens in the first lens group G1, a surface on the object side of the positive meniscus lens L3 on the object side and both surfaces of the positive meniscus lens L5 on the image side in the second lens group G2, a surface on the image side of the positive meniscus lens L6 in the third lens group G3, and a surface on the object side of the biconcave negative lens L7 in the fourth lens group G4.

Figure 13A:
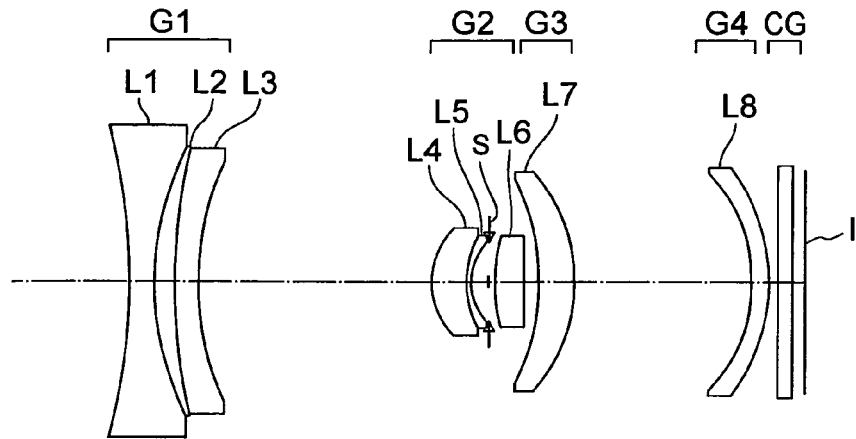
FIG. 13A, FIG. 13B, and FIG. 13C are cross-sectional views along an optical axis showing an optical arrangement at the time of infinite object point focusing of a zoom lens according to a seventh embodiment of the present invention, where.
Figure 13B:
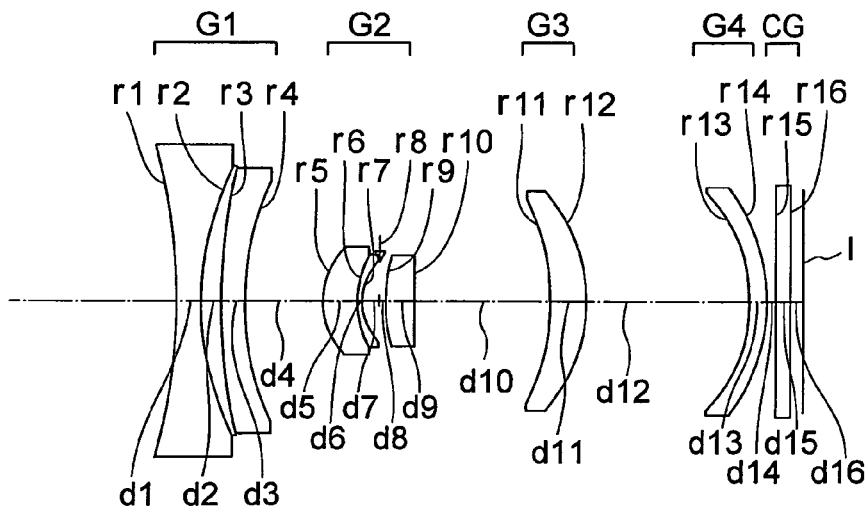
Figure 13C:
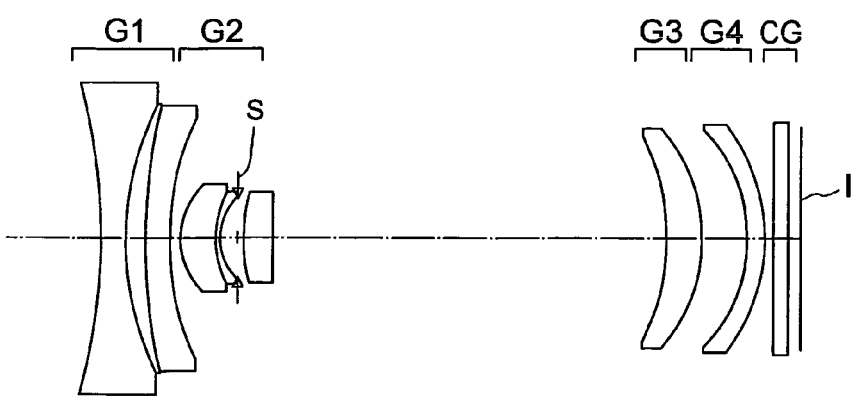

Next, a zoom lens according to a seventh embodiment of the present invention will be described below. FIG. 13A, FIG. 13B, and FIG. 13C are cross-sectional views along an optical axis showing an optical arrangement at the time of infinite object point focusing of the zoom lens according to the seventh embodiment of the present invention, where, FIG. 13A shows a state at a wide angle end, FIG. 13B shows an intermediate focal length state, and FIG. 13C shows a state at a telephoto end.

Figure 14A:
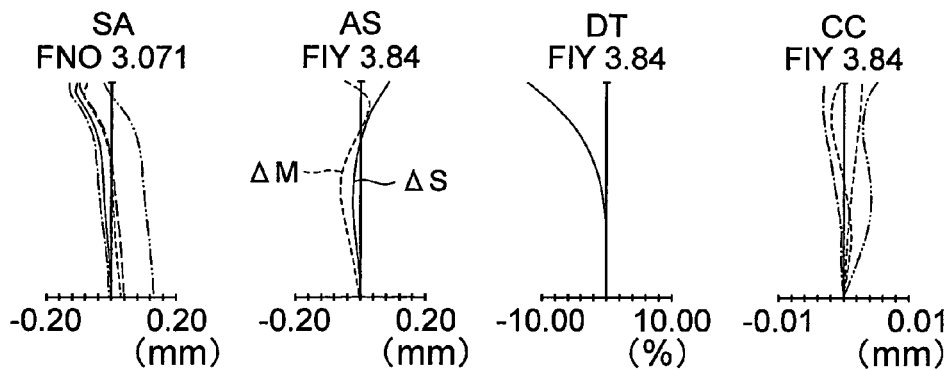
FIG. 14A, FIG. 14B, and FIG. 14C are diagrams showing a spherical aberration, an astigmatism, a distortion, and a chromatic aberration of magnification at the time of infinite object point focusing of the zoom lens according to the seventh embodiment, where.
Figure 14B:
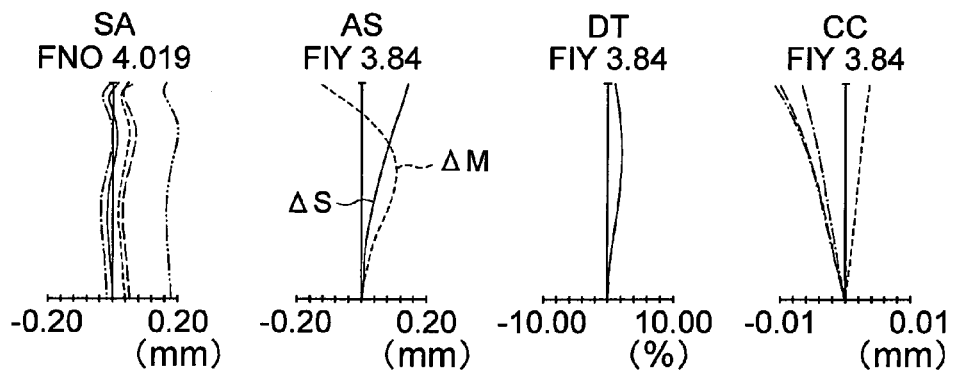
Figure 14C:
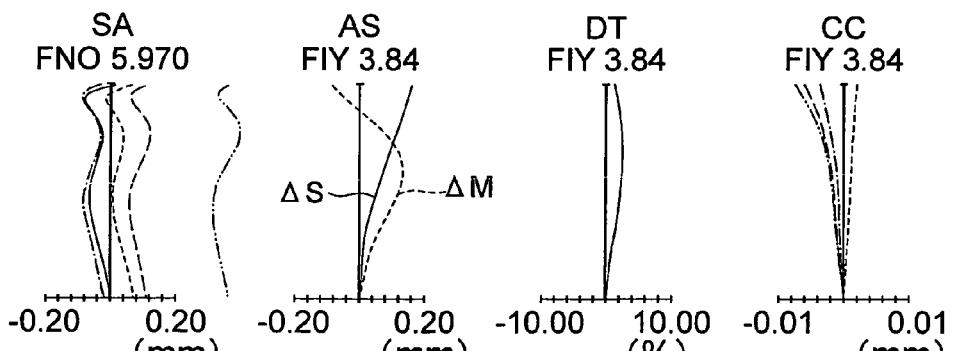

FIG. 14A, FIG. 14B, and FIG. 14C are diagrams showing a spherical aberration, an astigmatism, a distortion, and a chromatic aberration of magnification at the time of infinite object point focusing of the zoom lens according to the seventh embodiment, where, FIG. 14A shows a state at the wide angle end, FIG. 14B shows an intermediate focal length state, and FIG. 14C shows a state at the telephoto end.

The zoom lens of the seventh embodiment, as shown in FIG. 13A, FIG. 13B, and FIG. 13C, includes in order from an object side, a first lens group G1 having a negative refracting power, a second lens group G2 having a positive refracting power, a third lens group G3 having a positive refracting power, and a fourth lens group G4 having a positive refracting power.

The first lens group G1 includes in order from the object side, a cemented lens of a biconcave negative lens L1, a positive meniscus lens L2 having a convex surface directed toward the object side, and a negative meniscus lens L3 having a convex surface directed toward the object side, and has a negative refracting power as a whole.

The biconcave negative lens L1 corresponds to the lens LA, the positive meniscus lens L2 corresponds to the lens LB, and the negative meniscus lens L3 corresponds to the lens LC. Moreover, a glass material A is used for the lens LA and the lens LC, and a glass material D is used for the lens LB.

The second lens group G2 includes in order from the object side, a cemented lens of the positive meniscus lens L4 having a convex surface directed toward the object side and a negative meniscus lens L5 having a convex surface directed toward the object side, and a biconvex positive lens L6, and has a positive refracting power as a whole.

An aperture stop is disposed between the negative meniscus lens L5 and the biconvex positive lens L6.

The third lens group G3 includes a positive meniscus lens L7 having a convex surface directed toward an image side, and has a positive refracting power as a whole.

The fourth lens group G4 includes a positive meniscus lens L8 having a convex surface directed toward the image side, and has a positive refracting power as a whole.

At the time of zooming from the wide angle end to the telephoto end, the first lens group G1, after moving toward the image side, moves toward the object side. The second lens group G2 moves toward the object side. The third lens group G3 moves toward the image side. The fourth lens group G4 is fixed. The aperture stop S moves along with the second lens group G2.

An aspheric surface is provided to six surfaces namely, both surfaces of the biconcave negative lens L1 and a surface on the image side of the negative meniscus lens L3 in the first lens group G1, a surface on the object side of the positive meniscus lens L4 and a surface on the image side of the negative meniscus lens L5 in the second lens group G2, and a surface on the object side of the positive meniscus lens L8 in the fourth lens group G4.

Figure 15A:
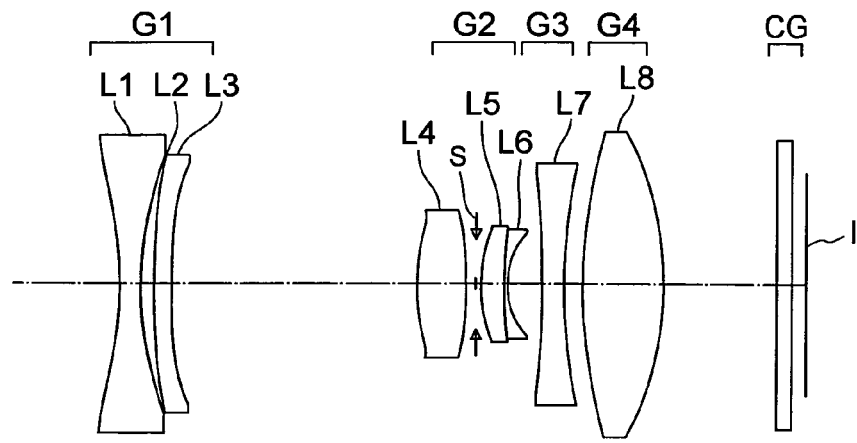
FIG. 15A, FIG. 15B, and FIG. 15C are cross-sectional views along an optical axis showing an optical arrangement at the time of infinite object point focusing of a zoom lens according to an eighth embodiment of the present invention, where.
Figure 15B:
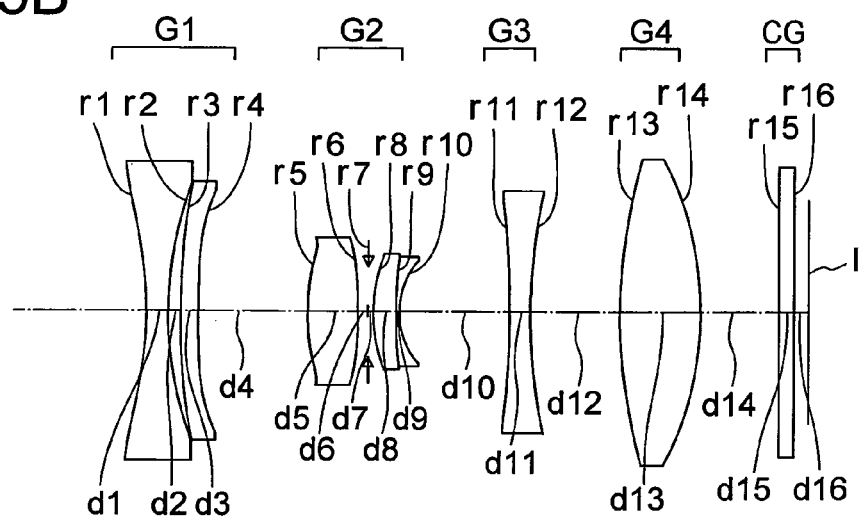
Figure 15C:
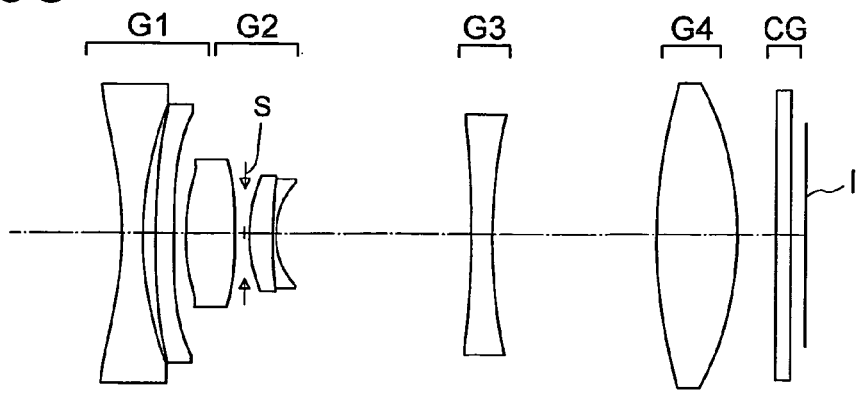

Next, a zoom lens according to an eighth embodiment of the present invention will be described below. FIG. 15A, FIG. 15B, and FIG. 15C are cross-sectional views along an optical axis showing an optical arrangement at the time of infinite object point focusing of the zoom lens according to the eighth embodiment of the present invention, where, FIG. 15A shows a state at a wide angle end, FIG. 15B shows an intermediate focal length state, and FIG. 15C shows a state at a telephoto end.

Figure 16A:
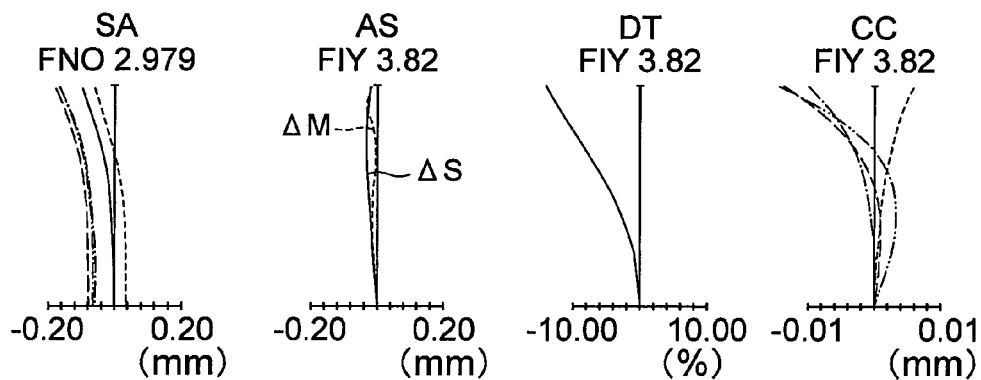
FIG. 16A, FIG. 16B, and FIG. 16C are diagrams showing a spherical aberration, an astigmatism, a distortion, and a chromatic aberration of magnification at the time of infinite object point focusing of the zoom lens according to the eighth embodiment, where.
Figure 16B:
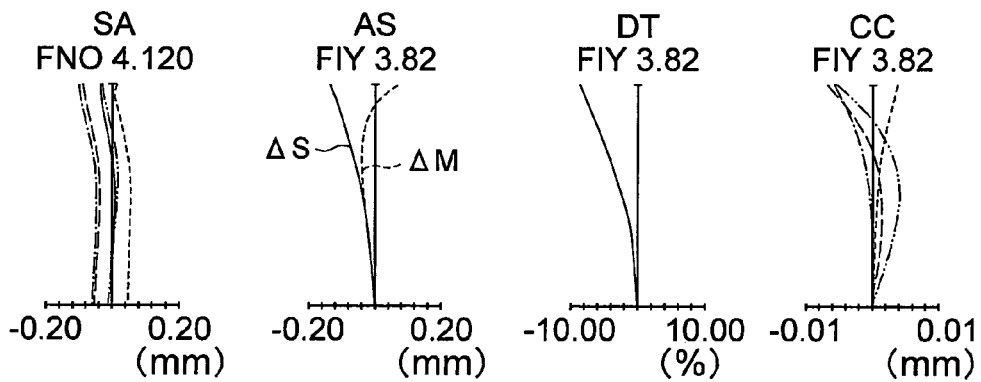
Figure 16C:
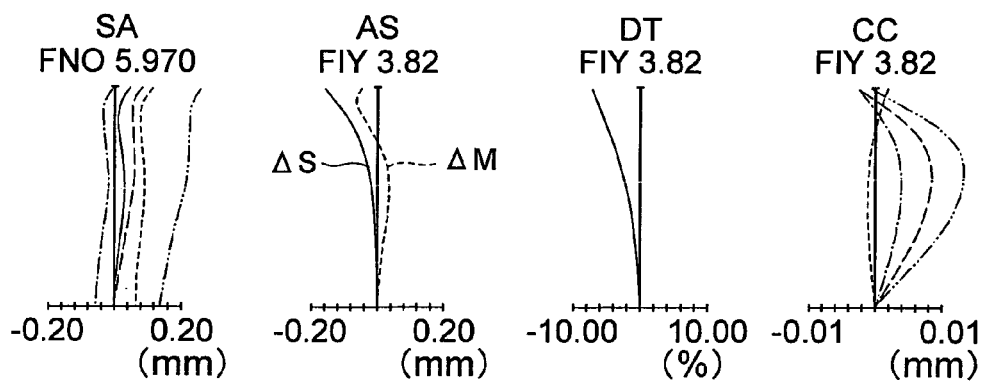

FIG. 16A, FIG. 16B, and FIG. 16C are diagrams showing a spherical aberration, an astigmatism, a distortion, and a chromatic aberration of magnification at the time of infinite object point focusing of the zoom lens according to the eighth embodiment, where, FIG. 16A shows a state at the wide angle end, FIG. 16B shows an intermediate focal length state, and FIG. 16C shows a state at the telephoto end.

The zoom lens of the eighth embodiment, as shown in FIG. 15A, FIG. 15B, and FIG. 15C, includes in order from an object side, a first lens group G1 having a negative refracting power, a second lens group G2 having a positive refracting power, a third lens group G3 having a negative refracting power, and a fourth lens group G4 having a positive refracting power.

The first lens group G1 includes in order from an object side, a cemented lens of a biconcave negative lens L1, a positive meniscus lens L2 having a convex surface directed toward the object side, and a positive meniscus lens L3 having a convex surface directed toward the object side, and has a negative refracting power as a whole.

The biconcave negative lens L1 corresponds to the lens LA, the positive meniscus lens L2 corresponds to the lens LB, and the positive meniscus lens L3 corresponds to the lens LC. Moreover, a glass material A is used for the lens LA and the lens LC, and a glass material B is used for the lens LB.

The second lens group G2 includes in order from the object side, a biconvex positive lens L4, and a cemented lens of a positive meniscus lens L5 having a convex surface directed toward the object side and a negative meniscus lens L6 having a convex surface directed toward the object side, and has a positive refracting power as a whole.

An aperture stop S is disposed between the biconvex positive lens L4 and the positive meniscus lens L5.

The third lens group G3 includes a biconcave negative lens L7, and has a negative refracting power as a whole.

The fourth lens group G4 includes a biconvex positive lens, and has a positive refracting power as a whole.

At the time of zooming from the wide angle end to the telephoto end, the first lens group G1, after moving toward an image side, moves toward the object side. The second lens group G2 moves toward the object side. The third lens group G3 moves toward the object side. The fourth lens group G4 moves toward the image side. The aperture stop S moves along with the second lens group G2.

An aspheric surface is provided to seven surfaces namely, both surfaces of the biconcave negative lens L1 and a surface on the image side of the positive meniscus lens L3 on the image side in the first lens group G1, both surfaces of the biconvex positive lens L4 and a surface on the image side of the negative meniscus lens L6 in the second lens group G2, and a surface on the image side of the biconvex positive lens L8 in the fourth lens group G4.

Figure 17A:
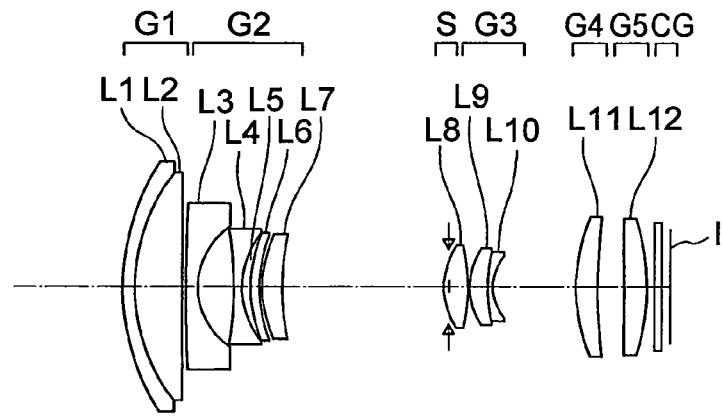
FIG. 17A, FIG. 17B, and FIG. 17C are cross-sectional views along an optical axis showing an optical arrangement at the time of infinite object point focusing of a zoom lens according to a ninth embodiment of the present invention, where.
Figure 17B:
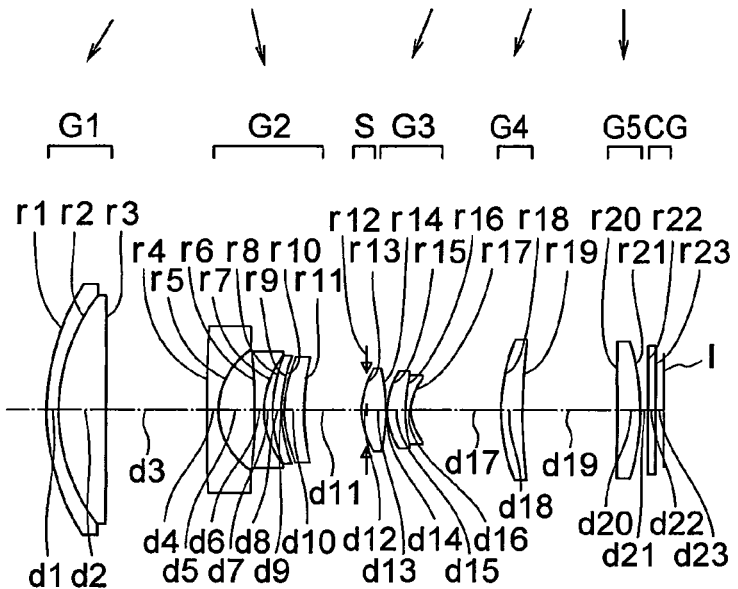
Figure 17C:
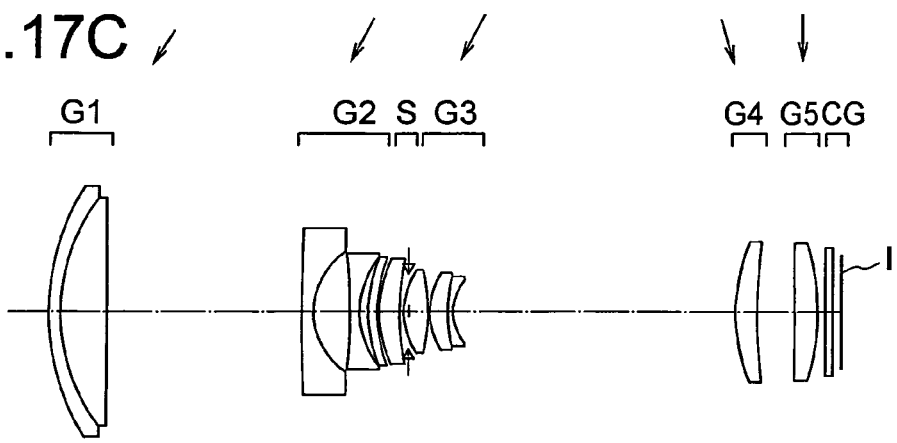

Next, a zoom lens according to a ninth embodiment of the present invention will be described below. FIG. 17A, FIG. 17B, and FIG. 17C are cross-sectional views along an optical axis showing an optical arrangement at the time of infinite object point focusing of the zoom lens according to the ninth embodiment of the present invention, where, FIG. 17A shows a state at a wide angle end, FIG. 17B shows an intermediate focal length state, and FIG. 17C shows a state at a telephoto end.

Figure 18A:
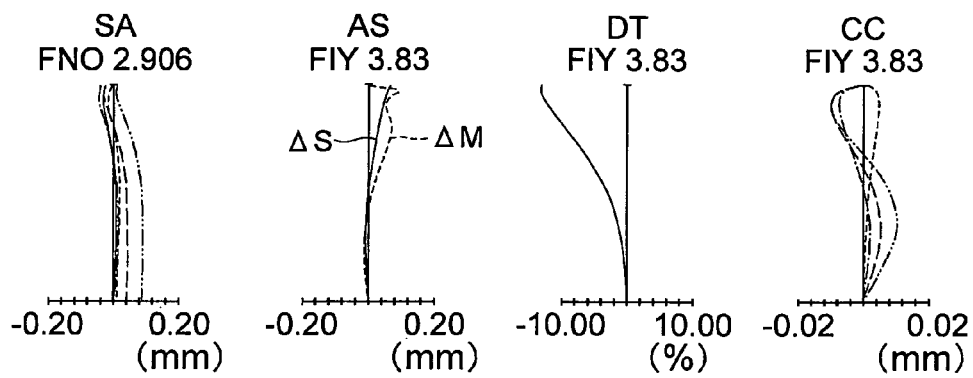
FIG. 18A, FIG. 18B, and FIG. 18C are diagrams showing a spherical aberration, an astigmatism, a distortion, and a chromatic aberration of magnification at the time of infinite object point focusing of the zoom lens according to the ninth embodiment, where.
Figure 18B:
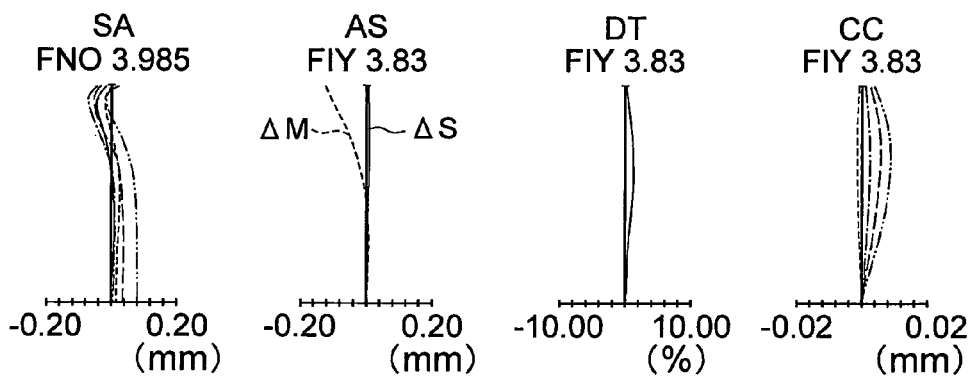
Figure 18C:
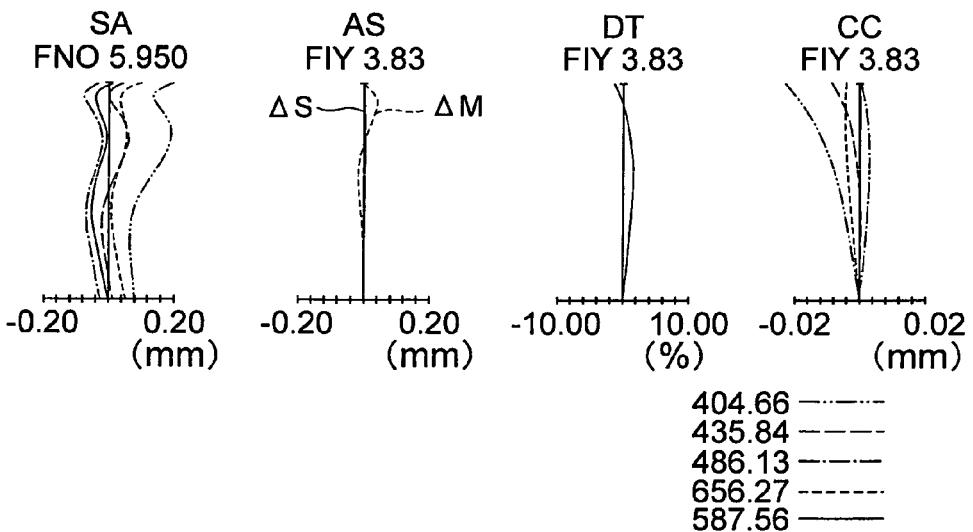

FIG. 18A, FIG. 18B, and FIG. 18C are diagrams showing a spherical aberration, an astigmatism, a distortion, and a chromatic aberration of magnification at the time of infinite object point focusing of the zoom lens according to the ninth embodiment, where, FIG. 18A shows a state at the wide angle end, FIG. 18B shows an intermediate focal state, and FIG. 18C shows a state at the telephoto end.

The zoom lens of the ninth embodiment, as shown in FIG. 17A, FIG. 17B, and FIG. 17C, includes in order from an object side, a first lens group G1 having a positive refracting power, a second lens group G2 having a negative refracting power, an aperture stop S, a third lens group G3 having a positive refracting power, a fourth lens group G4 having a positive refracting power, and a fifth lens group G5 having a positive refracting power.

The first lens group G1 includes in order from the object side, a cemented lens of a negative meniscus lens L1 having a convex surface directed toward the object side and a biconvex positive lens L2, and has a positive refracting power as a whole.

The second lens group G2 includes in order from the object side, a negative meniscus lens L3 having a convex surface directed toward the object side, a cemented lens of a biconcave negative lens L4, a positive meniscus lens L5 having a convex surface directed toward the object side, and a negative meniscus lens L6 having a convex surface directed toward the object side, and a positive meniscus lens L7 having a convex surface directed toward the object side, and has a negative refracting power as a whole.

The biconcave negative lens L4 corresponds to the lens LA, the positive meniscus lens L5 corresponds to the lens LB, and the negative meniscus lens L6 corresponds to the lens LC. Moreover, a glass material A is used for the lens LA and the lens LC, and a glass material B is used for the lens LB.

The third lens group G3 includes in order from the object side, a biconvex positive lens L8, a cemented lens of a positive meniscus lens L9 having a convex surface directed toward the object side and a negative meniscus lens L10 having a convex surface directed toward the object side, and has a positive refracting power as a whole.

The fourth lens group G4 includes a positive meniscus lens L11 having a convex surface directed toward the object side, and has a positive refracting power as a whole.

The fifth lens group G5 includes a positive meniscus lens L12 having a convex surface directed toward an image side, and has a positive refracting power as a whole.

At the time of zooming from the wide angle end to the telephoto end, the first lens group G1 moves toward the object side. The second lens group G2, after moving toward the image side, moves toward the object side. The third lens group G3 moves toward the object side. The fourth lens group G4 after moving toward the object side, moves toward the image side. The fifth lens group G5 is fixed. The aperture stop S moves along with the third lens group G3.

An aspheric surface is provided to seven surfaces namely, a surface on the image side of the biconvex positive lens L2 in the first lens group G1, both surfaces of the biconcave negative lens L4 and a surface on the image side of the negative meniscus lens L6 on the image side in the second lens group G2, both surfaces of the biconvex positive lens L8 in the third lens group G3, and a surface on the object side of the positive meniscus lens L12 in the fifth lens group G5.

Figure 19A:
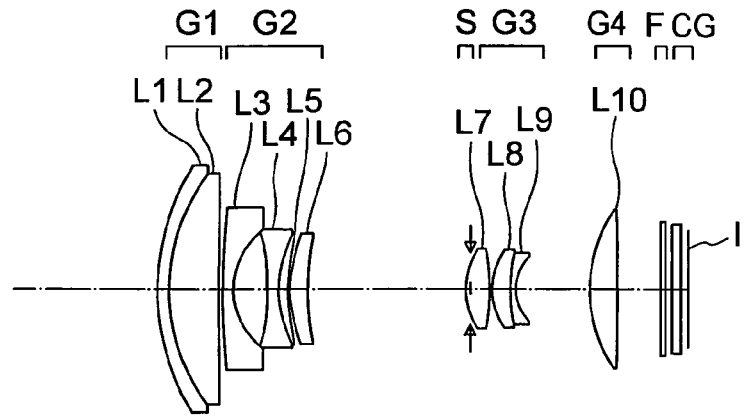
FIG. 19A, FIG. 19B, and FIG. 19C are cross-sectional views along an optical axis showing an optical arrangement at the time of infinite object point focusing of a zoom lens according to a tenth embodiment of the present invention, where.
Figure 19B:
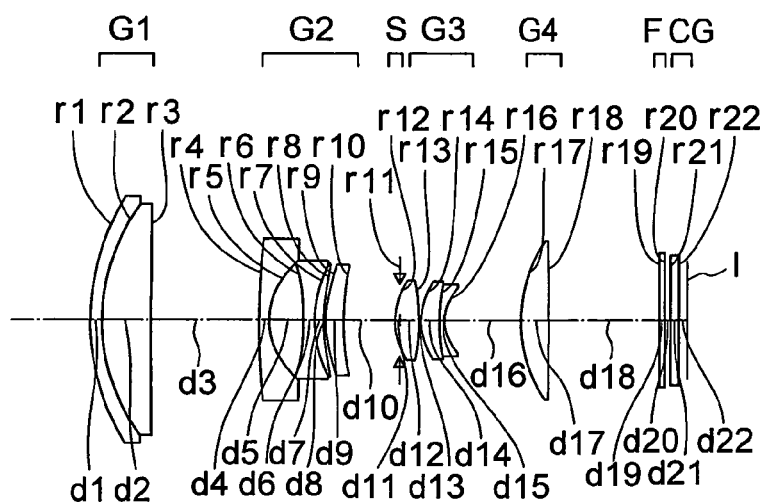
Figure 19C:
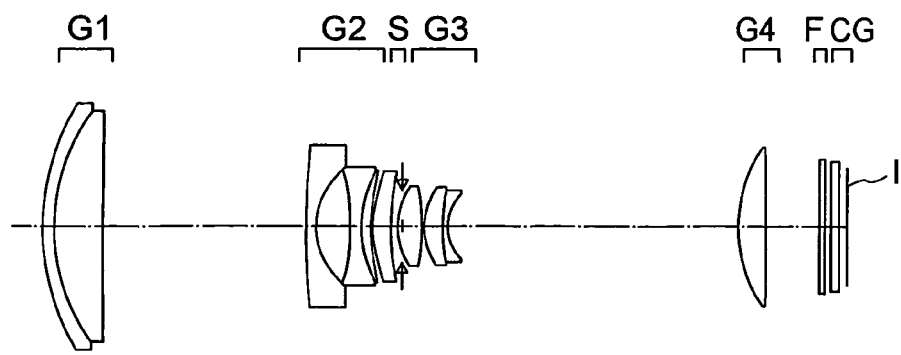

Next, a zoom lens according to a tenth embodiment of the present invention will be described below. FIG. 19A, FIG. 19B, and FIG. 19C are cross-sectional views along an optical axis showing an optical arrangement at the time of infinite object point focusing of the zoom lens according to the tenth embodiment of the present invention, where, FIG. 19A shows a state at a wide angle end, FIG. 19B shows an intermediate focal length state, and FIG. 19C shows a state at a telephoto end.

Figure 20A:
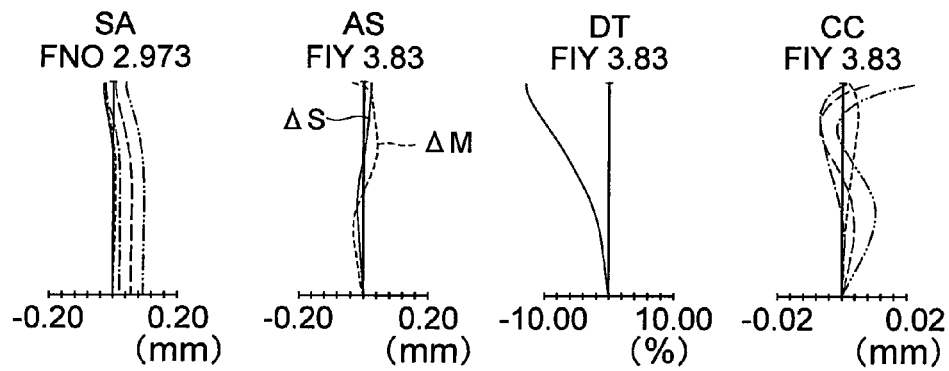
FIG. 20A, FIG. 20B, and FIG. 20C are diagrams showing a spherical aberration, an astigmatism, a distortion, and a chromatic aberration of magnification at the time of infinite object point focusing of the zoom lens according to the tenth embodiment, where.
Figure 20B:
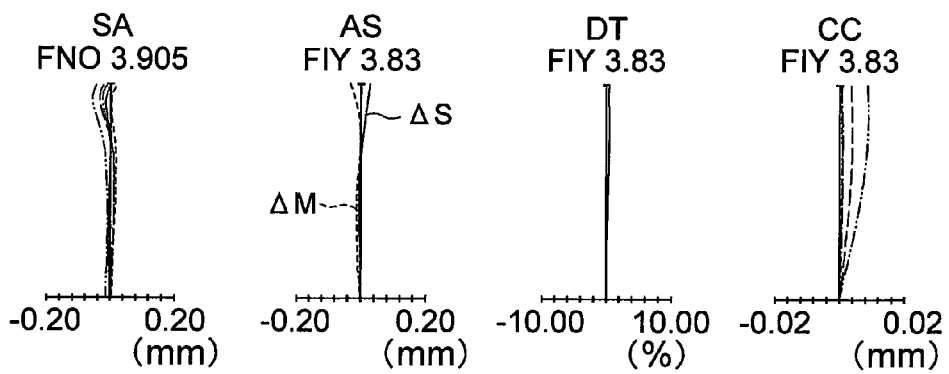
Figure 20C:
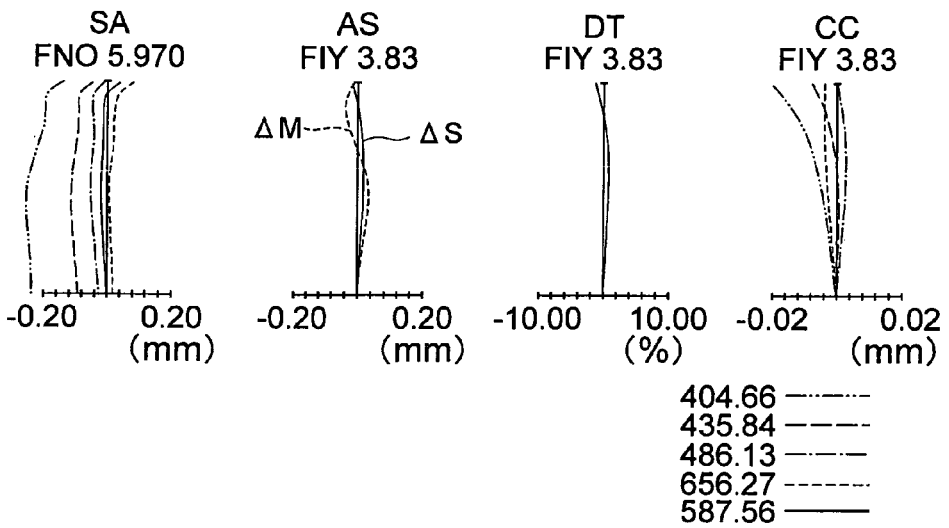

FIG. 20A, FIG. 20B, and FIG. 20C are diagrams showing a spherical aberration, an astigmatism, a distortion, and a chromatic aberration of magnification at the time of infinite object point focusing of the zoom lens according to the tenth embodiment, where, FIG. 20A shows a state at the wide angle end, FIG. 20B shows an intermediate focal length state, and FIG. 20C shows a state at the telephoto end.

The zoom lens of the tenth embodiment, as shown in FIG. 19A, FIG. 19B, and FIG. 19C, includes in order from an object side, a first lens group G1 having a positive refracting power, a second lens group G2 having a negative refracting power, an aperture stop S, a third lens group G3 having a positive refracting power, and a fourth lens group G4 having a positive refracting power.

The first lens group G1 includes in order from the object side, a cemented lens of a negative meniscus lens L1 having a convex surface directed toward the object side and a biconvex positive lens L2, and has a positive refracting power as a whole.

The second lens group G2 includes in order from the object side, a negative meniscus lens L3 having a convex surface directed toward the object side, a cemented lens of the biconcave negative lens L4 and a positive meniscus lens L5 having a convex surface directed toward the object side, and a positive meniscus lens L6 having a convex surface directed toward the object side, and has a negative refracting power as a whole.

The biconcave negative lens L4 corresponds to the lens LA and the positive meniscus lens L5 corresponds to the lens LB. Moreover, a glass material A is used for the lens LA and a glass material D is used for the lens LB.

The third lens group G3 includes in order from the object side, a biconvex positive lens L7 and a cemented lens of a positive meniscus lens L8 having a convex surface directed toward the object side and a negative meniscus lens L9 having a convex surface directed toward the object side, and has a positive refracting power as a whole.

The fourth lens group G4 includes a positive meniscus lens L10 having a convex surface directed toward the object side, and has a positive refracting power as a whole.

At the time of zooming from the wide angle end to the telephoto end, the first lens group G1 moves toward the object side. The second lens group G2, after moving toward an image side, moves toward the object side. The third lens group G3 moves toward the object side. The fourth lens group G4, after moving toward the object side, moves toward the image side. The aperture stop S moves along with the third lens group G3.

An aspheric surface is provided to seven surfaces namely, a surface on the image side of the biconvex positive lens L2 in the first lens group G1, three surfaces of the cemented lens in the second lens group G2, both surfaces of the biconvex positive lens L7 in the third lens group G3, and a surface on the object side of the positive meniscus lens L10 in the fourth lens group G4.

Figure 21A:
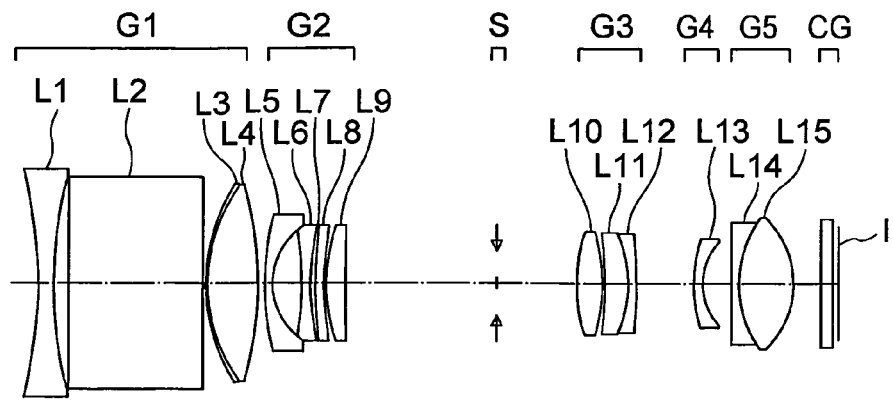
FIG. 21A, FIG. 21B, and FIG. 21C are cross-sectional views along an optical axis showing an optical arrangement at the time of infinite object point focusing of a zoom lens according to an eleventh embodiment of the present invention, where.
Figure 21B:
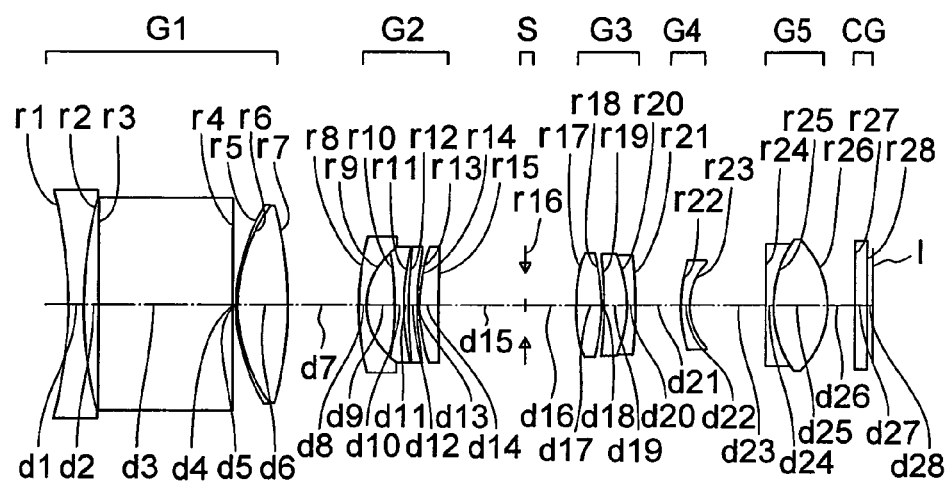
Figure 21C:
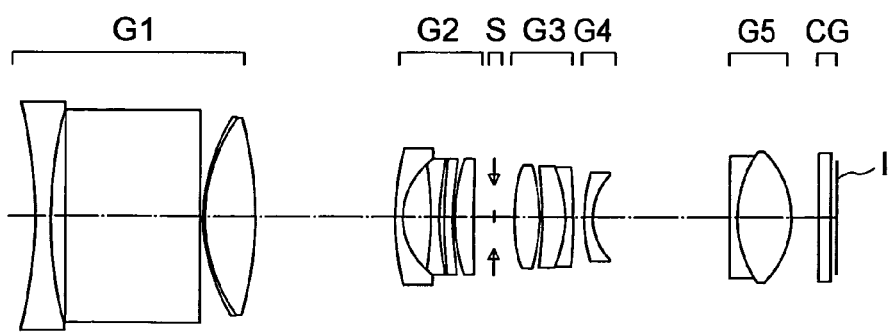

Next, a zoom lens according to an eleventh embodiment of the present invention will be described below. FIG. 21A, FIG. 21B, and FIG. 21C are cross-sectional views along an optical axis showing an optical arrangement at the time of infinite object point focusing of the zoom lens according to the eleventh embodiment of the present invention, where, FIG. 21A shows a state at a wide angle end, FIG. 21B shows an intermediate focal length state, and FIG. 21C shows a state at a telephoto end.

Figure 22A:
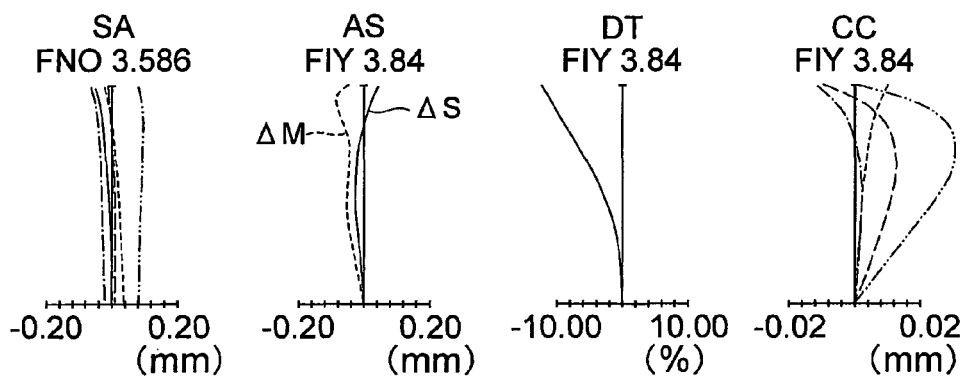
FIG. 22A, FIG. 22B, and FIG. 22C are diagrams showing a spherical aberration, an astigmatism, a distortion, and a chromatic aberration of magnification at the time of infinite object point focusing of the zoom lens according to the eleventh embodiment, where.
Figure 22B:
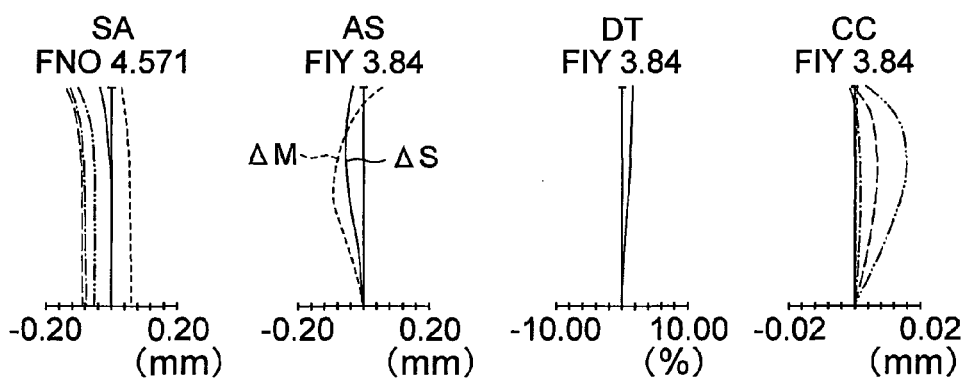
Figure 22C:
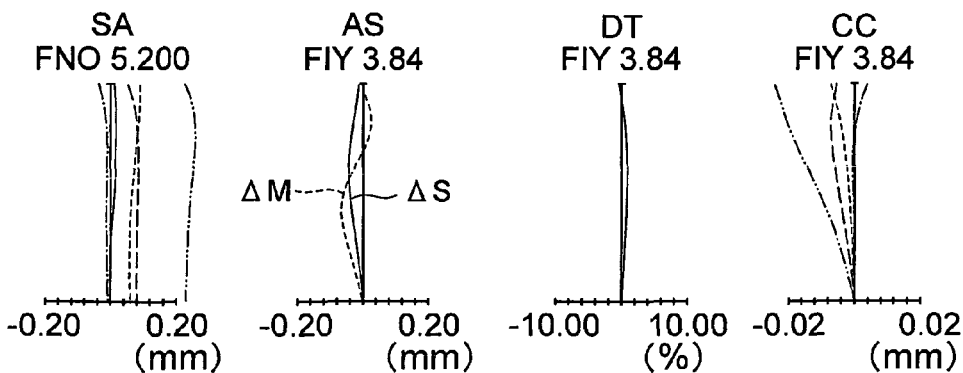

FIG. 22A, FIG. 22B, and FIG. 22C are diagrams showing a spherical aberration, an astigmatism, a distortion, and a chromatic aberration of magnification at the time of infinite object point focusing of the zoom lens according to the eleventh embodiment, where, FIG. 22A shows a state at the wide angle end, FIG. 22B shows an intermediate focal length state, and FIG. 22C shows a state at the telephoto end.

The zoom lens of the eleventh embodiment, as shown in FIG. 21A, FIG. 21B, and FIG. 21C, includes in order from an object side, a first lens group G1 having a positive refracting power, a second lens group G2 having a negative refracting power, an aperture stop S, a third lens group G3 having a positive refracting power, a fourth lens group G4 having a negative refracting power, and a fifth lens group G5 having a positive refracting power.

The first lens group G1 includes in order from the object side, a biconcave negative lens L1, a prism L2, and a cemented lens of a positive meniscus lens L3 having a convex surface directed toward the object side and a biconvex positive lens L4, and has a positive refracting power as a whole.

The second lens group G2 includes in order from the object side, a negative meniscus lens L5 having a convex surface directed toward the object side, a cemented lens of a biconcave negative lens L6, a positive meniscus lens L7 having a convex surface directed toward the object side, and a negative meniscus lens L8 having a convex surface directed toward the object side, and a positive meniscus lens L9 having a convex surface directed toward the object side, and has a negative refracting power as a whole.

The biconcave negative lens L6 corresponds to the lens LA, the positive meniscus lens L7 corresponds to the lens LB, and the negative meniscus lens L8 corresponds to the lens LC. Moreover, a glass material A is used for the lens LA and the lens LC, and a glass material B is used for the lens LB.

The third lens group G3 includes in order from the object side, a biconvex positive lens L10 and a cemented lens of a positive meniscus lens L11 having a convex surface directed toward an image side and a negative meniscus lens L12 having a convex surface directed toward the image side, and has a positive refracting power as a whole.

The fourth lens group G4 includes a negative meniscus lens L13 having a convex surface directed toward the object side, and has a negative refracting power as a whole.

The fifth lens group G5 includes a cemented lens of a biconcave negative lens L14 and a biconvex positive lens L15, and has a positive refracting power as a whole.

At the time of zooming from the wide angle end to the telephoto end, the first lens group G1 moves toward the object side. The second lens group G2 moves toward the image side. The third lens group G3 moves toward the object side. The fourth lens group G4 moves toward the object side. The fifth lens group G5 is fixed. The aperture stop S is fixed.

An aspheric surface is provided to ten surfaces namely, both surfaces of the biconcave negative lens L1 and three surfaces of the cemented lens in the first lens group G1, a surface on the object side of the biconcave negative lens L6 and a surface on the image side of the negative meniscus lens L8 on the image side in the second lens group G2, both surfaces of the biconvex positive lens L10 in the third lens group G3, and a surface on the image side of the biconvex positive lens L15 in the fifth lens group G5.

Figure 23A:
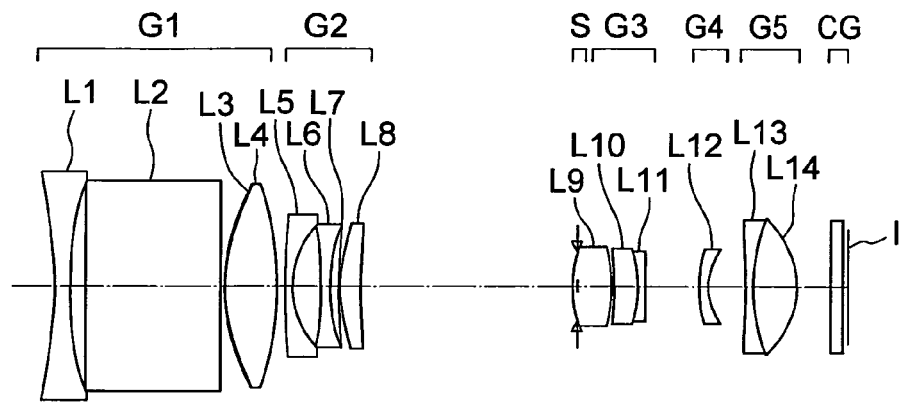
FIG. 23A, FIG. 23B, and FIG. 23C are cross-sectional views along an optical axis showing an optical arrangement at the time of infinite object point focusing of a zoom lens according to a twelfth embodiment of the present invention, where.
Figure 23B:
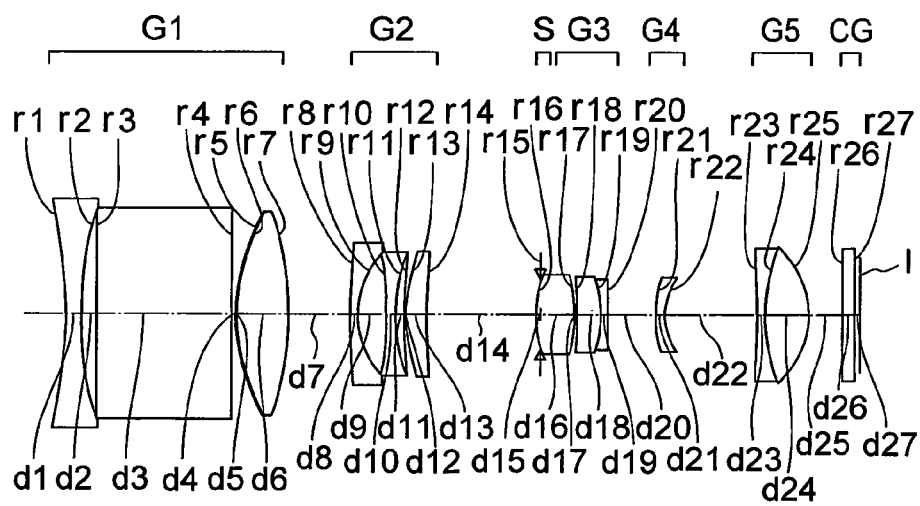
Figure 23C:
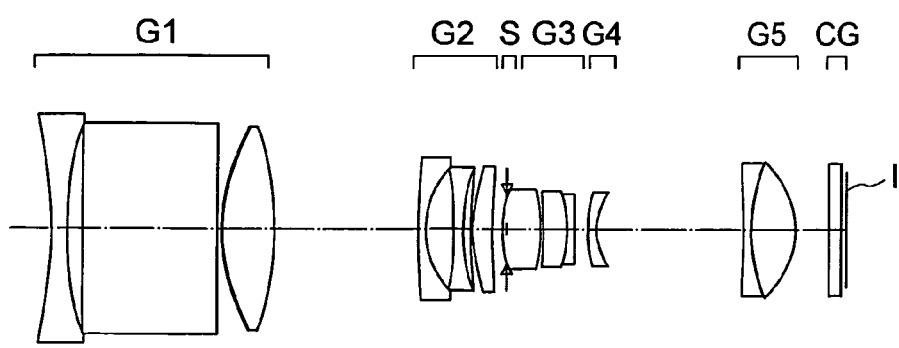

Next, a zoom lens according to a twelfth embodiment of the present invention will be described below. FIG. 23A, FIG. 23B, and FIG. 23C are cross-sectional views along an optical axis showing an optical arrangement at the time of infinite object point focusing of the zoom lens according to the twelfth embodiment of the present invention, where, FIG. 23A shows a state at a wide angle end, FIG. 23B shows an intermediate focal length state, and FIG. 23C shows a state at a telephoto end.

Figure 24A:
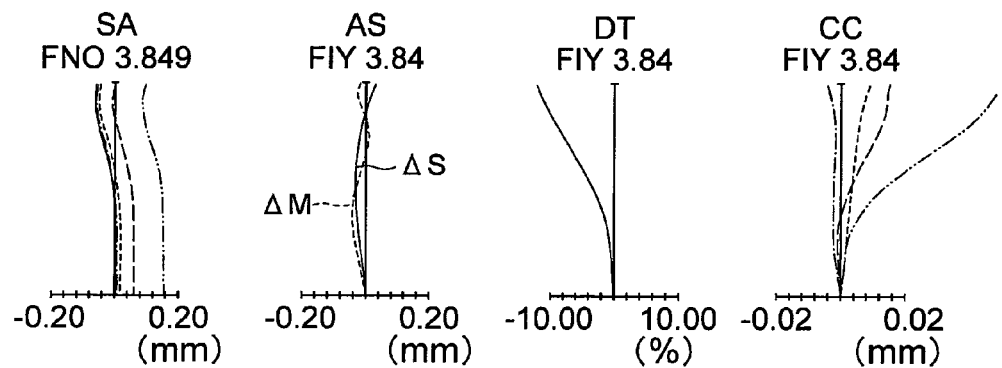
FIG. 24A, FIG. 24B, and FIG. 24C are diagrams showing a spherical aberration, an astigmatism, a distortion, and a chromatic aberration of magnification at the time of infinite object point focusing of the zoom lens according to the twelfth embodiment, where.
Figure 24B:
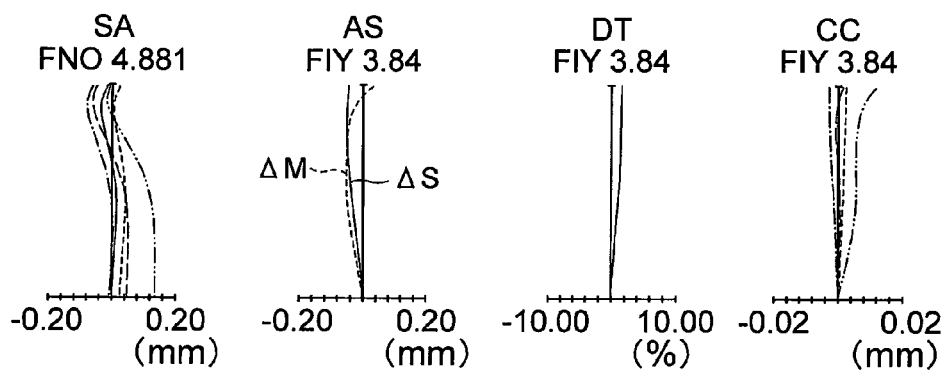
Figure 24C:
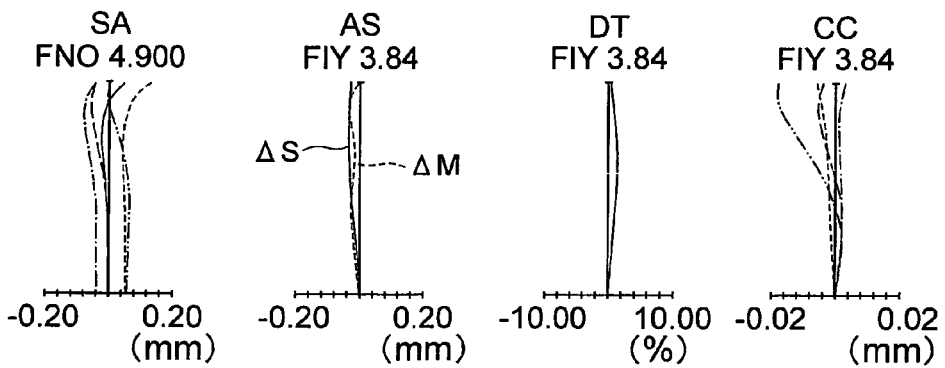

FIG. 24A, FIG. 24B, and FIG. 24C are diagrams showing a spherical aberration, an astigmatism, a distortion, and a chromatic aberration of magnification at the time of infinite object point focusing of the zoom lens according to the twelfth embodiment, where, FIG. 24A shows a state at the wide angle end, FIG. 24B shows an intermediate focal length state, and FIG. 24C shows a state at the telephoto end.

The zoom lens of the twelfth embodiment, as shown in FIG. 23A, FIG. 23B, and FIG. 23C, includes in order from an object side, a first lens group G1 having a positive refracting power, a second lens group G2 having a negative refracting power, an aperture stop S, a third lens group G3 having a positive refracting power, a fourth lens group G4 having a negative refracting power, and a fifth lens group G5 having a positive refracting power.

The first lens group G1 includes in order from the object side, a biconcave negative lens L1, a prism L2, and a cemented lens of a positive meniscus lens L3 having a convex surface directed toward the object side and a biconvex positive lens L4, and has a positive refracting power as a whole.

The second lens group G2 includes in order from the object side, a negative meniscus lens L5 having a convex surface directed toward the object side, a cemented lens of a biconcave negative lens L6 and a positive meniscus lens L7 having a convex surface directed toward the object side, and a positive meniscus lens L8 having a convex surface directed toward the object side, and has a negative refracting power as a whole.

The biconcave negative lens L6 corresponds to the lens LA and the positive meniscus lens L7 corresponds to the lens LB. Moreover, a glass material A is used for the lens LA and a glass material D is used for the lens LB.

The third lens group G3 includes in order from the object side, a biconvex positive lens L9 and a cemented lens of a positive meniscus lens L10 having a convex surface directed toward an image side and a negative meniscus lens L11 having a convex surface directed toward the image side, and has a positive refracting power as a whole.

The fourth lens group G4 includes a negative meniscus lens L12 having a convex surface directed toward the object side, and has a negative refracting power as a whole.

The fifth lens group G5 includes a cemented lens of a biconcave negative lens L13 and a biconvex positive lens L14, and has a positive refracting power as a whole.

At the time of zooming from the wide angle end to the telephoto end, the first lens group G1 is fixed. The second lens group G2 moves toward the image side. The third lens group G3 moves toward the object side. The fourth lens group G4 moves toward the object side. The fifth lens group G5, after moving toward the image side, moves toward the object side. The aperture stop S moves along with the third lens group G3.

An aspheric surface is provided to 11 surfaces namely, both surfaces of the biconcave negative lens L1 and three surfaces of the cemented lens in the first lens group G1, three surfaces of the cemented lens in the second lens group G2, both surfaces of the biconvex positive lens L9 in the third lens group G3, and a surface on the image side of the biconvex positive lens L14 in the fifth lens group G5.

Figure 25A:
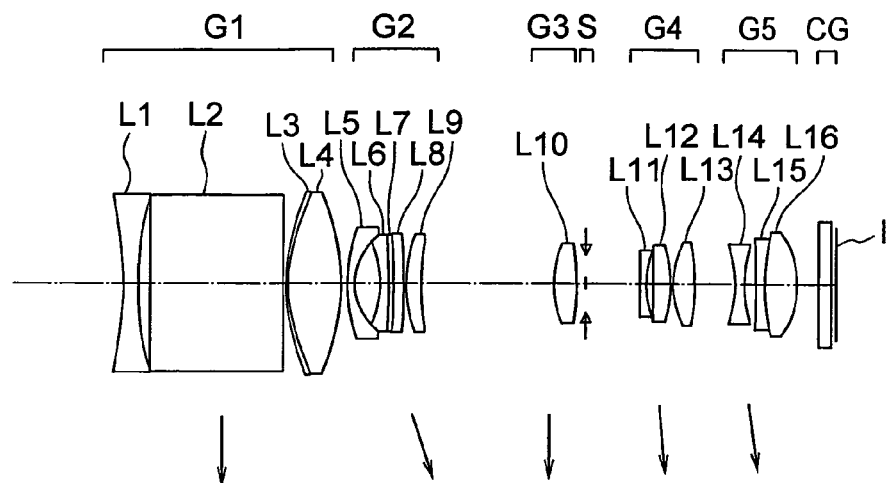
FIG. 25A, FIG. 25B, and FIG. 25C are cross-sectional views along an optical axis showing an optical arrangement at the time of infinite object point focusing of a zoom lens according to a thirteenth embodiment of the present invention, where.
Figure 25B:
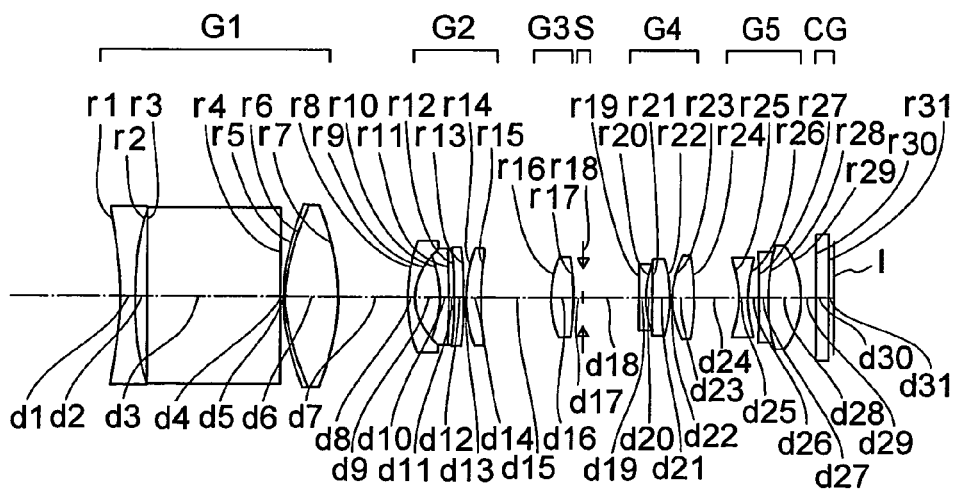
Figure 25C:
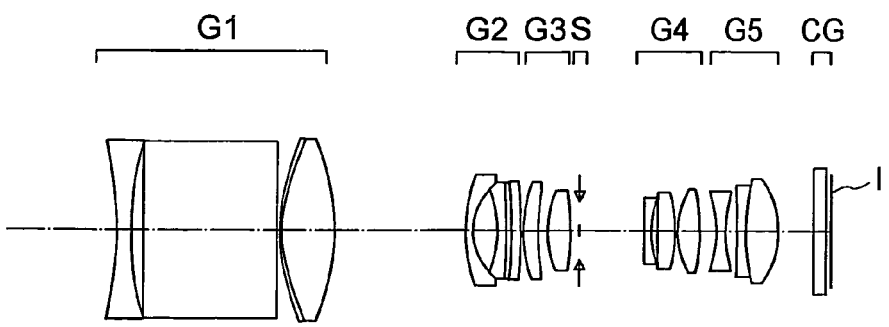

Next, a zoom lens according to a thirteenth embodiment of the present invention will be described below. FIG. 25A, FIG. 25B, and FIG. 25C are cross-sectional views along an optical axis showing an optical arrangement at the time of infinite object point focusing of the zoom lens according to the thirteenth embodiment of the present invention, where, FIG. 25A shows a state at a wide angle end, FIG. 25B shows an intermediate focal length state, and FIG. 25C shows a state at a telephoto end.

Figure 26A:
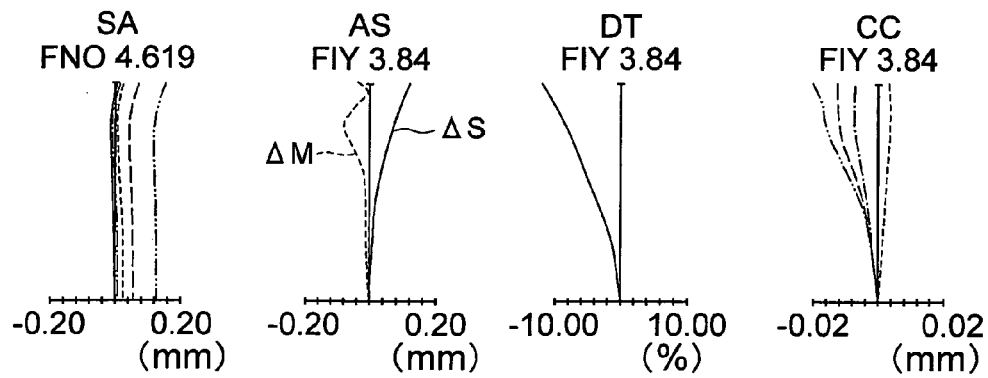
FIG. 26A, FIG. 26B, and FIG. 26C are diagrams showing a spherical aberration, an astigmatism, a distortion, and a chromatic aberration of magnification at the time of infinite object point focusing of the zoom lens according to the thirteenth embodiment, where.
Figure 26B:
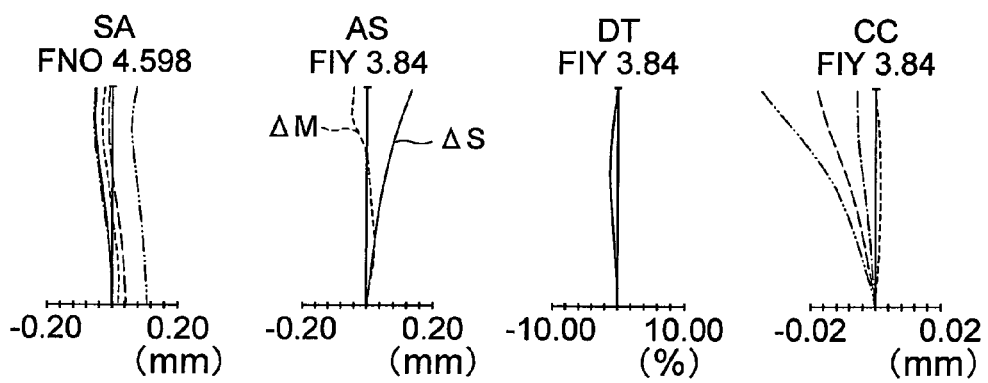
Figure 26C:
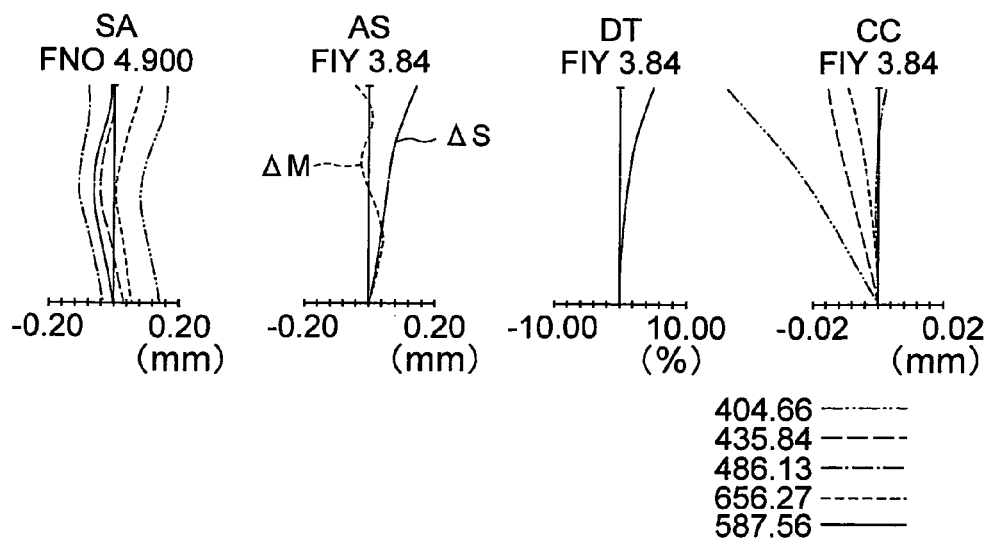

FIG. 26A, FIG. 26B, and FIG. 26C are diagrams showing a spherical aberration, an astigmatism, a distortion, and a chromatic aberration of magnification at the time of infinite object point focusing of the zoom lens according to the thirteenth embodiment, where, FIG. 26A shows a state at the wide angle end, FIG. 26B shows an intermediate focal length state, and FIG. 26C shows a state at the telephoto end.

The zoom lens of the thirteenth embodiment, as shown in FIG. 25A, FIG. 25B, and FIG. 25C, includes in order from an object side, a first lens group G1 having a positive refracting power, a second lens group G2 having a negative refracting power, a third lens group G3 having a positive refracting power, an aperture stop S, a fourth lens group G4 having a positive refracting power, and a fifth lens group G5 having a negative refracting power.

The first lens group G1 includes in order from the object side, a biconcave negative lens L1, a prism L2, and a cemented lens of a negative meniscus lens L3 having a convex surface directed toward the object side and a biconvex positive lens L4, and has a positive refracting power as a whole.

The second lens group G2 includes in order from the object side, a negative meniscus lens L5 having a convex surface directed toward the object side, a cemented lens of a negative meniscus lens L6 having a convex surface directed toward an image side, a positive meniscus lens L7 having a convex surface directed toward the image side, and a negative meniscus lens L8 having a convex surface directed toward the image side, and a positive meniscus lens L9 having a convex surface directed toward the object side, and has a negative refracting power as a whole.

The negative meniscus lens L6 corresponds to the lens LA, the positive meniscus lens L7 corresponds to the lens LB, and the negative meniscus lens L8 corresponds to the lens LC. Moreover, a glass material A is used for the lens LA and the lens LC, and a glass material D is used for the lens LB.

The third lens group G3 includes in order from the object side, a biconvex positive lens L10, and has a positive refracting power as a whole.

The fourth lens group G4 includes a biconcave negative lens L11, a biconvex positive lens L12, and a biconvex positive lens L13, and has a positive refracting power as a whole.

The fifth lens group G5 includes a biconcave negative lens L14 and a cemented lens of a biconcave negative lens L15 and a biconvex positive lens L16, and has a negative refracting power as a whole.

At the time of zooming from the wide angle end to the telephoto end, the first lens group G1 moves toward the object side. The second lens group G2 moves toward the image side. The third lens group G3 moves toward the object side. The fourth lens group G4 moves toward the image side. The fifth lens group G5, after moving toward the image side, moves toward the object side. The aperture stop S is fixed.

An aspheric surface is provided to ten surfaces namely, both surfaces of the biconcave negative lens L1 and three surfaces of the cemented lens in the first lens group G1, a surface on the object side of the negative meniscus lens L6 which is second from the object side and both surfaces of the negative meniscus lens L8 nearest to the image side in the second lens group G2, a surface on the object side of the biconvex positive lens L10 in the third lens group G3, and a surface on the image side of the biconvex positive lens L13 nearest to the image side in the fourth lens group G4.

Figure 27A:
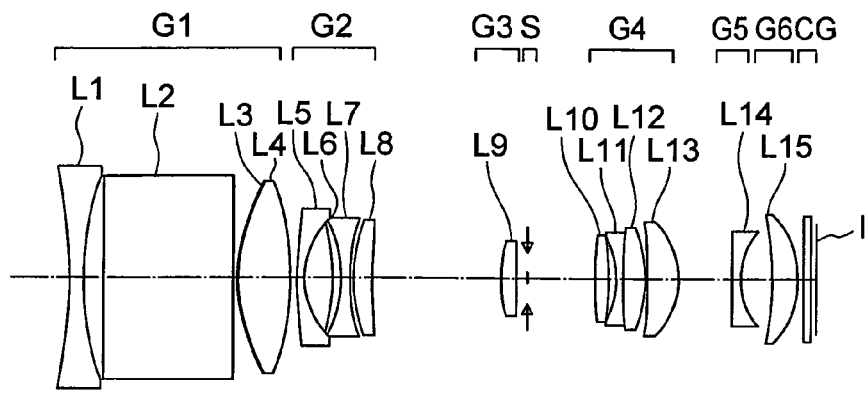
FIG. 27A, FIG. 27B, and FIG. 27C are cross-sectional views along an optical axis showing an optical arrangement at the time of infinite object point focusing of a zoom lens according to a fourteenth embodiment of the present invention, where.
Figure 27B:
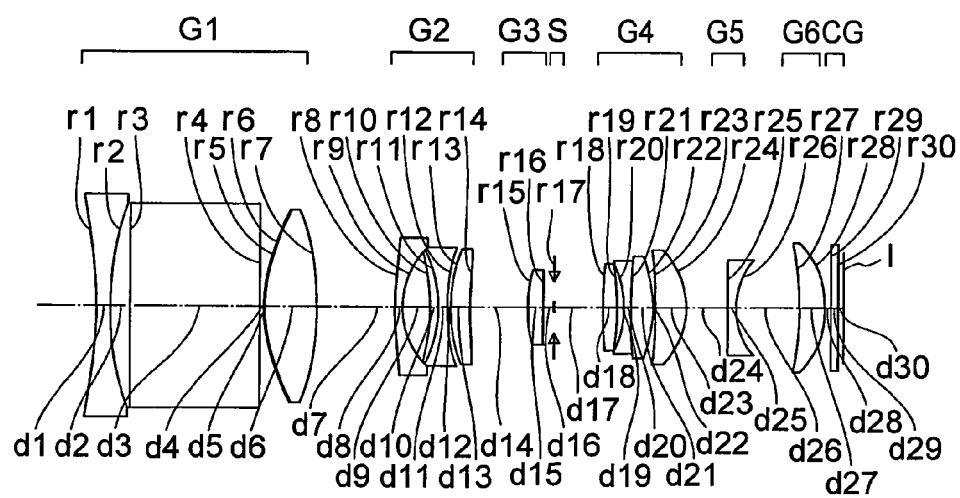
Figure 27C:
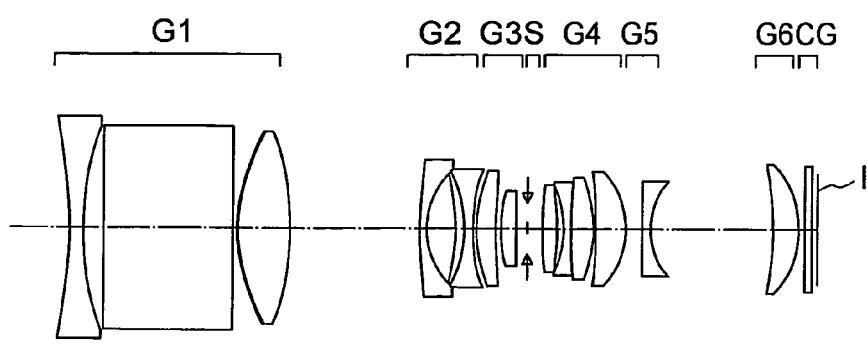

Next, a zoom lens according to a fourteenth embodiment of the present invention will be described below. FIG. 27A, FIG. 27B, and FIG. 27C are cross-sectional views along an optical axis showing an optical arrangement at the time of infinite object point focusing of the zoom lens according to the fourteenth embodiment of the present invention, where, FIG. 27A shows a state at a wide angle end, FIG. 27B shows an intermediate focal length state, and FIG. 27C shows a state at a telephoto end.

Figure 28A:
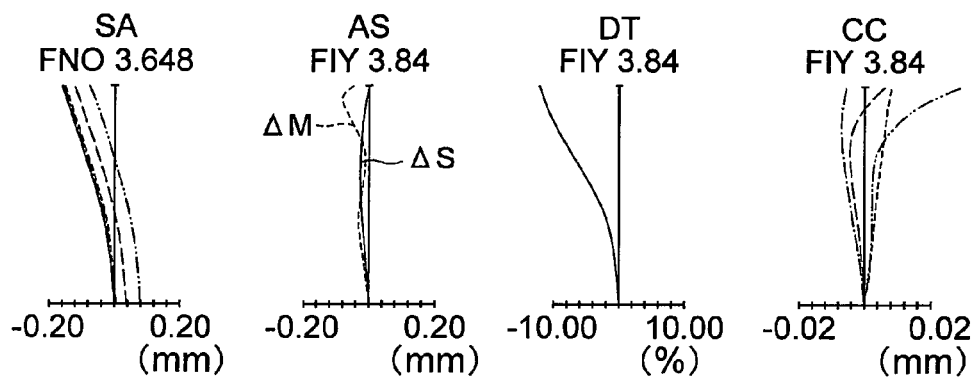
FIG. 28A, FIG. 28B, and FIG. 28C are diagrams showing a spherical aberration, an astigmatism, a distortion, and a chromatic aberration of magnification at the time of infinite object point focusing of the zoom lens according to the fourteenth embodiment, where.
Figure 28B:
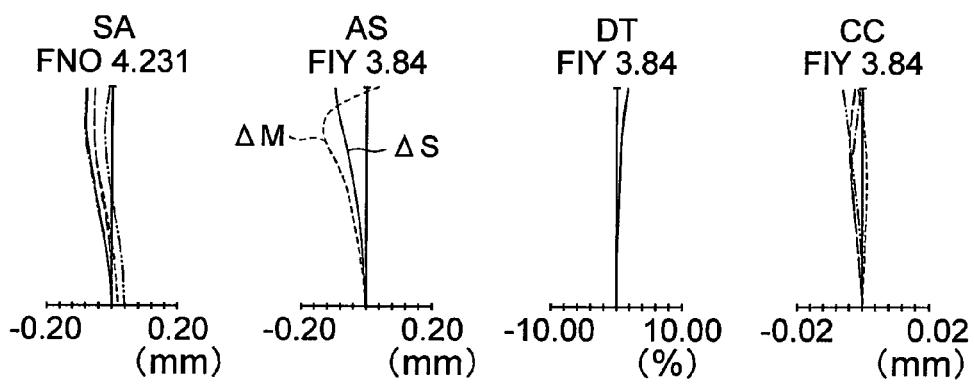
Figure 28C:
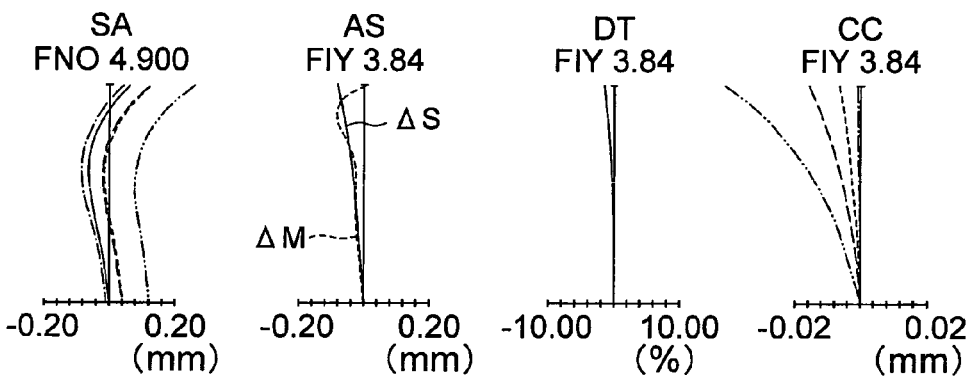

FIG. 28A, FIG. 28B, and FIG. 28C are diagrams showing a spherical aberration, an astigmatism, a distortion, and a chromatic aberration of magnification at the time of infinite object point focusing of the zoom lens according to the fourteenth embodiment, where, FIG. 28A shows a state at the wide angle end, FIG. 28B shows an intermediate focal length state, and FIG. 28C shows a state at the telephoto end.

The zoom lens of the fourteenth embodiment, as shown in FIG. 27A, FIG. 27B, and FIG. 27C, includes in order from an object side, a first lens group G1 having a positive refracting power, a second lens group G2 having a negative refracting power, a third lens group G3 having a positive refracting power, an aperture stop S, a fourth lens group G4 having a positive refracting power, a fifth lens group G5 having a negative refracting power, and a sixth lens group G6.

The first lens group G1 includes in order from the object side, a biconcave negative lens L1, a prism L2, and a cemented lens of a positive meniscus lens L3 having a convex surface directed toward the object side and a biconvex positive lens L4, and has a positive refracting power as a whole.

The second lens group G2 includes in order from the object side, a negative meniscus lens L5 having a convex surface directed toward the object side, a cemented lens of the positive meniscus lens L6 having a convex surface directed toward an image side and a biconcave negative lens L7, and a positive meniscus lens L8 having a convex surface directed toward the object side, and has a negative refracting power as a whole.

The positive meniscus lens L6 corresponds to the lens LB and the biconcave negative lens L7 corresponds to the lens LA. Moreover, a glass material A is used for the lens LA and a glass material B is used for the lens LB.

The third lens group G3 includes in order from the object side, a positive meniscus lens L9 having a convex surface directed toward the image side, and has a positive refracting power as a whole.

The fourth lens group G4 includes in order from the object side, a biconvex positive lens L10, a cemented lens of a biconcave negative lens L11 and a biconvex positive lens L12, and a biconvex positive lens L13, and has a positive refracting power as a whole.

The fifth lens group G5 includes a negative meniscus lens L14 having a convex surface directed toward the object side, and has a negative refracting power as a whole.

The sixth lens group G6 includes a positive meniscus lens L15 having a convex surface directed toward the image side, and has a positive refracting power as a whole.

At the time of zooming from the wide angle end to the telephoto end, the first lens group G1 moves toward the object side. The second lens group G2 moves toward the image side. The third lens group G3 is fixed. The fourth lens group G4 moves toward the object side. The fifth lens group G5 moves toward the object side. The sixth lens group G6 is fixed. The aperture stop S is fixed.

An aspheric surface is provided to 12 surfaces namely, both surfaces of the biconcave negative lens L1 and three surfaces of the cemented lens in the first lens group G1, three surfaces of the cemented lens in the third lens group G2, and both surfaces of the biconvex positive lens L10 nearest to the object side and both surfaces of the biconvex positive lens L13 nearest to the image side in the fourth lens group G4.

Figure 29A:
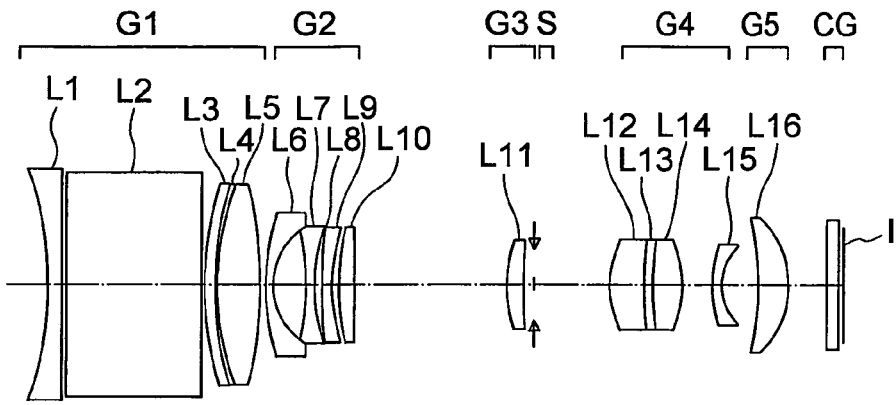
FIG. 29A, FIG. 29B, and FIG. 29C are cross-sectional views along an optical axis showing an optical arrangement at the time of infinite object point focusing of a zoom lens according to a fifteenth embodiment of the present invention, where.
Figure 29B:
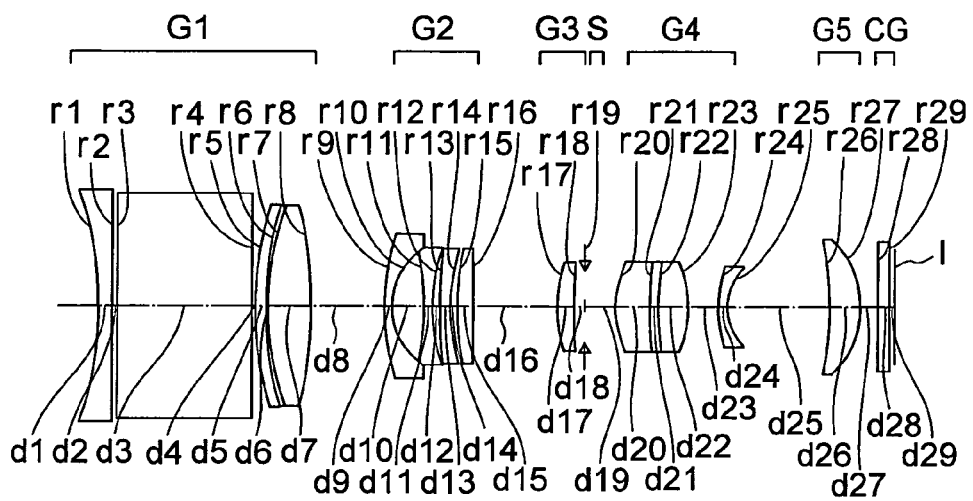
Figure 29C:
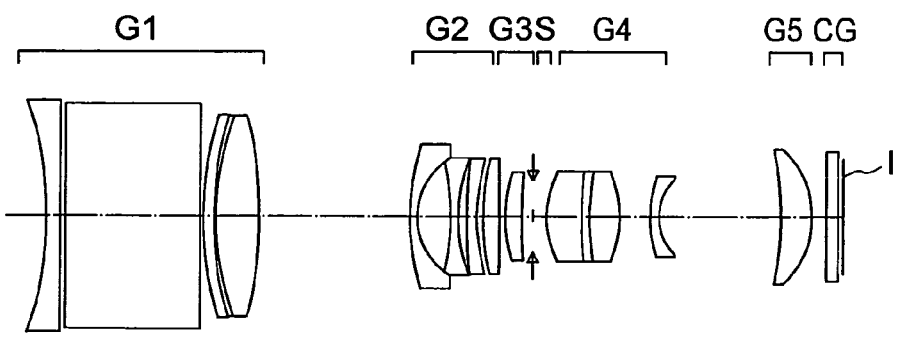

Next, a zoom lens according to a fifteenth embodiment of the present invention will be described below. FIG. 29A, FIG. 29B, and FIG. 29C are cross-sectional views along an optical axis showing an optical arrangement at, the time of infinite object point focusing of the zoom lens according to the fifteenth embodiment of the present invention, where, FIG. 29A shows a state at a wide angle end, FIG. 29B shows an intermediate focal length state, and FIG. 29C shows a state at a telephoto end.

Figure 30A:
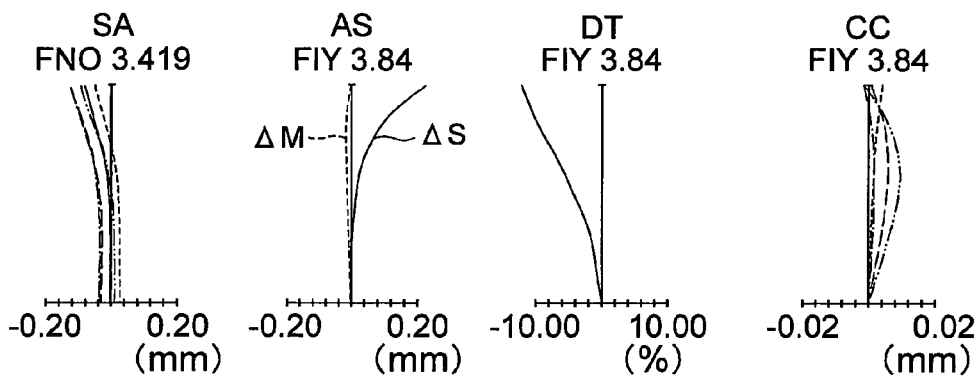
FIG. 30A, FIG. 30B, and FIG. 30C are diagrams showing a spherical aberration, an astigmatism, a distortion, and a chromatic aberration of magnification at the time of infinite object point focusing of the zoom lens according to the fifteenth embodiment, where.
Figure 30B:
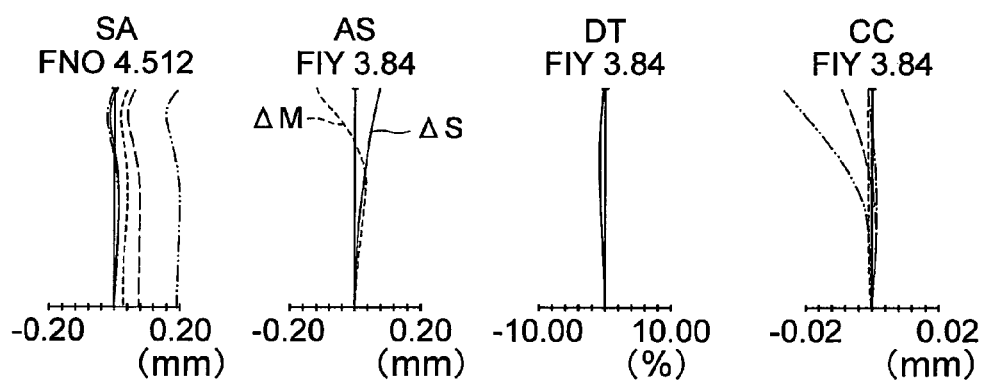
Figure 30C:
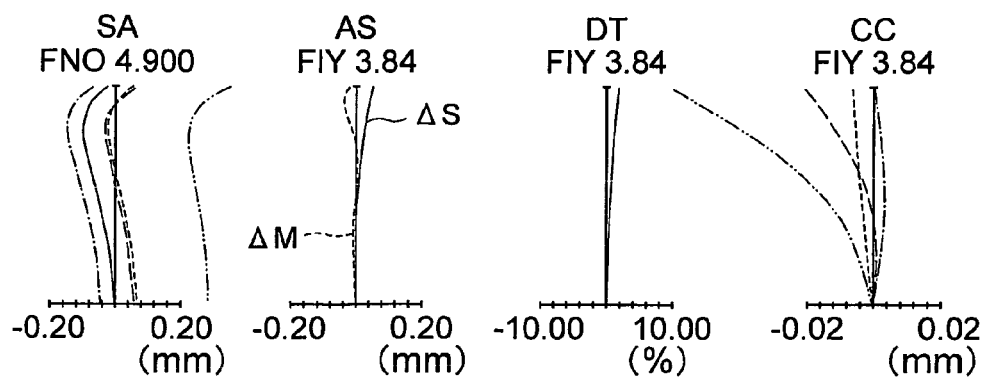

FIG. 30A, FIG. 30B, and FIG. 30C are diagrams showing a spherical aberration, an astigmatism, a distortion, and a chromatic aberration of magnification at the time of infinite object point focusing of the zoom lens according to the fifteenth embodiment, where, FIG. 30A shows a state at the wide angle end, FIG. 30B shows an intermediate focal length state, and FIG. 30C shows a state at the telephoto end.

The zoom lens of the fifteenth embodiment, as shown in FIG. 29A, FIG. 29B, and FIG. 29C, includes in order from an object side, a first lens group G1 having a positive refracting power, a second lens group G2 having a negative refracting power, a third lens group G3 having a positive refracting power, an aperture stop S, a fourth lens group G4 having a positive refracting power, and a fifth lens group G5 having a positive refracting power.

The first lens group G1 includes in order from the object side, a biconcave negative lens L1, a prism L2, and a cemented lens of a positive meniscus lens L3 having a convex surface directed toward the object side, a negative meniscus lens L4 having a convex surface directed toward the object side, and a biconvex positive lens L5, and has a positive refracting power as a whole.

The second lens group G2 includes in order from the object side, a negative meniscus lens L6 having a convex surface directed toward the object side, a cemented lens of a biconcave negative lens L7, a positive meniscus lens L8 having a convex surface directed toward the object side, and a negative meniscus lens L9 having a convex surface directed toward the object side, and a biconvex positive lens L10, and has a negative refracting power as a whole.

The biconcave negative lens L7 corresponds to the lens LA, the positive meniscus lens L8 corresponds to the lens LB, and the negative meniscus lens L9 corresponds to the lens LC. Moreover, a glass material A is used for the lens LA and the lens LC, and a glass material B is used for the lens LB.

The third lens group G3 includes in order from the object side, a positive meniscus lens L11 having a convex surface directed toward the object side, and has a positive refracting power as a whole.

The fourth lens group G4 includes in order from the object side, a cemented lens of a positive meniscus lens L12 having a convex surface directed toward the object side, a negative meniscus lens L13 having a convex surface directed toward the object side, and a biconvex positive lens L14, and a negative meniscus lens L15 having a convex surface directed toward the object side, and has a positive refracting power as a whole.

The fifth lens group G5 includes a positive meniscus lens L16 having a convex surface directed toward an image side, and has a positive refracting power as a whole.

At the time of zooming from the wide angle end to the telephoto end, the first lens group G1 is fixed. The second lens group G2 moves toward the image side. The third lens group G3 moves toward the object side. The fourth lens group G4 moves toward the object side. The fifth lens group G5 moves toward the image side. The aperture stop S is fixed.

An aspheric surface is provided to six surfaces namely, both surfaces of the positive meniscus lens L3 in the first lens group G1, a surface on the object side of the biconcave negative lens L7 and a surface on the image side of the negative meniscus lens L9 on the image side in the second lens group G2, a surface on the object side of the positive meniscus lens L12 and a surface on the image side of the biconvex positive lens L14 in the fourth lens group G4.

Figure 31A:
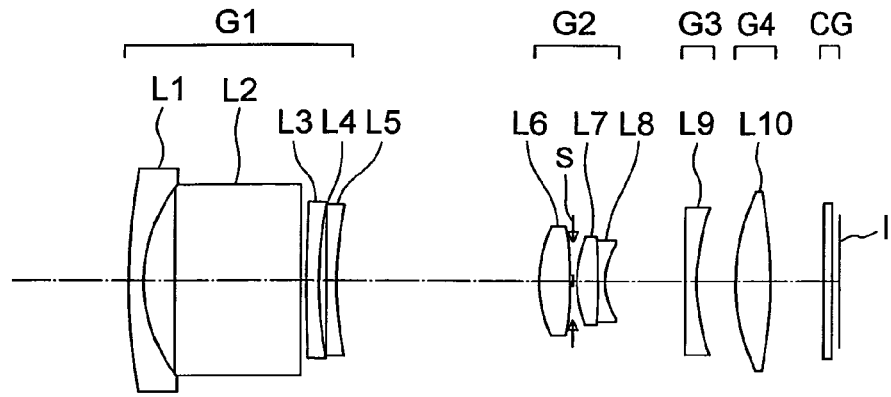
FIG. 31A, FIG. 31B, and FIG. 31C are cross-sectional views along an optical axis showing an optical arrangement at the time of infinite object point focusing of a zoom lens according to a sixteenth embodiment of the present invention, where.
Figure 31B:
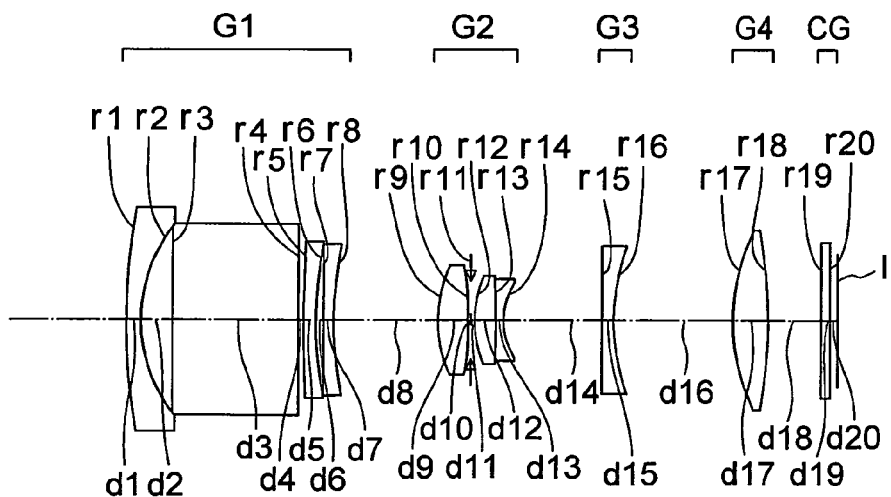
Figure 31C:
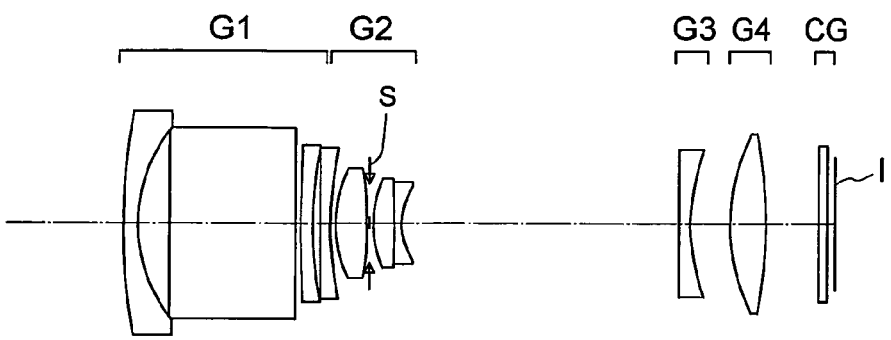

Next, a zoom lens according to a sixteenth embodiment of the present invention will be described below. FIG. 31A, FIG. 31B, and FIG. 31C are cross-sectional views along an optical axis showing an optical arrangement at the time of infinite object point focusing of the zoom lens according to the sixteenth embodiment of the present invention, where, FIG. 31A shows a state at a wide angle end, FIG. 31B shows an intermediate focal length state, and FIG. 31C shows a state at a telephoto end.

Figure 32A:
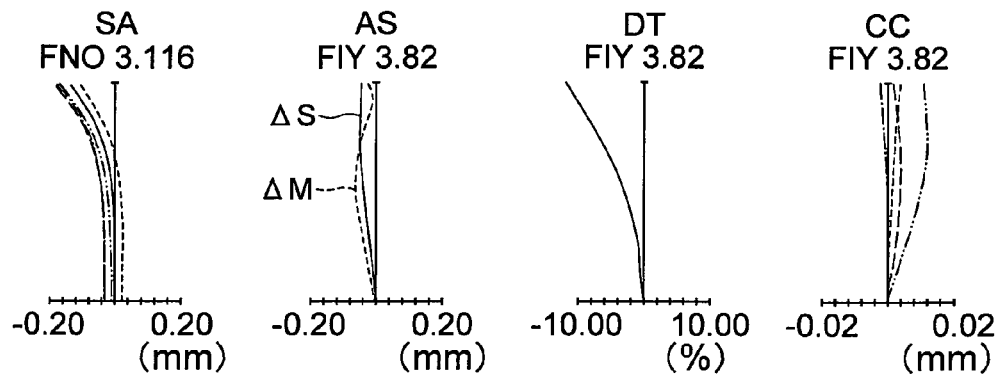
FIG. 32A, FIG. 32B, and FIG. 32C are diagrams showing a spherical aberration, an astigmatism, a distortion, and a chromatic aberration of magnification at the time of infinite object point focusing of the zoom lens according to the sixteenth embodiment, where.
Figure 32B:
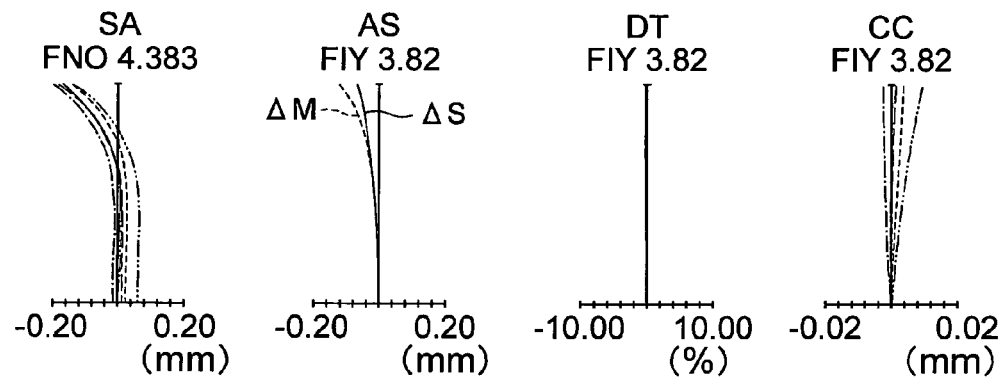
Figure 32C:
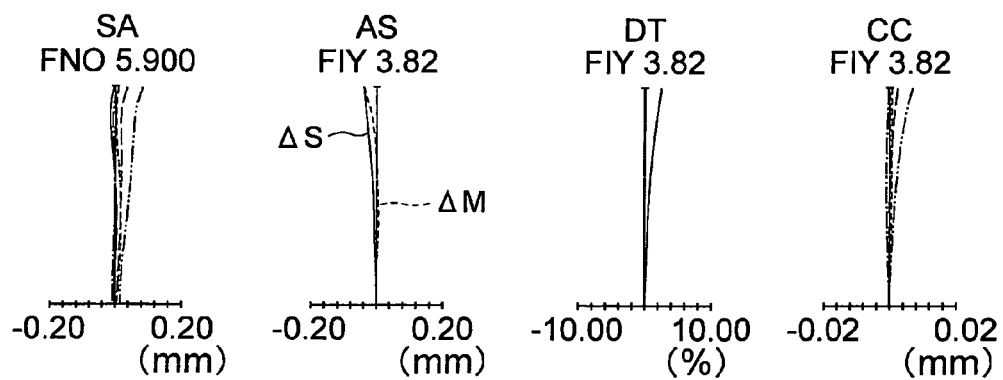

FIG. 32A, FIG. 32B, and FIG. 32C are diagrams showing a spherical aberration, an astigmatism, a distortion, and a chromatic aberration of magnification at the time of infinite object point focusing of the zoom lens according to the sixteenth embodiment, where, FIG. 32A shows a state at the wide angle end, FIG. 32B shows an intermediate focal length state, and FIG. 32C shows a state at the telephoto end.

The zoom lens of the sixteenth embodiment, as shown in FIG. 31A, FIG. 31B, and FIG. 31C, includes in order from an object side, a first lens group G1 having a negative refracting power, a second lens group G2 having a positive refracting power, a third lens group G3 having a negative refracting power, and a fourth lens group G4 having a positive refracting power.

The first lens group G1 includes in order from the object side, a negative meniscus lens L1 having a convex surface directed toward the object side, a prism L2, and a cemented lens of a negative meniscus lens L3 having a convex surface directed toward the object side, a positive meniscus lens L4 having a convex surface directed toward the object side, and a negative meniscus lens L5 having a convex surface directed toward the object side, and has a negative refracting power as a whole.

The negative meniscus lens L3 corresponds to the lens LC, a positive meniscus lens L4 corresponds to the lens LB, and a negative meniscus lens L5 corresponds to the lens LA. Moreover, a glass material A is used for the lens LA and the lens LC, and a glass material D is used for the lens LB.

The second lens group G2 includes in order from the object side, a biconvex positive lens L6 and a cemented lens of the biconvex positive lens L7 and a biconcave negative lens L8, and has a positive refracting power as a whole.

An aperture stop S is disposed between the biconvex positive lens L6 and the biconvex positive lens L7.

The third lens group G3 includes in order from the object side, a biconcave negative lens L9, and has a negative refracting power as a whole.

The fourth lens group G4 includes in order from the object side, a biconvex positive lens L10, and has a positive refracting power as a whole.

At the time of zooming from the wide angle end to the telephoto end, the first lens group G1 is fixed. The second lens group G2 moves toward the object side. The third lens group G3, after moving toward the object side, moves toward the image side. The fourth lens group G4, after moving toward the image side, moves toward the object side. The aperture stop S moves along with the second lens group G2.

An aspheric surface is provided to six surfaces namely, both surfaces of the negative meniscus lens L3 which is second from the object side and a surface on the image side of the negative meniscus lens L5 on the image side in the first lens group G1, both surfaces of the biconvex positive lens L6 in the second lens group G2, and a surface on the object side of the biconvex positive lens L10 in the fourth lens group G4.

Figure 33A:
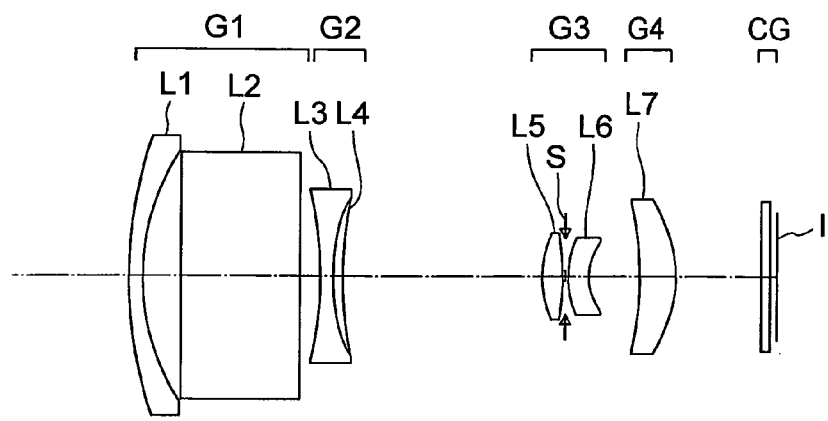
FIG. 33A, FIG. 33B, and FIG. 33C are cross-sectional views along an optical axis showing an optical arrangement at the time of infinite object point focusing of a zoom lens according to a seventeenth embodiment of the present invention, where.
Figure 33B:
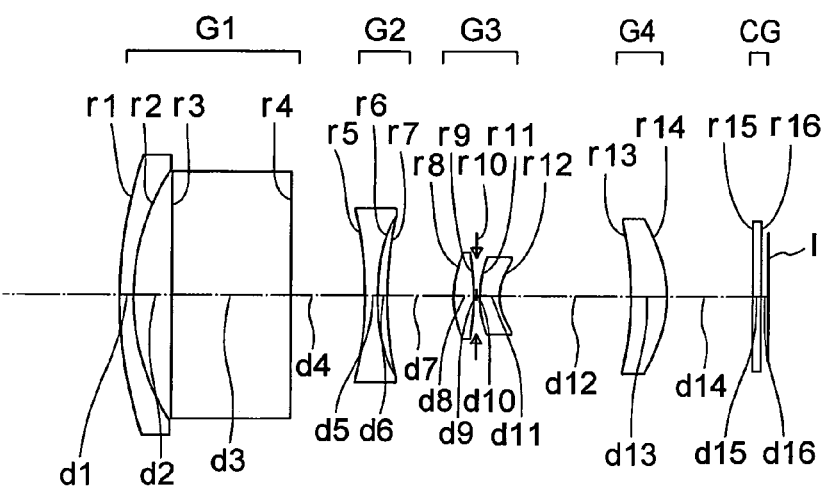
Figure 33C:
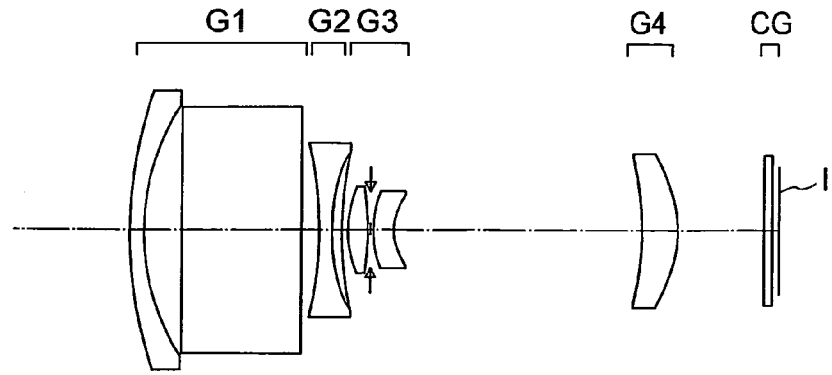

Next, a zoom lens according to a seventeenth embodiment of the present invention will be described below. FIG. 33A, FIG. 33B, and FIG. 33C are cross-sectional views along an optical axis showing an optical arrangement at the time of infinite object point focusing of the zoom lens according to the seventeenth embodiment of the present invention, where, FIG. 33A shows a state at a wide angle end, FIG. 33B shows an intermediate focal length state, and FIG. 33C shows a state at a telephoto end.

Figure 34A:
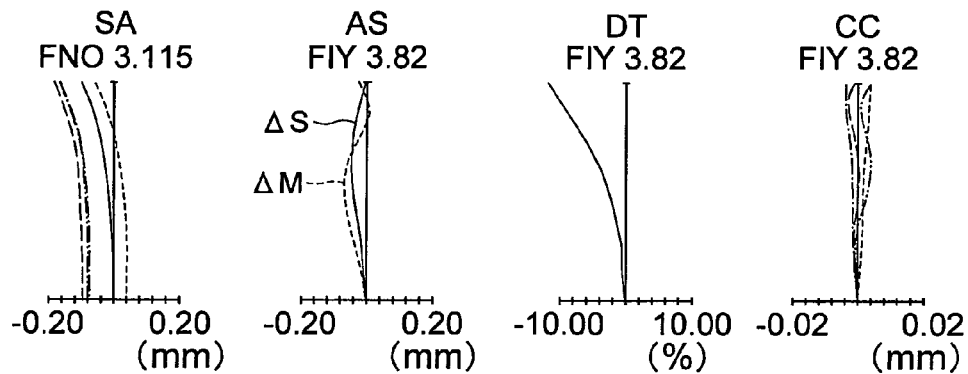
FIG. 34A, FIG. 34B, and FIG. 34C are diagrams showing a spherical aberration, an astigmatism, a distortion, and a chromatic aberration of magnification at the time of infinite object point focusing of the zoom lens according to the seventeenth embodiment, where.
Figure 34B:
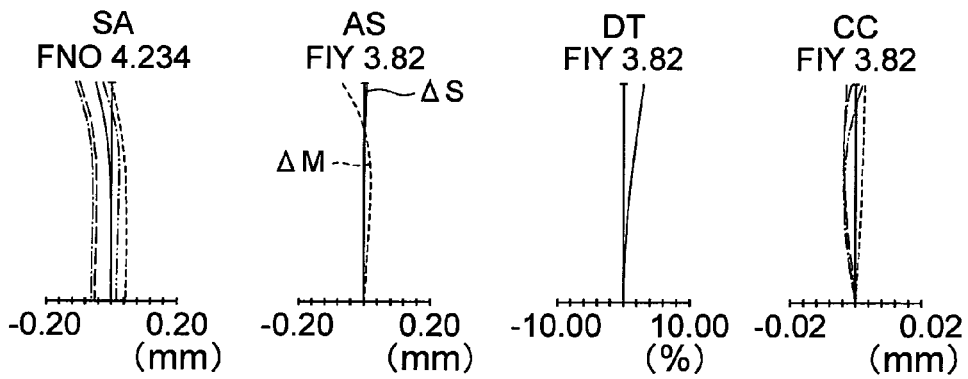
Figure 34C:
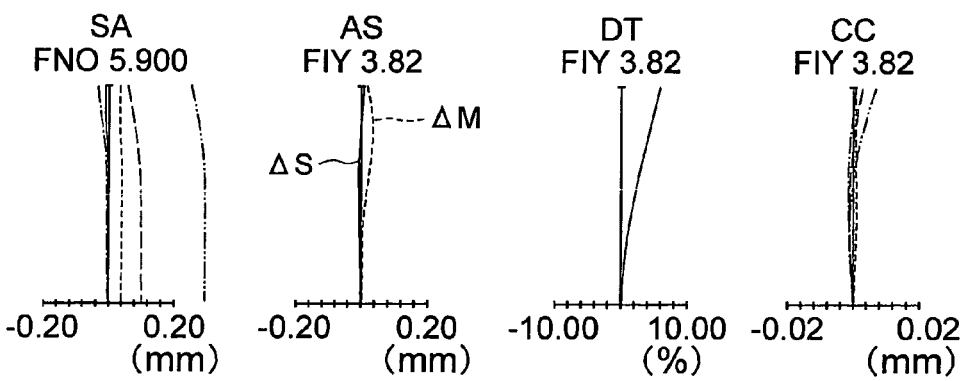

FIG. 34A, FIG. 34B, and FIG. 34C are diagrams showing a spherical aberration, an astigmatism, a distortion, and a chromatic aberration of magnification at the time of infinite object point focusing of the zoom lens according to the seventeenth embodiment, where, FIG. 34A shows a state at the wide angle end, FIG. 34B shows an intermediate focal length state, and FIG. 34C shows a state at the telephoto end.

The zoom lens of the seventeenth embodiment, as shown in FIG. 33A, FIG. 33B, and FIG. 33C, includes in order from an object side, a first lens group G1 having a negative refracting power, second lens group G2 having a negative refracting power, a third lens group G3 having a positive refracting power, and a fourth lens group G4 having a positive refracting power.

The first lens group G1 includes in order from the object side, a negative meniscus lens L1 having a convex surface directed toward the object side and a prism L2, and has a negative refracting power as a whole.

The second lens group G2 includes in order from the object side, a cemented lens of a biconcave negative lens L3 and a positive meniscus lens L4 having a convex surface directed toward the object side, and has a negative refracting power as a whole.

The biconcave negative lens L3 corresponds to the lens LA, and the positive meniscus lens L4 corresponds to the lens LB. Moreover, a glass material A is used for the lens LA and a glass material B is used for the lens LB.

The third lens group G3 includes in order from the object side, a biconvex positive lens L5 and a negative meniscus lens L6 having a convex surface directed toward the object side, and has a positive refracting power as a whole.

An aperture stop S is disposed between the biconvex positive lens L5 and the negative meniscus lens L6.

The fourth lens group G4 includes in order from the object side, a positive meniscus lens L7 having a convex surface directed toward an image side, and has a positive refracting power as a whole.

At the time of zooming from the wide angle end to the telephoto end, the first lens group G1 is fixed. The second lens group G2, after moving toward the image side, moves toward the object side. The third lens group G3 moves toward the object side. The fourth lens group G4, after moving toward the image side, moves toward the object side. The aperture stop S moves along with the third lens group G3.

An aspheric surface is provided to eight surfaces namely, three surfaces of the cemented lens in the second lens group G2, both surfaces of the biconvex positive lens L4 and both surfaces of the negative meniscus lens L6 in the third lens group G3, and a surface on the image side of the positive meniscus lens L7 in the fourth lens group G4.

Figure 35A:
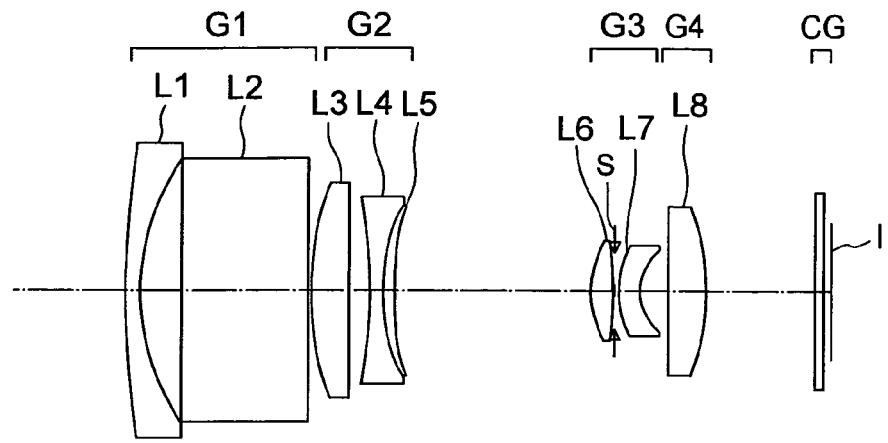
FIG. 35A, FIG. 35B, and FIG. 35C are cross-sectional views along an optical axis showing an optical arrangement at the time of infinite object point focusing of a zoom lens according to an eighteenth embodiment of the present invention, where.
Figure 35B:
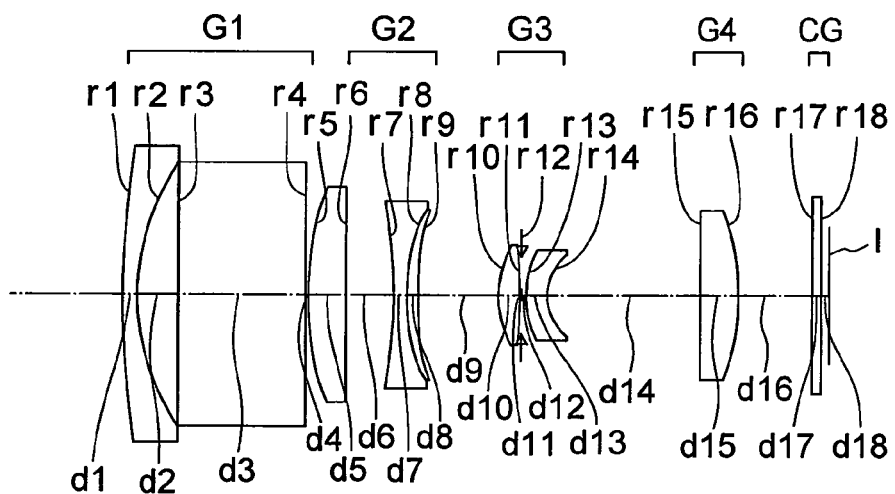
Figure 35C:
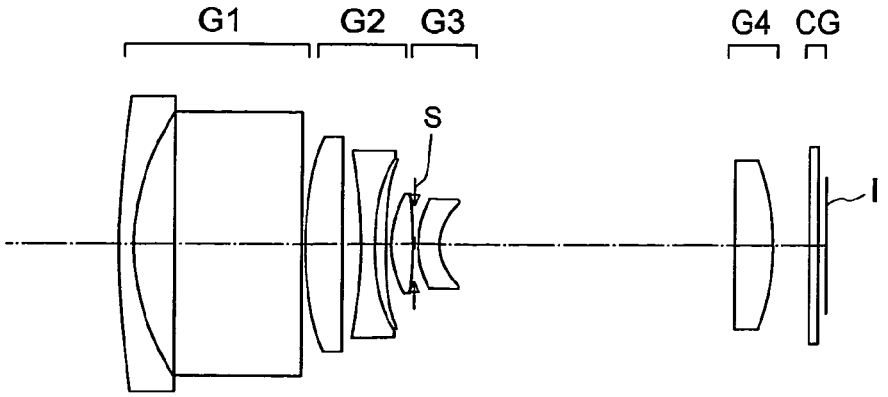

Next, a zoom lens according to an eighteenth embodiment of the present invention will be described below. FIG. 35A, FIG. 35B, and FIG. 35C are cross-sectional views along an optical axis showing an optical arrangement at the time of infinite object point focusing of the zoom lens according to the eighteenth embodiment of the present invention, where, FIG. 35A shows a state at a wide angle end, FIG. 35B shows an intermediate focal length state, and FIG. 35C shows a state at a telephoto end.

Figure 36A:
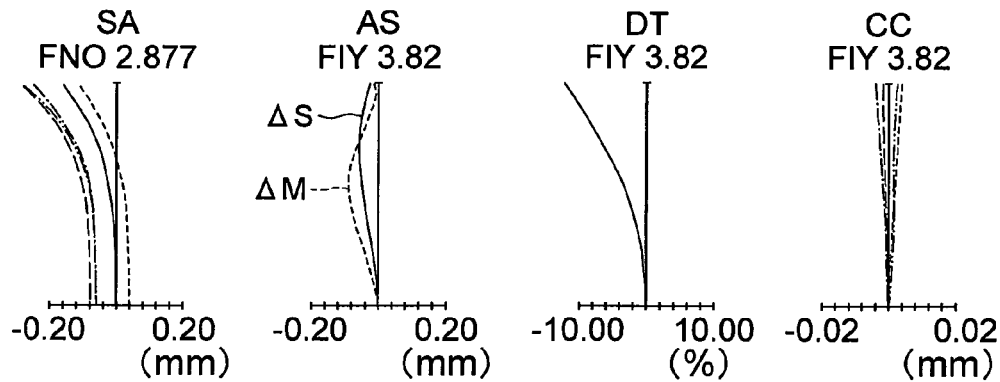
FIG. 36A, FIG. 36B, and FIG. 36C are diagrams showing a spherical aberration, an astigmatism, a distortion, and a chromatic aberration of magnification at the time of infinite object point focusing of the zoom lens according to the eighteenth embodiment, where.
Figure 36B:
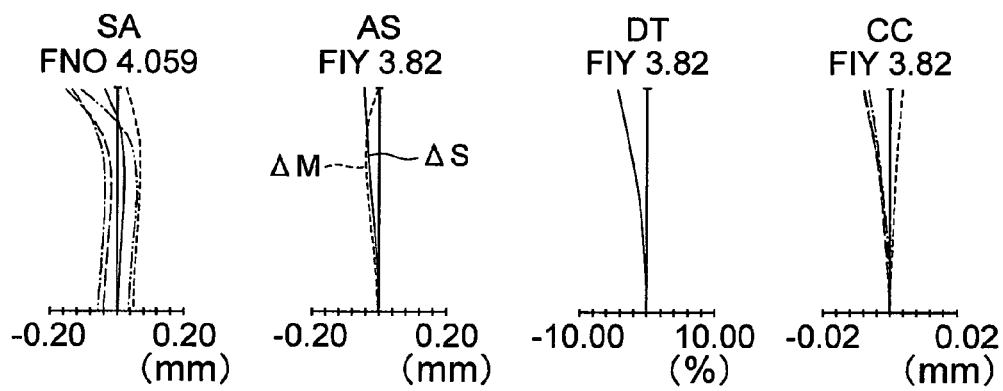
Figure 36C:
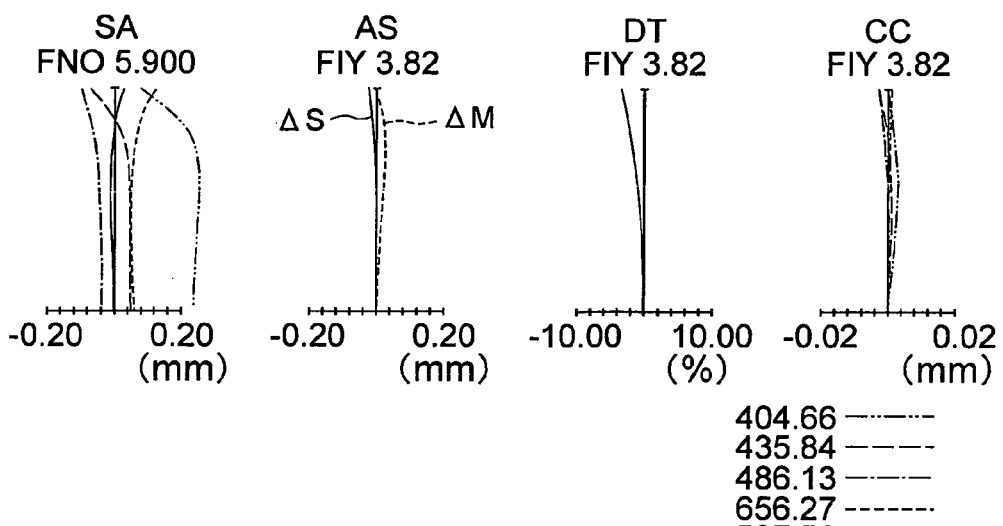

FIG. 36A, FIG. 36B, and FIG. 36C are diagrams showing a spherical aberration, an astigmatism, a distortion, and a chromatic aberration of magnification at the time of infinite object point focusing of the zoom lens according to the eighteenth embodiment, where, FIG. 36A shows a state at the wide angle end, FIG. 36B shows an intermediate focal length state, and FIG. 36C shows a state at the telephoto end.

The zoom lens of the eighteenth embodiment, as shown in FIG. 35A, FIG. 35B, and FIG. 35C, includes in order from an object side, a first lens group G1 having a negative refracting power, a second lens group G2 having a negative refracting power, a third lens group G3 having a positive refracting power, and a fourth lens group G4 having a positive refracting power.

The first lens group G1 includes in order from the object side, a negative meniscus lens L1 having a convex surface directed toward the object side, a prism L2, and a positive meniscus lens L3 having a convex surface directed toward the object side, and has a negative refracting power as a whole.

The second lens group G2 includes in order from the object side, a cemented lens of a biconcave negative lens L4 and a positive meniscus lens L5 having a convex surface directed toward the object side, and has a negative refracting power as a whole.

The biconcave negative lens L4 corresponds to the lens LA and the positive meniscus lens L5 corresponds to the lens LB. Moreover, a glass material A is used for the lens LA and a glass material B is used for the lens LB.

The third lens group G3 includes in order from the object side, a biconvex positive lens L6 and a negative meniscus lens L7 having a convex surface directed toward the object side, and has a positive refracting power as a whole.

An aperture stop S is disposed between the biconvex positive lens L6 and the negative meniscus lens L7.

The fourth lens group G4 includes in order from the object side, a biconvex positive lens L8, and has a positive refracting power as a whole.

At the time of zooming from the wide angle end to the telephoto end, the first lens group G1 is fixed. The second lens group G2, after moving toward an image side, moves toward the object side. The third lens group G3 moves toward the object side. The fourth lens group G4 moves toward the image side. The aperture stop S moves along with the third lens group G3.

An aspheric surface is provided to eight surfaces namely, three surfaces of the cemented lens in the second lens group G2, both surfaces of the biconvex positive lens L6 and both surfaces of the negative meniscus lens L7 in the third lens group G3, and a surface on the image side of the biconvex positive lens L8 in the fourth lens group G4.

Numerical data of each embodiment described above is shown below. Apart from symbols described above, f denotes a focal length of the entire zoom lens system, $F_{NO}$ denotes an F number, $\omega$ denotes a half angle of field, WE denotes a wide angle end, ST denotes an intermediate state, TE denotes a telephoto end, each of r1, r2, denotes radius of curvature of each lens surface, each of d1, d2, . . . denotes a distance between two lenses, each of nd1, nd2, denotes a refractive index of each lens for a d-line, and each of vd1, vd2, . . . denotes an Abbe constant for each lens. Further, * denotes an aspheric data, ER denotes an effective radius, STO denotes a stop. When z is let to be an optical axis with a direction of traveling of light as a positive (direction), and y is let to be in a direction orthogonal to the optical axis, a shape of the aspheric surface is described by the following expression.

$$z=(y^2/r)/[1+\{1-(K+1)(y/r)^2\}^{1/2}]+A_4 y^4+A_6 y^6+A_8 y^8+A_{10}y^{10}+A_{12}y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Further, zoom ratio($\gamma$), half angle of field, image height (y10) in all the embodiments are described below in a values of conditional expression corresponding table.

EXAMPLE 1

Unit mm

| Surface data | | | | | |
|---|---|---|---|---|---|
| Surface no. | r | d | nd | vd | ER |
| Object plane | ∞ | ∞ | | | |
| 1* | 75.5728 | 0.6580 | 1.53071 | 55.69 | 4.382 |
| 2 | 11.1442 | 0.3500 | 1.63494 | 23.22 | 3.885 |
| 3 | 17.0000 | 0.5626 | 1.53071 | 55.69 | 3.855 |
| 4* | 7.3557 | Variable | 1. | | 3.600 |
| 5* | 4.1406 | 1.2000 | 1.85135 | 40.10 | 1.600 |
| 6* | −52.5261 | 0.1000 | 1. | | 1.424 |
| 7(Stop) | ∞ | 0.2000 | 1. | | 1.400 |
| 8* | 5.4685 | 1.2000 | 2.10223 | 16.77 | 1.434 |
| 9* | 2.4859 | Variable | 1. | | 1.200 |
| 10 | 7677.9947 | 2.1000 | 1.74320 | 49.34 | 2.722 |
| 11* | −7.2342 | Variable | 1. | | 4.300 |
| 12 | ∞ | 0.3000 | 1.54771 | 62.84 | 3.741 |
| 13 | ∞ | 0.5000 | 1. | | 3.781 |
| 14 | ∞ | 0.5000 | 1.51633 | 64.14 | 3.888 |
| 15 | ∞ | 0.40032 | 1. | | 3.957 |
| Image plane | ∞ | | | | |

| Aspherical surface data |
|---|

1st surface

K = −1.0000, A2 = 0.0000E+00, A4 = −1.8269E−03, A6 = 6.1109E−05, A8 = −9.3256E−07, A10 = 0.0000E+00

4th surface

K = −1.3490, A2 = 0.0000E+00, A4 = −2.1941E−03, A6 = 9.9450E−05, A8 = −2.0299E−06, A10 = 0.0000E+00

-continued

5th surface

K = −2.0914, A2 = 0.0000E+00, A4 = 5.5990E−03, A6 = −9.2419E−05, A8 = 1.9178E−04, A10 = 0.0000E+00

6th surface

K = −1.0000, A2 = 0.0000E+00, A4 = 6.3593E−03, A6 = −4.5597E−04, A8 = 3.7058E−04, A10 = 0.0000E+00

8th surface

K = 0., A2 = 0.0000E+00, A4 = −2.3424E−03, A6 = 0.0000E+00, A8 = 0.0000E+00, A10 = 0.0000E+00

9th surface

K = −0.9339, A2 = 0.0000E+00, A4 = −1.5504E−03, A6 = 1.0578E−03, A8 = −2.0001E−04, A10 = 0.0000E+00

11th surface

K = −5.2650, A2 = 0.0000E+00, A4 = −7.0517E−04, A6 = 7.4408E−06, A8 = 0.0000E+00, A10 = 0.0000E+00

Table of index of glass material — List of index per wavelength of medium used in the present embodiment

| GLA | 587.56 | 656.27 | 486.13 | 435.84 | 404.66 |
|---|---|---|---|---|---|
| LPF | 1.547710 | 1.545046 | 1.553762 | 1.558427 | 1.562262 |
| L5 | 2.102230 | 2.084080 | 2.149790 | 2.193956 | 2.236910 |
| L4 | 1.851350 | 1.845050 | 1.866280 | 1.878368 | 1.888684 |
| L2 | 1.634940 | 1.627290 | 1.654640 | 1.672910 | 1.689880 |
| CG | 1.516330 | 1.513855 | 1.521905 | 1.526213 | 1.529768 |
| L6 | 1.743198 | 1.738653 | 1.753716 | 1.762046 | 1.769040 |
| L1, L3 | 1.530710 | 1.527870 | 1.537400 | 1.542740 | 1.547160 |

Numerical data

| | Wide angle | Inter mediate | Telephoto |
|---|---|---|---|
| Focal length | 6.30809 | 9.87135 | 17.68758 |
| Fno. | 3.0661 | 4.0008 | 5.7970 |
| Lens total length | 21.8876 | 20.1506 | 22.2861 |
| BF | 0.40032 | 0.40051 | 0.40114 |
| d4 | 8.78430 | 4.19463 | 0.30000 |
| d9 | 2.87320 | 5.89577 | 11.90696 |
| d11 | 2.15920 | 1.98910 | 2.00744 |

Zoom lens group data

| Group | Initial | Focal length |
|---|---|---|
| 1 | 1 | −16.35291 |
| 2 | 5 | 8.16705 |
| 3 | 10 | 9.72590 |

1st surface

| h | z1(h) | spherical component | Δz1(h) |
|---|---|---|---|
| 2.590 | −0.02126 | 0.04439 | −0.06564 |

2nd surface

| h | z2(h) | spherical component | Δz2(h) |
|---|---|---|---|
| 2.590 | 0.30510 | 0.30510 | −0.00000 |

3rd surface

| h | z3(h) | spherical component | Δz3(h) |
|---|---|---|---|
| 2.590 | 0.19842 | 0.19842 | 0.00000 |

4th surface

| h | z4(h) | spherical component | Δz4(h) |
|---|---|---|---|
| 2.590 | 0.37828 | 0.47099 | −0.09271 |

EXAMPLE 2

Unit mm

| Surface data | | | | | |
|---|---|---|---|---|---|
| Surface no. | r | d | nd | νd | ER |
| Object plane | ∞ | ∞ | | | |
| 1* | 76.9010 | 0.5858 | 1.53071 | 55.69 | 4.399 |
| 2 | 20.3839 | 0.5138 | 1.63494 | 23.22 | 4.033 |
| 3 | 60.0006 | 0.6455 | 1.53071 | 55.69 | 3.963 |
| 4* | 7.1520 | Variable | 1. | | 3.600 |
| 5* | 4.1460 | 1.2013 | 1.85135 | 40.10 | 1.600 |
| 6* | −50.4776 | 0.1014 | 1. | | 1.428 |
| 7(Stop) | ∞ | 0.2000 | 1. | | 1.400 |
| 8* | 5.4649 | 1.2020 | 2.10223 | 16.77 | 1.433 |
| 9* | 2.4934 | Variable | 1. | | 1.200 |
| 10 | 5930.4474 | 2.1914 | 1.74320 | 49.34 | 2.575 |
| 11* | −7.2699 | Variable | 1. | | 4.300 |
| 12 | ∞ | 0.3000 | 1.54771 | 62.84 | 3.552 |
| 13 | ∞ | 0.5000 | 1. | | 3.590 |
| 14 | ∞ | 0.5000 | 1.51633 | 64.14 | 3.687 |
| 15 | ∞ | 0.39923 | 1. | | 3.751 |
| Image plane | ∞ | | | | |

Aspherical surface data

1st surface

K = 27.3613, A2 = 0.0000E+00, A4 = −1.8855E−03, A6 = 6.3461E−05,
A8 = −9.5403E−07, A10 = 0.0000E+00

4th surface

K = −0.4683, A2 = 0.0000E+00, A4 = −2.5749E−03, A6 = 1.0384E−04,
A8 = −2.0419E−06, A10 = 0.0000E+00

5th surface

K = −2.0914, A2 = 0.0000E+00, A4 = 5.5990E−03, A6 = −9.2419E−05,
A8 = 1.9178E−04, A10 = 0.0000E+00

6th surface

K = −1.0000, A2 = 0.0000E+00, A4 = 6.3593E−03, A6 = −4.5597E−04,
A8 = 3.7058E−04, A10 = 0.0000E+00

8th surface

K = 0., A2 = 0.0000E+00, A4 = −2.3424E−03, A6 = 0.0000E+00,
A8 = 0.0000E+00, A10 = 0.0000E+00

9th surface

K = −0.9339, A2 = 0.0000E+00, A4 = −1.5504E−03, A6 = 1.0578E−03,
A8 = −2.0001E−04, A10 = 0.0000E+00

11th surface

K = −5.2650, A2 = 0.0000E+00, A4 = −7.0517E−04, A6 = 7.4408E−06,
A8 = 0.0000E+00, A10 = 0.0000E+00

| Table of index of glass material | List of index per wavelength of medium used in the present embodiment | | | | |
|---|---|---|---|---|---|
| GLA | 587.56 | 656.27 | 486.13 | 435.84 | 404.66 |
| LPF | 1.547710 | 1.545046 | 1.553762 | 1.558427 | 1.562262 |
| L5 | 2.102230 | 2.084080 | 2.149790 | 2.193956 | 2.236910 |
| L4 | 1.851350 | 1.845050 | 1.866280 | 1.878368 | 1.888684 |
| L2 | 1.634940 | 1.627290 | 1.654640 | 1.672910 | 1.689880 |
| CG | 1.516330 | 1.513855 | 1.521905 | 1.526213 | 1.529768 |
| L6 | 1.743198 | 1.738653 | 1.753716 | 1.762046 | 1.769040 |
| L1, L3 | 1.530710 | 1.527870 | 1.537400 | 1.542740 | 1.547160 |

| Numerical data | | | |
|---|---|---|---|
| | Wide angle | Inter mediate | Telephoto |
| Focal length | 6.30789 | 9.87140 | 17.69203 |
| Fno. | 3.0783 | 4.0254 | 5.8110 |
| Lens total length | 21.8567 | 20.6643 | 22.8618 |
| BF | 0.39923 | 0.40983 | 0.39987 |

-continued

| | | | |
|---|---|---|---|
| d4 | 8.52548 | 4.39410 | 0.30000 |
| d9 | 2.79523 | 6.09082 | 11.99939 |
| d11 | 2.19549 | 1.82835 | 2.22126 |

Zoom lens group data

| Group | Initial | Focal length |
|---|---|---|
| 1 | 1 | −15.83975 |
| 2 | 5 | 8.06697 |
| 3 | 10 | 9.77153 |

4th surface

| h | z1(h) | spherical component | Δz1(h) |
|---|---|---|---|
| 2.591 | 0.38891 | 0.48564 | −0.09672 |

3rd surface

| h | z2(h) | spherical component | Δz2(h) |
|---|---|---|---|
| 2.591 | 0.05595 | 0.05595 | 0.00000 |

2nd surface

| h | z3(h) | spherical component | Δz3(h) |
|---|---|---|---|
| 2.591 | 0.16528 | 0.16528 | 0.00000 |

1st surface

| h | z4(h) | spherical component | Δz4(h) |
|---|---|---|---|
| 2.591 | −0.02368 | 0.04364 | −0.06732 |

EXAMPLE 3

Unit mm

Surface data

| Surface no. | r | d | nd | νd | ER |
|---|---|---|---|---|---|
| Object plane | ∞ | ∞ | | | |
| 1* | −9.3125 | 0.8000 | 1.53071 | 55.69 | 5.376 |
| 2* | −81.6191 | 0.8000 | 1.63387 | 23.38 | 4.865 |
| 3 | −13.3905 | 0.8000 | 1.53071 | 55.69 | 4.825 |
| 4* | 39.3694 | Variable | 1. | | 3.900 |
| 5* | 2.5006 | 1.1000 | 1.53071 | 55.69 | 1.700 |
| 6 | 4.5492 | 0.1500 | 1.63387 | 23.38 | 1.515 |
| 7* | 2.5784 | 0.7000 | 1. | | 1.434 |
| 8(Stop) | ∞ | 0.1000 | 1. | | 1.437 |
| 9* | 4.9712 | 1.0000 | 1.53071 | 55.69 | 1.475 |
| 10 | 102.6530 | Variable | 1. | | 1.500 |
| 11 | −8.5328 | 1.2000 | 1.53071 | 55.69 | 1.706 |
| 12* | −4.3793 | Variable | 1. | | 1.977 |
| 13* | −6.6156 | 0.6000 | 1.53071 | 55.69 | 3.142 |
| 14 | 21109.3853 | 0.3000 | 1. | | 3.436 |
| 15 | ∞ | 0.5000 | 1.51633 | 64.14 | 3.553 |
| 16 | ∞ | 0.33456 | 1. | | 3.677 |
| Image plane | ∞ | | | | |

Aspherical surface data

1st surface

K = 0., A2 = 0.0000E+00, A4 = 1.3740E−03, A6 = −7.1504E−06,
A8 = 2.6514E−08, A10 = 0.0000E+00

2nd surface

K = 0., A2 = 0.0000E+00, A4 = 2.9661E−04, A6 = −2.4559E−05,
A8 = 2.8487E−07, A10 = 0.0000E+00

-continued

4th surface

K = 0., A2 = 0.0000E+00, A4 = 8.9788E−04, A6 = 1.9516E−05,
A8 = 9.0737E−07, A10 = 0.0000E+00

5th surface

K = −1.9133, A2 = 0.0000E+00, A4 = 1.3419E−02, A6 = −1.0578E−03,
A8 = 3.6990E−04, A10 = 0.0000E+00

7th surface

K = 0., A2 = 0.0000E+00, A4 = −7.9343E−04, A6 = −2.5815E−03,
A8 = 1.2054E−03, A10 = 0.0000E+00

9th surface

K = −0.5997, A2 = 0.0000E+00, A4 = −2.4657E−03, A6 = −1.2729E−03,
A8 = 4.2326E−04, A10 = 0.0000E+00

12th surface

K = −0.9686, A2 = 0.0000E+00, A4 = 1.2715E−03, A6 = 0.0000E+00,
A8 = 0.0000E+00, A10 = 0.0000E+00

13th surface

K = 0., A2 = 0.0000E+00, A4 = 2.0349E−03, A6 = 0.0000E+00,
A8 = 0.0000E+00, A10 = 0.0000E+00

| Table of index of glass material | List of index per wavelength of medium used in the present embodiment | | | | |
| --- | --- | --- | --- | --- | --- |
| GLA | 587.56 | 656.27 | 486.13 | 435.83 | 404.66 |
| L2, L5 | 1.633870 | 1.626381 | 1.653490 | 1.671610 | 1.688826 |
| L1, L3, L4, L6, L7, L8 | 1.530710 | 1.527870 | 1.537400 | 1.542740 | 1.547272 |
| CG | 1.516330 | 1.513855 | 1.521905 | 1.526214 | 1.529768 |

| Numerical data | | | |
| --- | --- | --- | --- |
| | Wide angle | Inter mediate | Telephoto |
| Focal length | 5.98001 | 10.16983 | 17.29834 |
| Fno. | 2.9633 | 4.2336 | 5.9700 |
| Lens total length | 23.0439 | 23.1930 | 23.5014 |
| BF | 0.33456 | 0.33753 | 0.33386 |
| d4 | 8.47397 | 4.20275 | 0.38726 |
| d10 | 0.80166 | 7.59953 | 13.53954 |
| d12 | 5.38367 | 3.00315 | 1.19075 |

| Zoom lens group data | | |
| --- | --- | --- |
| Group | Initial | Focal length |
| 1 | 1 | −15.44232 |
| 2 | 5 | 9.06190 |
| 3 | 11 | 15.40859 |
| 4 | 13 | −12.42546 |

| 4th surface | | | |
| --- | --- | --- | --- |
| h | z1(h) | spherical component | Δz1(h) |
| 2.844 | 0.17581 | 0.10286 | 0.07295 |

| 3rd surface | | | |
| --- | --- | --- | --- |
| h | z2(h) | spherical component | Δz2(h) |
| 2.844 | −0.30550 | −0.30550 | −0.00000 |

| 2nd surface | | | |
| --- | --- | --- | --- |
| h | z3(h) | spherical component | Δz3(h) |
| 2.844 | −0.04194 | −0.04956 | 0.00763 |

| 1st surface | | | |
| --- | --- | --- | --- |
| h | z4(h) | spherical component | Δz4(h) |
| 2.844 | −0.35868 | −0.44490 | 0.08622 |

EXAMPLE 4

Unit mm

Surface data

| Surface no. | r | d | nd | vd | ER |
|---|---|---|---|---|---|
| Object plane | ∞ | ∞ | | | |
| 1* | −10.1661 | 0.8000 | 1.53071 | 55.69 | 5.768 |
| 2* | 8.6390 | 0.7000 | 1.76290 | 15.80 | 4.497 |
| 3 | 18.2042 | 0.8000 | 1.53071 | 55.69 | 4.480 |
| 4* | 9.6743 | Variable | 1. | | 3.813 |
| 5* | 3.2475 | 1.2000 | 1.53071 | 55.69 | 1.500 |
| 6 | 67.6695 | 0.1500 | 1.63387 | 23.38 | 1.396 |
| 7* | 3.9299 | 1.1873 | 1. | | 1.363 |
| 8(Stop) | ∞ | 0.6000 | 1. | | 1.416 |
| 9* | 10.0527 | 1.0000 | 1.74320 | 49.34 | 1.455 |
| 10 | −14.2047 | Variable | 1. | | 1.500 |
| 11 | −8.5167 | 1.2000 | 1.53071 | 55.69 | 1.692 |
| 12* | −4.5545 | Variable | 1. | | 1.957 |
| 13* | −7.2248 | 0.6000 | 1.53071 | 55.69 | 3.050 |
| 14 | 4842.0193 | 0.3000 | 1. | | 3.391 |
| 15 | ∞ | 0.5000 | 1.51633 | 64.14 | 3.525 |
| 16 | ∞ | 0.39127 | 1. | | 3.665 |
| Image plane | ∞ | | | | |

Aspherical surface data

1st surface

K = 0., A2 = 0.0000E+00, A4 = 1.3490E−03, A6 = −1.2086E−05,
A8 = 6.4769E−08, A10 = 0.0000E+00

2nd surface

K = 0., A2 = 0.0000E+00, A4 = 1.5919E−05, A6 = −5.4715E−06,
A8 = 0.0000E+00, A10 = 0.0000E+00

4th surface

K = 0., A2 = 0.0000E+00, A4 = 1.4657E−04, A6 = 7.1237E−05,
A8 = 1.4782E−07, A10 = 0.0000E+00

5th surface

K = −2.0128, A2 = 0.0000E+00, A4 = 2.0186E−03, A6 = −5.4178E−05,
A8 = −3.6814E−05, A10 = 0.0000E+00

7th surface

K = 0., A2 = 0.0000E+00, A4 = −4.0422E−03, A6 = 1.5411E−04,
A8 = −1.0696E−04, A10 = 0.0000E+00

9th surface

K = −0.5955, A2 = 0.0000E+00, A4 = −8.0070E−04, A6 = −4.3732E−05,
A8 = 1.1379E−05, A10 = 0.0000E+00

12th surface

K = −1.0857, A2 = 0.0000E+00, A4 = 7.8164E−04, A6 = 0.0000E+00,
A8 = 0.0000E+00, A10 = 0.0000E+00

13th surface

K = 0., A2 = 0.0000E+00, A4 = 5.0292E−04, A6 = 0.0000E+00,
A8 = 0.0000E+00, A10 = 0.0000E+00

| Table of index of glass material | List of index per wavelength of medium used in the present embodiment | | | | |
|---|---|---|---|---|---|
| GLA | 587.56 | 656.27 | 486.13 | 435.83 | 404.66 |
| L5 | 1.633870 | 1.626381 | 1.653490 | 1.671610 | 1.688826 |
| L2 | 1.762905 | 1.750038 | 1.798323 | 1.832460 | 1.866689 |
| L1, L3, L4, L7, L8 | 1.530710 | 1.527870 | 1.537400 | 1.542740 | 1.547272 |
| CG | 1.516330 | 1.513855 | 1.521905 | 1.526214 | 1.529768 |
| L6 | 1.743198 | 1.738653 | 1.753716 | 1.762047 | 1.769040 |

Numerical data

| | Wide angle | Inter mediate | Telephoto |
|---|---|---|---|
| Focal length | 4.99999 | 8.66004 | 14.99997 |
| Fno. | 2.9000 | 4.0526 | 5.9379 |

-continued

| Lens total length | 22.2501 | 22.8952 | 25.0715 |
|---|---|---|---|
| BF | 0.39127 | 0.39030 | 0.39137 |
| d4 | 6.68883 | 2.86329 | 0.39997 |
| d10 | 0.70196 | 7.02430 | 14.17110 |
| d12 | 5.43069 | 3.57999 | 1.07174 |

Zoom lens group data

| Group | Initial | Focal length |
|---|---|---|
| 1 | 1 | −10.43888 |
| 2 | 5 | 7.92769 |
| 3 | 11 | 16.69346 |
| 4 | 13 | −13.59260 |

1st surface

| h | z1(h) | spherical component | Δz1(h) |
|---|---|---|---|
| 3.518 | −0.44284 | −0.62804 | 0.18520 |

2nd surface

| h | z2(h) | spherical component | Δz2(h) |
|---|---|---|---|
| 3.518 | 0.74073 | 0.74866 | −0.00793 |

3rd surface

| h | z3(h) | spherical component | Δz3(h) |
|---|---|---|---|
| 3.518 | 0.34312 | 0.34312 | −0.00000 |

4th surface

| h | z4(h) | spherical component | Δz4(h) |
|---|---|---|---|
| 3.518 | 0.82316 | 0.66225 | 0.16091 |

EXAMPLE 5

Unit mm

Surface data

| Surface no. | r | d | nd | vd | ER |
|---|---|---|---|---|---|
| Object plane | ∞ | ∞ | | | |
| 1* | −25.0151 | 0.4000 | 1.53071 | 55.69 | 3.118 |
| 2* | 3.9483 | 0.5000 | 1.63387 | 23.38 | 2.557 |
| 3* | 5.6397 | Variable | 1. | | 2.500 |
| 4(Stop) | ∞ | −0.2000 | 1. | | 0.923 |
| 5* | 1.9153 | 1.0000 | 1.53071 | 55.69 | 0.925 |
| 6 | 10.0969 | 0.1000 | 1.63387 | 23.38 | 0.815 |
| 7* | 2.9847 | 0.5000 | 1.53071 | 55.69 | 0.796 |
| 8* | 6.2567 | Variable | 1. | | 0.760 |
| 9 | −21.0886 | 1.1000 | 1.53071 | 55.69 | 1.028 |
| 10* | −2.5941 | Variable | 1. | | 1.266 |
| 11* | −2.8381 | 0.4000 | 1.53071 | 55.69 | 1.602 |
| 12 | 1205.8829 | Variable | 1. | | 1.862 |
| 13 | ∞ | 0.4000 | 1.51633 | 64.14 | 1.963 |
| 14 | ∞ | 0.31809 | 1. | | 2.089 |
| Image plane | ∞ | | | | |

Aspherical surface data

1st surface

K = 0., A2 = 0.0000E+00, A4 = −2.8846E−03, A6 = 2.2647E−04,
A8 = 2.3414E−06, A10 = −3.9356E−07

2nd surface

K = 0., A2 = 0.0000E+00, A4 = −4.8072E−03, A6 = 3.0333E−04,
A8 = 0.0000E+00, A10 = 0.0000E+00

-continued

3rd surface

K = 0., A2 = 0.0000E+00, A4 = −6.5726E−03, A6 = 5.1667E−04,
A8 = 5.6274E−06, A10 = 0.0000E+00

5th surface

K = −1.6030, A2 = 0.0000E+00, A4 = 3.0923E−02, A6 = 1.6127E−03,
A8 = 0.0000E+00, A10 = 0.0000E+00

7th surface

K = −0.4060, A2 = 0.0000E+00, A4 = −5.6100E−02, A6 = 1.5153E−01,
A8 = −1.1741E−01, A10 = 0.0000E+00

8th surface

K = 0.4850, A2 = 0.0000E+00, A4 = 5.7320E−02, A6 = −2.8906E−02,
A8 = 3.1993E−02, A10 = 0.0000E+00

10th surface

K = −4.1496, A2 = 0.0000E+00, A4 = −1.6040E−02, A6 = 2.0570E−03,
A8 = −1.3561E−04, A10 = 0.0000E+00

11th surface

K = −1.4067

| Table of index of glass material | List of index per wavelength of medium used in the present embodiment | | | | |
|---|---|---|---|---|---|
| GLA | 587.56 | 656.27 | 486.13 | 435.83 | 404.66 |
| L2, L4 | 1.633870 | 1.626381 | 1.653490 | 1.671610 | 1.688826 |
| L1, L3, L5, L6, L7 | 1.530710 | 1.527870 | 1.537400 | 1.542740 | 1.547272 |
| CG | 1.516330 | 1.513855 | 1.521905 | 1.526214 | 1.529768 |

Numerical data

|  | Wide angle | Inter mediate | Telephoto |
|---|---|---|---|
| Focal length | 3.20240 | 5.52859 | 9.60234 |
| Fno. | 2.8000 | 3.7887 | 5.5747 |
| Lens total length | 12.9986 | 12.0120 | 13.0001 |
| BF | 0.31809 | 0.31802 | 0.31820 |
| d3 | 5.75860 | 2.49827 | 0.66791 |
| d8 | 0.70762 | 3.32057 | 6.80144 |
| d10 | 1.81426 | 1.47518 | 0.81259 |
| d12 | 0.20000 | 0.20000 | 0.20000 |

Zoom lens group data

| Group | Initial | Focal length |
|---|---|---|
| 1 | 1 | −9.27753 |
| 2 | 4 | 5.07862 |
| 3 | 9 | 5.46088 |
| 4 | 11 | −5.33452 |

1st surface

| h | z1(h) | spherical component | Δz1(h) |
|---|---|---|---|
| 1.885 | −0.09727 | −0.07115 | −0.02612 |

2nd surface

| h | z2(h) | spherical component | Δz2(h) |
|---|---|---|---|
| 1.885 | 0.43208 | 0.47919 | −0.04711 |

3rd surface

| h | z3(h) | spherical component | Δz3(h) |
|---|---|---|---|
| 1.885 | 0.26552 | 0.32445 | −0.05894 |

EXAMPLE 6

Unit mm

Surface data

| Surface no. | r | d | nd | vd | ER |
|---|---|---|---|---|---|
| Object plane | ∞ | ∞ | | | |
| 1* | −9.9751 | 0.5000 | 1.53071 | 55.69 | 2.849 |
| 2* | 6.5289 | 0.2500 | 1.76290 | 15.80 | 2.347 |
| 3* | 8.2211 | Variable | 1. | | 2.300 |
| 4(Stop) | ∞ | −0.2158 | 1. | | 0.909 |
| 5* | 1.8751 | 1.0000 | 1.53071 | 55.69 | 0.910 |
| 6 | 10.1366 | 0.1000 | 1.76290 | 15.80 | 0.800 |
| 7* | 4.8643 | 0.5000 | 1.53071 | 55.69 | 0.785 |
| 8* | 6.7020 | Variable | 1. | | 0.750 |
| 9 | −17.4168 | 0.9000 | 1.53071 | 55.69 | 1.022 |
| 10* | −2.4719 | Variable | 1. | | 1.213 |
| 11* | −2.4149 | 0.4000 | 1.53071 | 55.69 | 1.542 |
| 12 | 1263.6385 | Variable | 1. | | 1.833 |
| 13 | ∞ | 0.4000 | 1.51633 | 64.14 | 1.943 |
| 14 | ∞ | 0.31705 | 1. | | 2.078 |
| Image plane | ∞ | | | | |

Aspherical surface data

1st surface $K = 3.9252$, $A2 = 0.0000E+00$, $A4 = 4.8716E-04$, $A6 = 2.6521E-04$,
$A8 = -7.1478E-06$, $A10 = 0.0000E+00$ 2nd surface $K = -0.2103$, $A2 = 0.0000E+00$, $A4 = 5.0020E-03$, $A6 = -2.4714E-03$,
$A8 = 3.4076E-04$, $A10 = 0.0000E+00$ 3rd surface $K = -0.0579$, $A2 = 0.0000E+00$, $A4 = -1.0930E-03$, $A6 = -2.9466E-04$,
$A8 = 1.1953E-04$, $A10 = 0.0000E+00$ 5th surface $K = -1.8881$, $A2 = 0.0000E+00$, $A4 = 3.7799E-02$, $A6 = 1.8373E-03$,
$A8 = 0.0000E+00$, $A10 = 0.0000E+00$ 7th surface $K = -0.3998$, $A2 = 0.0000E+00$, $A4 = -6.0162E-03$, $A6 = 2.8044E-02$,
$A8 = -2.4492E-02$,
$A10 = 0.0000E+00$ 8th surface $K = 2.1715$, $A2 = 0.0000E+00$, $A4 = 4.9777E-02$, $A6 = -7.5507E-04$,
$A8 = 1.1901E-02$, $A10 = 0.0000E+00$ 10th surface $K = -4.7623$, $A2 = 0.0000E+00$, $A4 = -2.2119E-02$, $A6 = 3.2295E-03$,
$A8 = -2.3192E-04$, $A10 = 0.0000E+00$ 11th surface $K = -1.4721$

| Table of index of glass material | List of index per wavelength of medium used in the present embodiment | | | | |
|---|---|---|---|---|---|
| GLA | 587.56 | 656.27 | 486.13 | 435.83 | 404.66 |
| L2, L4 | 1.762905 | 1.750038 | 1.798323 | 1.832460 | 1.866689 |
| L1, L3, L5, L6, L7 | 1.530710 | 1.527870 | 1.537400 | 1.542740 | 1.547272 |
| CG | 1.516330 | 1.513855 | 1.521905 | 1.526214 | 1.529768 |

Numerical data

| | Wide angle | Inter mediate | Telephoto |
|---|---|---|---|
| Focal length | 3.20257 | 5.53312 | 9.59604 |
| Fno. | 2.8000 | 3.7911 | 5.5507 |
| Lens total length | 11.9999 | 11.0552 | 11.9764 |
| BF | 0.31705 | 0.32127 | 0.31970 |
| d3 | 5.19993 | 2.09160 | 0.31355 |
| d8 | 0.70568 | 3.19740 | 6.50579 |

-continued

| | | | |
|---|---|---|---|
| d10 | 1.74309 | 1.41071 | 0.80321 |
| d12 | 0.20000 | 0.20000 | 0.20000 |

Zoom lens group data

| Group | Initial | Focal length |
|---|---|---|
| 1 | 1 | −8.95605 |
| 2 | 4 | 4.82523 |
| 3 | 9 | 5.31715 |
| 4 | 11 | −4.54117 |

1st surface

| h | z1(h) | spherical component | Δz1(h) |
|---|---|---|---|
| 1.883 | −0.16948 | −0.17934 | 0.00986 |

2nd surface

| h | z2(h) | spherical component | Δz2(h) |
|---|---|---|---|
| 1.883 | 0.28273 | 0.27743 | 0.00529 |

3rd surface

| h | z3(h) | spherical component | Δz3(h) |
|---|---|---|---|
| 1.883 | 0.21039 | 0.21855 | −0.00816 |

EXAMPLE 7

Unit mm

Surface data

| Surface no. | r | d | nd | νd | ER |
|---|---|---|---|---|---|
| Object plane | ∞ | ∞ | | | |
| 1* | −18.9513 | 0.8000 | 1.53071 | 55.69 | 5.199 |
| 2* | 9.9720 | 0.7000 | 1.76290 | 15.80 | 4.446 |
| 3 | 20.3506 | 0.8000 | 1.53071 | 55.69 | 4.385 |
| 4* | 9.2279 | Variable | 1. | | 3.999 |
| 5* | 2.4445 | 1.2000 | 1.74320 | 49.34 | 1.700 |
| 6 | 3.4222 | 0.1500 | 1.76290 | 15.80 | 1.399 |
| 7* | 1.8664 | 0.6000 | 1. | | 1.300 |
| 8(Stop) | ∞ | 0.2000 | 1. | | 1.315 |
| 9 | 6.3242 | 1.0000 | 2.00330 | 28.27 | 1.372 |
| 10 | −141.9999 | Variable | 1. | | 1.400 |
| 11 | −8.2165 | 1.2000 | 1.74320 | 49.34 | 1.521 |
| 12 | −5.8953 | Variable | 1. | | 1.802 |
| 13* | −8.4360 | 0.6000 | 1.53071 | 55.69 | 3.020 |
| 14 | −6.6299 | 0.3000 | 1. | | 3.253 |
| 15 | ∞ | 0.5000 | 1.51633 | 64.14 | 3.586 |
| 16 | ∞ | 0.47867 | 1. | | 3.679 |
| Image plane | ∞ | | | | |

Aspherical surface data

1st surface

K = 0., A2 = 0.0000E+00, A4 = −3.2514E−05, A6 = 3.6095E−06,
A8 = 0.0000E+00, A10 = 0.0000E+00

2nd surface

K = 0., A2 = 0.0000E+00, A4 = −4.3475E−04, A6 = 1.5498E−05,
A8 = 0.0000E+00, A10 = 0.0000E+00

4th surface

K = 0., A2 = 0.0000E+00, A4 = −1.1455E−03, A6 = 4.2262E−05,
A8 = 0.0000E+00, A10 = 0.0000E+00

-continued

5th surface

K = −2.6186, A2 = 0.0000E+00, A4 = 1.5819E−02, A6 = −1.5794E−03,
A8 = 9.3004E−05, A10 = 0.0000E+00
7th surface K = 0., A2 = 0.0000E+00, A4 = −1.4635E−02, A6 = −1.2864E−03,
A8 = −1.5850E−03, A10 = 0.0000E+00
13th surface K = 0., A2 = 0.0000E+00, A4 = −5.9435E−03, A6 = 3.3217E−04,
A8 = −9.3556E−06, A10 = 0.0000E+00

| Table of index of glass material | List of index per wavelength of medium used in the present embodiment | | | | |
|---|---|---|---|---|---|
| GLA | 587.56 | 656.27 | 486.13 | 435.83 | 404.66 |
| L2, L5 | 1.762905 | 1.750038 | 1.798323 | 1.832460 | 1.866689 |
| L1, L3, L8 | 1.530710 | 1.527870 | 1.537400 | 1.542740 | 1.547272 |
| CG | 1.516330 | 1.513855 | 1.521905 | 1.526214 | 1.529768 |
| L6 | 2.003300 | 1.993011 | 2.028497 | 2.049716 | 2.068441 |
| L4, L7 | 1.743198 | 1.738653 | 1.753716 | 1.762047 | 1.769040 |

Numerical data

| | Wide angle | Inter mediate | Telephoto |
|---|---|---|---|
| Focal length | 5.98015 | 10.17008 | 17.29991 |
| Fno. | 3.0714 | 4.0188 | 5.9700 |
| Lens total length | 23.0009 | 21.3108 | 23.8096 |
| BF | 0.47867 | 0.47827 | 0.46577 |
| d4 | 7.95358 | 2.65507 | 0.39720 |
| d10 | 0.50682 | 4.63038 | 13.39461 |
| d12 | 6.01180 | 5.49708 | 1.50202 |

Zoom lens group data

| Group | Initial | Focal length |
|---|---|---|
| 1 | 1 | −13.34966 |
| 2 | 5 | 8.13762 |
| 3 | 11 | 23.00727 |
| 4 | 13 | 52.32499 |

1st surface

| h | z1(h) | spherical component | Δz1(h) |
|---|---|---|---|
| 2.844 | −0.21483 | −0.21461 | −0.00022 |

2nd surface

| h | z2(h) | spherical component | Δz2(h) |
|---|---|---|---|
| 2.844 | 0.39391 | 0.41415 | −0.02024 |

3rd surface

| h | z3(h) | spherical component | Δz3(h) |
|---|---|---|---|
| 2.844 | 0.19970 | 0.19970 | 0.00000 |

4th surface

| h | z4(h) | spherical component | Δz4(h) |
|---|---|---|---|
| 2.844 | 0.39661 | 0.44919 | −0.05258 |

EXAMPLE 8

Unit mm

Surface data

| Surface no. | r | d | nd | vd | ER |
|---|---|---|---|---|---|
| Object plane | ∞ | ∞ | | | |
| 1* | −10.4558 | 0.7000 | 1.53071 | 55.69 | 4.607 |
| 2* | 11.2219 | 0.4000 | 1.63387 | 23.38 | 3.959 |
| 3 | 23.9770 | 0.6000 | 1.53071 | 55.69 | 3.924 |
| 4* | 33.0045 | Variable | 1. | | 3.700 |
| 5* | 6.2860 | 1.7000 | 1.85135 | 40.10 | 1.997 |
| 6* | −36.2083 | 0.3000 | 1. | | 1.766 |
| 7(Stop) | ∞ | 0.2000 | 1. | | 1.552 |
| 8 | 5.3791 | 0.8000 | 1.77250 | 49.60 | 1.465 |
| 9 | 19.3338 | 0.1000 | 1.63387 | 23.38 | 1.359 |
| 10* | 2.9288 | Variable | 1. | | 1.300 |
| 11 | −32.2264 | 0.7000 | 1.53071 | 55.69 | 1.664 |
| 12 | 18.6991 | Variable | 1. | | 1.908 |
| 13 | 17.6682 | 2.8000 | 1.74320 | 49.34 | 2.271 |
| 14* | −12.9541 | Variable | 1. | | 2.790 |
| 15 | ∞ | 0.5000 | 1.51633 | 64.14 | 3.625 |
| 16 | ∞ | 0.50083 | 1. | | 3.690 |
| Image plane | ∞ | | | | |

Aspherical surface data

1st surface

K = 0., A2 = 0.0000E+00, A4 = 9.6773E−04, A6 = −8.1145E−07,
A8 = −7.0577E−08, A10 = 0.0000E+00

2nd surface

K = 0., A2 = 0.0000E+00, A4 = −4.3088E−04, A6 = 0.0000E+00,
A8 = 0.0000E+00, A10 = 0.0000E+00

4th surface

K = 0., A2 = 0.0000E+00, A4 = 6.9286E−04, A6 = 1.9123E−05,
A8 = 8.5575E−08, A10 = 0.0000E+00

5th surface

K = 0., A2 = 0.0000E+00, A4 = −3.2380E−03, A6 = −3.2052E−04,
A8 = −5.8883E−06, A10 = 0.0000E+00

6th surface

K = 0., A2 = 0.0000E+00, A4 = −5.5496E−03, A6 = −1.2888E−05,
A8 = 3.0670E−06, A10 = 0.0000E+00

10th surface

K = 0., A2 = 0.0000E+00, A4 = 5.9801E−03, A6 = −6.1655E−04
A8 = 0.0000E+00, A10 = 0.0000E+00

14th surface

K = 0., A2 = 0.0000E+00, A4 = −5.4142E−04, A6 = 1.0651E−05,
A8 = 0.0000E+00, A10 = 0.0000E+00

| Table of index of glass material | List of index per wavelength of medium used in the present embodiment | | | | |
|---|---|---|---|---|---|
| GLA | 587.56 | 656.27 | 486.13 | 435.84 | 404.66 |
| L1, L3, L7 | 1.530710 | 1.527870 | 1.537400 | 1.542740 | 1.547272 |
| L4 | 1.851350 | 1.845050 | 1.866280 | 1.878368 | 1.888684 |
| L2, L6 | 1.633870 | 1.626381 | 1.653490 | 1.671610 | 1.688826 |
| CG | 1.516330 | 1.513855 | 1.521905 | 1.526213 | 1.529768 |
| L5 | 1.772499 | 1.767798 | 1.783374 | 1.791971 | 1.799174 |
| L8 | 1.743198 | 1.738653 | 1.753716 | 1.762046 | 1.769040 |

Numerical data

| | Wide angle | Inter mediate | Telephoto |
|---|---|---|---|
| Focal length | 6.41661 | 10.74094 | 18.47266 |
| Fno. | 2.9791 | 4.1204 | 5.9700 |
| Lens total length | 23.2396 | 22.3953 | 23.1987 |
| BF | 0.50083 | 0.51071 | 0.66660 |
| d4 | 8.28392 | 3.70662 | 0.30000 |

-continued

| | | | |
|---|---|---|---|
| d10 | 1.20000 | 3.76658 | 6.63530 |
| d12 | 0.60000 | 2.99906 | 5.53816 |
| d14 | 3.85489 | 2.61230 | 1.25861 |

| Zoom lens group data | | | |
|---|---|---|---|
| Group | Initial | Focal length | |
| 1 | 1 | −15.94850 | |
| 2 | 5 | 8.12670 | |
| 3 | 11 | −22.19088 | |
| 4 | 13 | 10.46466 | |

| 1st surface | | | |
|---|---|---|---|
| h | $z1(h)$ | spherical component | $\Delta z1(h)$ |
| 2.624 | −0.28926 | −0.33474 | 0.04549 |

| 2nd surface | | | |
|---|---|---|---|
| h | $z2(h)$ | spherical component | $\Delta z2(h)$ |
| 2.624 | 0.29077 | 0.31121 | −0.02044 |

| 3rd surface | | | |
|---|---|---|---|
| h | $z3(h)$ | spherical component | $\Delta z3(h)$ |
| 2.624 | 0.14407 | 0.14407 | 0.00000 |

| 4th surface | | | |
|---|---|---|---|
| h | $z4(h)$ | spherical component | $\Delta z4(h)$ |
| 2.624 | 0.14383 | 0.10451 | 0.03931 |

EXAMPLE 9

Unit mm

| Surface data | | | | | |
|---|---|---|---|---|---|
| Surface no. | r | d | nd | νd | ER |
| Object plane | ∞ | ∞ | | | |
| 1 | 16.0356 | 0.8000 | 1.94595 | 17.98 | 8.147 |
| 2 | 12.6897 | 3.2000 | 1.62263 | 58.16 | 7.433 |
| 3* | −250.1962 | Variable | 1. | | 6.900 |
| 4 | 136.5974 | 0.7500 | 1.88300 | 40.76 | 5.359 |
| 5 | 5.0272 | 2.4000 | 1. | | 3.817 |
| 6* | −48.0566 | 0.6000 | 1.53071 | 55.69 | 3.671 |
| 7* | 4.5057 | 0.6000 | 1.63387 | 23.38 | 3.425 |
| 8 | 10.0000 | 0.6000 | 1.53071 | 55.69 | 3.411 |
| 9* | 8.9701 | 0.1000 | 1. | | 3.329 |
| 10 | 8.1257 | 1.3931 | 1.80810 | 22.76 | 3.318 |
| 11 | 15.9797 | Variable | 1. | | 3.100 |
| 12(Stop) | ∞ | −0.3000 | 1. | | 2.377 |
| 13* | 4.6836 | 1.6000 | 1.58313 | 59.38 | 2.454 |
| 14* | −12.8138 | 0.1000 | 1. | | 2.403 |
| 15 | 4.6438 | 1.2500 | 1.69680 | 55.53 | 2.243 |
| 16 | 10.2789 | 0.3000 | 2.00069 | 25.46 | 1.990 |
| 17 | 3.0745 | Variable | 1. | | 1.800 |
| 18 | 12.5595 | 1.4000 | 1.69680 | 55.53 | 3.388 |
| 19 | 33.4445 | Variable | 1. | | 3.436 |
| 20* | −506.3573 | 1.5000 | 1.53071 | 55.69 | 3.672 |
| 21 | −17.2681 | 0.5000 | 1. | | 3.770 |
| 22 | ∞ | 0.5000 | 1.51633 | 64.14 | 3.786 |
| 23 | ∞ | 0.5565 | 1. | | 3.791 |
| Image plane | ∞ | | | | |

-continued

Aspherical surface data

3rd surface

K = 0., A2 = 0.0000E+00, A4 = 1.1969E−05, A6 = 2.0606E−07,
A8 = −5.2198E−09, A10 = 3.9225E−11

6th surface

K = 143.8251, A2 = 0.0000E+00, A4 = 2.0897E−04, A6 = 8.2434E−06,
A8 = −1.8399E−06, A10 = 1.0612E−07

7th surface

K = 0., A2 = 0.0000E+00, A4 = −3.4226E−03, A6 = 0.0000E+00,
A8 = 0.0000E+00, A10 = 0.0000E+00

9th surface

K = −17.2097, A2 = 0.0000E+00, A4 = 2.1402E−03, A6 = −1.6869E−04,
A8 = 8.8842E−06, A10 = −2.1293E−07

13th surface

K = −0.0886, A2 = 0.0000E+00, A4 = −1.0826E−03, A6 = 2.5310E−05,
A8 = −9.8053E−06, A10 = 6.5783E−07

14th surface

K = −15.2991, A2 = 0.0000E+00, A4 = −2.1691E−04, A6 = 5.9357E−05,
A8 = −1.2317E−05, A10 = 1.0601E−06

20th surface

K = 0., A2 = 0.0000E+00, A4 = −1.2881E−03, A6 = 1.4919E−04,
A8 = −5.8995E−06, A10 = 9.3440E−08

| Table of index of glass material | List of index per wavelength of medium used in the present embodiment | | | | |
|---|---|---|---|---|---|
| GLA | 587.56 | 656.27 | 486.13 | 435.84 | 404.66 |
| L4, L6, L12 | 1.530710 | 1.527870 | 1.537400 | 1.542740 | 1.547272 |
| L1 | 1.945950 | 1.931230 | 1.983830 | 2.018247 | 2.051060 |
| L2 | 1.622630 | 1.619350 | 1.630050 | 1.635825 | 1.640604 |
| L5 | 1.633870 | 1.626381 | 1.653490 | 1.671610 | 1.688826 |
| L8 | 1.583126 | 1.580139 | 1.589960 | 1.595296 | 1.599721 |
| CG | 1.516330 | 1.513855 | 1.521905 | 1.526213 | 1.529768 |
| L3 | 1.882997 | 1.876560 | 1.898221 | 1.910495 | 1.920919 |
| L9, L11 | 1.696797 | 1.692974 | 1.705522 | 1.712339 | 1.718005 |
| L7 | 1.808095 | 1.798009 | 1.833513 | 1.855902 | 1.876580 |
| L10 | 2.000690 | 1.989410 | 2.028720 | 2.052828 | 2.074600 |

Numerical data

| | Wide angle | Inter mediate | Telephoto |
|---|---|---|---|
| Focal length | 5.02526 | 14.48273 | 47.89662 |
| Fno. | 2.9056 | 3.9846 | 5.9500 |
| Lens total length | 36.5800 | 41.3049 | 52.9479 |
| BF | 0.05651 | 0.05502 | 0.05522 |
| d3 | 0.24780 | 6.73631 | 12.97844 |
| d11 | 11.11782 | 4.32090 | 0.70000 |
| d17 | 5.56475 | 6.02679 | 18.97111 |
| d19 | 1.80000 | 6.37278 | 2.45000 |

Zoom lens group data

| Group | Initial | Focal length |
|---|---|---|
| 1 | 1 | 27.47987 |
| 2 | 4 | −5.39843 |
| 3 | 12 | 8.45576 |
| 4 | 18 | 28.09075 |
| 5 | 20 | 33.65079 |

-continued

| 6th surface | | | |
|---|---|---|---|
| h | z1(h) | spherical component | Δz1(h) |
| 2.857 | −0.08593 | −0.08502 | −0.00091 |

| 7th surface | | | |
|---|---|---|---|
| h | z2(h) | spherical component | Δz2(h) |
| 2.857 | 0.79377 | 1.02194 | −0.22816 |

| 8th surface | | | |
|---|---|---|---|
| h | z3(h) | spherical component | Δz3(h) |
| 2.857 | 0.41693 | 0.41693 | −0.00000 |

| 9th surface | | | |
|---|---|---|---|
| h | z4(h) | spherical component | Δz4(h) |
| 2.857 | 0.42919 | 0.46728 | −0.03809 |

EXAMPLE 10

Unit mm

| Surface data | | | | | |
|---|---|---|---|---|---|
| Surface no. | r | d | nd | νd | ER |
| Object plane | ∞ | ∞ | | | |
| 1 | 15.7795 | 0.8000 | 1.94595 | 17.98 | 7.875 |
| 2 | 12.8835 | 3.2000 | 1.62263 | 58.16 | 7.225 |
| 3* | −585.5536 | Variable | 1. | | 7.000 |
| 4 | 45.4526 | 0.7000 | 2.00330 | 28.27 | 4.996 |
| 5 | 5.1171 | 2.2000 | 1. | | 3.693 |
| 6* | −21.0369 | 0.7000 | 1.53071 | 55.69 | 3.625 |
| 7* | 6.4036 | 0.7000 | 1.76290 | 15.80 | 3.461 |
| 8* | 14.2269 | 0.1000 | 1. | | 3.429 |
| 9 | 10.4388 | 1.1000 | 1.94595 | 17.98 | 3.388 |
| 10 | 17.2045 | Variable | 1. | | 3.200 |
| 11(Stop) | ∞ | −0.3000 | 1. | | 2.247 |
| 12* | 4.7690 | 1.6000 | 1.58313 | 59.38 | 2.314 |
| 13* | −13.4620 | 0.1000 | 1. | | 2.300 |
| 14 | 4.5093 | 1.2500 | 1.69680 | 55.53 | 2.274 |
| 15 | 12.8902 | 0.3000 | 2.00069 | 25.46 | 2.076 |
| 16 | 3.1309 | Variable | 1. | | 1.895 |
| 17* | 9.8739 | 1.8284 | 1.53071 | 55.69 | 3.410 |
| 18 | 5201.2141 | Variable | 1. | | 3.476 |
| 19 | ∞ | 0.3000 | 1.51633 | 64.14 | 3.710 |
| 20 | ∞ | 0.5000 | 1. | | 3.726 |
| 21 | ∞ | 0.5000 | 1.51633 | 64.14 | 3.768 |
| 22 | ∞ | 0.5000 | 1. | | 3.796 |
| 23 | ∞ | 0.05089 | 1. | | 3.837 |
| Image plane | ∞ | | | | |

| Aspherical surface data |
|---|
| 3rd surface |
| $K = 0., A2 = 0.0000E+00, A4 = 1.3697E-05, A6 = 1.2645E-07,$ $A8 = -3.5001E-09, A10 = 2.7456E-11$ |
| 6th surface |
| $K = 0., A2 = 0.0000E+00, A4 = -1.7319E-04, A6 = -5.0357E-05,$ $A8 = 1.5493E-06, A10 = -4.0112E-08$ |
| 7th surface |
| $K = 0., A2 = 0.0000E+00, A4 = -1.4346E-03, A6 = -1.0891E-04,$ $A8 = 7.1179E-06, A10 = 0.0000E+00$ |

-continued

8th surface

K = 0., A2 = 0.0000E+00, A4 = −6.3685E−04, A6 = −2.6576E−05,
A8 = 5.5023E−07, A10 = 7.3715E−08

12th surface

K = −0.0880, A2 = 0.0000E+00, A4 = −8.4687E−04, A6 = 1.0696E−05,
A8 = −9.7260E−06, A10 = 1.6721E−06

13th surface

K = −15.2988, A2 = 0.0000E+00, A4 = 1.7020E−05, A6 = 2.8245E−05,
A8 = −8.9484E−06, A10 = 2.0472E−06

17th surface

K = 0., A2 = 0.0000E+00, A4 = −1.4669E−04, A6 = 1.6635E−05,
A8 = −3.7257E−07, A10 = 3.3527E−09

Table of index of glass material — List of index per wavelength of medium used in the present embodiment

| GLA | 587.56 | 656.27 | 486.13 | 435.84 | 404.66 |
|---|---|---|---|---|---|
| L5 | 1.762905 | 1.750038 | 1.798323 | 1.832460 | 1.866689 |
| L4, L10 | 1.530710 | 1.527870 | 1.537400 | 1.542740 | 1.547272 |
| L1, L6 | 1.945950 | 1.931230 | 1.983830 | 2.018247 | 2.051060 |
| L2 | 1.622630 | 1.619350 | 1.630050 | 1.635825 | 1.640604 |
| L7 | 1.583126 | 1.580139 | 1.589960 | 1.595296 | 1.599721 |
| CG | 1.516330 | 1.513855 | 1.521905 | 1.526213 | 1.529768 |
| L3 | 2.003300 | 1.993011 | 2.028497 | 2.049714 | 2.068441 |
| L8 | 1.696797 | 1.692974 | 1.705522 | 1.712339 | 1.718005 |
| L9 | 2.000690 | 1.989410 | 2.028720 | 2.052828 | 2.074600 |

Numerical data

| | Wide angle | Inter mediate | Telephoto |
|---|---|---|---|
| Focal length | 5.10035 | 14.61391 | 47.87790 |
| Fno. | 2.9728 | 3.9051 | 5.9700 |
| Lens total length | 34.6995 | 38.9869 | 52.4773 |
| BF | 0.05089 | 0.04920 | 0.04533 |
| d3 | 0.24780 | 6.93566 | 13.13911 |
| d10 | 10.66256 | 3.74260 | 0.70000 |
| d16 | 4.85984 | 5.00342 | 19.01440 |
| d18 | 2.80000 | 7.17758 | 3.50000 |

Zoom lens group data

| Group | Initial | Focal length |
|---|---|---|
| 1 | 1 | 27.44708 |
| 2 | 4 | −5.44920 |
| 3 | 11 | 8.53294 |
| 4 | 17 | 18.63810 |

6th surface

| h | z1(h) | spherical component | Δz1(h) |
|---|---|---|---|
| 2.797 | −0.21681 | −0.18674 | −0.03007 |

7th surface

| h | z2(h) | spherical component | Δz2(h) |
|---|---|---|---|
| 2.797 | 0.52978 | 0.64304 | −0.11326 |

8th surface

| h | z3(h) | spherical component | Δz3(h) |
|---|---|---|---|
| 2.797 | 0.23015 | 0.27761 | −0.04747 |

EXAMPLE 11

Unit mm

| Surface data | | | | | |
|---|---|---|---|---|---|
| Surface no. | r | d | nd | νd | ER |
| Object plane | ∞ | ∞ | | | |
| 1* | −22.1944 | 1.0000 | 2.00170 | 20.60 | 7.283 |
| 2* | 30.1506 | 1.0000 | 1. | | 6.734 |
| 3 | ∞ | 9.0000 | 1.90366 | 31.32 | 6.708 |
| 4 | ∞ | 0.2000 | 1. | | 6.099 |
| 5* | 10.4563 | 0.1000 | 1.63387 | 23.38 | 5.879 |
| 6* | 11.1149 | 3.5000 | 1.74320 | 49.34 | 5.821 |
| 7* | −21.3225 | Variable | 1. | | 6.000 |
| 8 | 19.9641 | 0.5000 | 2.00330 | 28.27 | 4.071 |
| 9 | 4.6989 | 1.9000 | 1. | | 3.337 |
| 10* | −80.1654 | 0.6000 | 1.53071 | 55.69 | 3.312 |
| 11 | 16.0000 | 0.3000 | 1.63387 | 23.38 | 3.343 |
| 12 | 35.0000 | 0.6000 | 1.53071 | 55.69 | 3.345 |
| 13* | 11.7896 | 0.1500 | 1. | | 3.358 |
| 14 | 11.5579 | 1.3000 | 1.94595 | 17.98 | 3.386 |
| 15 | 737.4996 | Variable | 1. | | 3.300 |
| 16(Stop) | ∞ | Variable | 1. | | 2.023 |
| 17* | 9.9802 | 1.8000 | 1.80610 | 40.92 | 3.000 |
| 18* | −10.6253 | 0.1500 | 1. | | 3.017 |
| 19 | −25.7168 | 1.6000 | 1.74320 | 49.34 | 2.946 |
| 20 | −8.2482 | 0.5000 | 1.94595 | 17.98 | 2.880 |
| 21 | −42.6823 | Variable | 1. | | 2.873 |
| 22 | 10.5251 | 0.6000 | 1.77250 | 49.60 | 2.529 |
| 23 | 4.2364 | Variable | 1. | | 2.374 |
| 24 | −194.2147 | 0.5000 | 1.94595 | 17.98 | 2.720 |
| 25 | 7.9651 | 3.7000 | 1.58313 | 59.38 | 2.874 |
| 26* | −6.0732 | 1.8074 | 1. | | 3.485 |
| 27 | ∞ | 0.8000 | 1.51633 | 64.14 | 3.756 |
| 28 | ∞ | 0.40047 | 1. | | 3.806 |
| Image plane | ∞ | | | | |

Aspherical surface data

1st surface $K = 2.9046$, $A2 = 0.0000E+00$, $A4 = 1.4575E-04$, $A6 = 0.0000E+00$,
$A8 = 0.0000E+00$, $A10 = 0.0000E+00$ 2nd surface $K = -38.3411$, $A2 = 0.0000E+00$, $A4 = 1.1502E-04$, $A6 = 0.0000E+00$,
$A8 = 0.0000E+00$, $A10 = 0.0000E+00$ 5th surface $K = 0.$, $A2 = 0.0000E+00$, $A4 = -2.5377E-04$, $A6 = 3.5149E-07$,
$A8 = -1.2262E-08$, $A10 = 0.0000E+00$ 6th surface $K = 0.$, $A2 = 0.0000E+00$, $A4 = -1.8457E-05$, $A6 = 3.5714E-07$,
$A8 = -5.1032E-09$, $A10 = 0.0000E+00$ 7th surface $K = 0.$, $A2 = 0.0000E+00$, $A4 = 8.8331E-05$, $A6 = -7.3589E-07$,
$A8 = 3.0586E-09$, $A10 = 0.0000E+00$ 10th surface $K = 0.$, $A2 = 0.0000E+00$, $A4 = -1.5509E-03$, $A6 = 1.6407E-06$,
$A8 = 4.3556E-07$, $A10 = 0.0000E+00$ 13th surface $K = 0.$, $A2 = 0.0000E+00$, $A4 = -1.8159E-03$, $A6 = 2.7135E-05$,
$A8 = 1.0838E-07$, $A10 = 0.0000E+00$ 17th surface $K = 0.2982$, $A2 = 0.0000E+00$, $A4 = -1.8734E-04$, $A6 = -3.3149E-06$,
$A8 = 2.2941E-08$,
$A10 = 0.0000E+00$ -continued 18th surface K = 0.7444, A2 = 0.0000E+00, A4 = 5.0359E−04, A6 = −4.4195E−06,
A8 = 0.0000E+00, A10 = 0.0000E+00

26th surface

K = −0.3586, A2 = 0.0000E+00, A4 = 5.8452E−04, A6 = −3.6543E−05,
A8 = 2.1430E−07, A10 = 0.0000E+00

| Table of index of glass material | List of index per wavelength of medium used in the present embodiment | | | | |
|---|---|---|---|---|---|
| GLA | 587.56 | 656.27 | 486.13 | 435.84 | 404.66 |
| L6, L8 | 1.530710 | 1.527870 | 1.537400 | 1.542740 | 1.547272 |
| L9, L12, L13 | 1.945950 | 1.931230 | 1.983830 | 2.018254 | 2.051060 |
| L1 | 2.001700 | 1.988000 | 2.036520 | 2.067256 | 2.095660 |
| L3, L7 | 1.633870 | 1.626381 | 1.653490 | 1.671610 | 1.688826 |
| L15 | 1.583126 | 1.580139 | 1.589960 | 1.595296 | 1.599721 |
| CG | 1.516330 | 1.513855 | 1.521905 | 1.526213 | 1.529768 |
| L10 | 1.806098 | 1.800248 | 1.819945 | 1.831173 | 1.840781 |
| L13 | 1.772499 | 1.767798 | 1.783374 | 1.791971 | 1.799174 |
| L5 | 2.003300 | 1.993011 | 2.028497 | 2.049714 | 2.068441 |
| L4, L11 | 1.743198 | 1.738653 | 1.753716 | 1.762046 | 1.769040 |
| L2 | 1.903660 | 1.895260 | 1.924120 | 1.941280 | 1.956430 |

| Numerical data | | | |
|---|---|---|---|
| | Wide angle | Inter mediate | Telephoto |
| Focal length | 5.27242 | 11.11812 | 24.97800 |
| Fno. | 3.5861 | 4.5706 | 5.2000 |
| Lens total length | 54.0267 | 54.0931 | 54.0272 |
| BF | 0.40047 | 0.07609 | 0.40152 |
| d7 | 0.46928 | 4.79531 | 9.38901 |
| d15 | 10.24041 | 5.96274 | 1.32366 |
| d16 | 5.41844 | 3.42952 | 1.38141 |
| d21 | 3.89279 | 3.05047 | 0.71721 |
| d23 | 1.99793 | 5.17156 | 9.20697 |

| Zoom lens group data | | |
|---|---|---|
| Group | Initial | Focal length |
| 1 | 1 | 13.13794 |
| 2 | 8 | −9.07875 |
| 3 | 17 | 8.18901 |
| 4 | 22 | −9.57649 |
| 5 | 24 | 17.54883 |

| 10th surface | | | |
|---|---|---|---|
| h | z1(h) | spherical component | Δz1(h) |
| 2.645 | −0.11801 | −0.04366 | −0.07435 |

| 11th surface | | | |
|---|---|---|---|
| h | z2(h) | spherical component | Δz2(h) |
| 2.645 | 0.22021 | 0.22021 | 0.00000 |

| 12th surface | | | |
|---|---|---|---|
| h | z3(h) | spherical component | Δz3(h) |
| 2.645 | 0.10012 | 0.10012 | 0.00000 |

| 13th surface | | | |
|---|---|---|---|
| h | z4(h) | spherical component | Δz4(h) |
| 2.645 | 0.22125 | 0.30063 | −0.07937 |

EXAMPLE 12

Unit mm

| Surface data | | | | | |
|---|---|---|---|---|---|
| Surface no. | r | d | nd | νd | ER |
| Object plane | ∞ | ∞ | | | |
| 1* | −21.4006 | 1.0000 | 2.00170 | 20.60 | 7.195 |
| 2* | 28.6212 | 1.0000 | 1. | | 6.555 |
| 3 | ∞ | 9.0000 | 1.90366 | 31.32 | 6.548 |
| 4 | ∞ | 0.2000 | 1. | | 6.082 |
| 5* | 10.7728 | 0.1000 | 1.63387 | 23.38 | 5.921 |
| 6* | 13.2141 | 3.5000 | 1.74320 | 49.34 | 5.901 |
| 7* | −19.2598 | Variable | 1. | | 6.200 |
| 8 | 50.8795 | 0.5000 | 2.00330 | 28.27 | 4.243 |
| 9 | 5.8104 | 1.9000 | 1. | | 3.594 |
| 10* | −371.6962 | 0.6000 | 1.53071 | 55.69 | 3.556 |
| 11* | 10.2078 | 0.6000 | 1.76300 | 15.80 | 3.607 |
| 12* | 16.0684 | 0.1500 | 1. | | 3.605 |
| 13 | 13.1529 | 1.3000 | 1.94595 | 17.98 | 3.616 |
| 14 | 44.9015 | Variable | 1. | | 3.500 |
| 15(Stop) | ∞ | −0.3000 | 1. | | 2.170 |
| 16* | 8.8165 | 2.6000 | 1.80610 | 40.92 | 2.173 |
| 17* | −10.3548 | 0.1500 | 1. | | 2.007 |
| 18 | −26.2808 | 1.6000 | 1.74320 | 49.34 | 1.943 |
| 19 | −8.6692 | 0.5000 | 1.94595 | 17.98 | 1.831 |
| 20 | −215.4425 | Variable | 1. | | 1.800 |
| 21 | 9.9165 | 0.6000 | 1.77250 | 49.60 | 1.980 |
| 22 | 4.0437 | Variable | 1. | | 1.925 |
| 23 | −128.1582 | 0.5000 | 1.94595 | 17.98 | 2.632 |
| 24 | 11.9548 | 3.0000 | 1.58313 | 59.38 | 2.793 |
| 25* | −5.3287 | 2.1799 | 1. | | 3.294 |
| 26 | ∞ | 0.8000 | 1.51633 | 64.14 | 3.708 |
| 27 | ∞ | 0.40332 | 1. | | 3.776 |
| Image plane | ∞ | | | | |

| Aspherical surface data |
|---|

1st surface

K = 2.8560, A2 = 0.0000E+00, A4 = 1.8714E−04, A6 = 0.0000E+00,
A8 = 0.0000E+00, A10 = 0.0000E+00

2nd surface

K = −38.3865, A2 = 0.0000E+00, A4 = 2.0376E−04, A6 = 0.0000E+00,
A8 = 0.0000E+00, A10 = 0.0000E+00

5th surface

K = 0., A2 = 0.0000E+00, A4 = −3.1212E−04, A6 = 1.1835E−06,
A8 = −1.7089E−09, A10 = 0.0000E+00

6th surface

K = 0.0148, A2 = 0.0000E+00, A4 = 1.2707E−04, A6 = −4.9915E−08,
A8 = −8.3250E−08,
A10 = 0.0000E+00

7th surface

K = 0., A2 = 0.0000E+00, A4 = 3.7661E−05, A6 = 9.8786E−08,
A8 = −1.8127E−09, A10 = 0.0000E+00

10th surface

K = 0., A2 = 0.0000E+00, A4 = −1.2807E−03, A6 = −1.7246E−05,
A8 = 3.7853E−07, A10 = 0.0000E+00

11th surface

K = 0., A2 = 0.0000E+00, A4 = −3.3865E−04, A6 = 0.0000E+00,
A8 = 0.0000E+00, A10 = 0.0000E+00

12th surface

K = 0., A2 = 0.0000E+00, A4 = −1.1217E−03, A6 = 7.2681E−07,
A8 = 5.7064E−07, A10 = 0.0000E+00

16th surface

K = 0.2986, A2 = 0.0000E+00, A4 = −1.9700E−04, A6 = 1.1517E−05,
A8 = −1.4583E−06, A10 = 0.0000E+00

-continued

17th surface

K = 0.7439, A2 = 0.0000E+00, A4 = 6.6763E−04, A6 = −3.9796E−06,
A8 = 0.0000E+00, A10 = 0.0000E+00

25th surface

K = −0.3518, A2 = 0.0000E+00, A4 = 1.2408E−03, A6 = −5.1476E−05,
A8 = 1.0582E−06,
A10 = 0.0000E+00

| Table of index of glass material | List of index per wavelength of medium used in the present embodiment | | | | |
|---|---|---|---|---|---|
| GLA | 587.56 | 656.27 | 486.13 | 435.84 | 404.66 |
| L6 | 1.530710 | 1.527870 | 1.537400 | 1.542740 | 1.547272 |
| L8, L11, L13 | 1.945950 | 1.931230 | 1.983830 | 2.018254 | 2.051060 |
| L1 | 2.001700 | 1.988000 | 2.036520 | 2.067256 | 2.095660 |
| L3 | 1.633870 | 1.626381 | 1.653490 | 1.671610 | 1.688826 |
| L14 | 1.583126 | 1.580139 | 1.589960 | 1.595296 | 1.599721 |
| CG | 1.516330 | 1.513855 | 1.521905 | 1.526213 | 1.529768 |
| L9 | 1.806098 | 1.800248 | 1.819945 | 1.831173 | 1.840781 |
| L12 | 1.772499 | 1.767798 | 1.783374 | 1.791971 | 1.799174 |
| L5 | 2.003300 | 1.993011 | 2.028497 | 2.049714 | 2.068441 |
| L4, L10 | 1.743198 | 1.738653 | 1.753716 | 1.762046 | 1.769040 |
| L2 | 1.903660 | 1.895260 | 1.924120 | 1.941280 | 1.956430 |
| L7 | 1.762995 | 1.750038 | 1.798323 | 1.832460 | 1.866893 |

| Numerical data | | | |
|---|---|---|---|
| | Wide angle | Inter mediate | Telephoto |
| Focal length | 5.16807 | 11.09828 | 24.97964 |
| Fno. | 3.8491 | 4.8811 | 4.9000 |
| Lens total length | 52.9340 | 53.0333 | 52.9330 |
| BF | 0.40332 | 0.22738 | 0.40298 |
| d7 | 0.50976 | 4.26794 | 9.52443 |
| d14 | 14.50965 | 7.81403 | 1.00035 |
| d20 | 3.55819 | 3.08303 | 0.76752 |
| d22 | 2.47317 | 6.16095 | 9.75780 |

| Zoom lens group data | | |
|---|---|---|
| Group | Initial | Focal length |
| 1 | 1 | 13.18663 |
| 2 | 8 | −8.44147 |
| 3 | 15 | 8.24208 |
| 4 | 21 | −9.25078 |
| 5 | 23 | 12.54903 |

| 10th surface | | | |
|---|---|---|---|
| h | $z1(h)$ | spherical component | $\Delta z1(h)$ |
| 2.733 | −0.08757 | −0.01005 | −0.07752 |

| 11th surface | | | |
|---|---|---|---|
| h | $z2(h)$ | spherical component | $\Delta z2(h)$ |
| 2.733 | 0.35390 | 0.37280 | −0.01891 |

| 12th surface | | | |
|---|---|---|---|
| h | $z3(h)$ | spherical component | $\Delta z3(h)$ |
| 2.733 | 0.17367 | 0.23421 | −0.06054 |

EXAMPLE 13

Unit mm

| Surface data | | | | | |
|---|---|---|---|---|---|
| Surface no. | r | d | nd | νd | ER |
| Object plane | ∞ | ∞ | | | |
| 1* | −21.5367 | 1.0000 | 2.00170 | 20.60 | 5.700 |
| 2* | 33.0691 | 0.8000 | 1. | | 5.192 |
| 3 | ∞ | 9.0000 | 1.90366 | 31.32 | 5.169 |
| 4 | ∞ | 0.2000 | 1. | | 4.798 |
| 5* | 12.4749 | 0.1500 | 1.63387 | 23.38 | 4.718 |
| 6* | 12.2905 | 3.6000 | 1.74320 | 49.34 | 4.681 |
| 7* | −16.0856 | Variable | 1. | | 5.700 |
| 8 | 12.7047 | 0.5000 | 1.88300 | 40.76 | 3.350 |
| 9 | 4.3608 | 1.7000 | 1. | | 2.841 |
| 10* | −8.0909 | 0.6000 | 1.53071 | 55.69 | 2.819 |
| 11 | −77.7299 | 0.4000 | 1.76300 | 15.80 | 2.866 |
| 12* | −21.7681 | 0.6000 | 1.53071 | 55.69 | 2.878 |
| 13* | −116.0235 | 0.1500 | 1. | | 2.903 |
| 14 | 10.0530 | 1.0000 | 1.84666 | 23.78 | 2.906 |
| 15 | 18.0309 | Variable | 1. | | 2.800 |
| 16* | 6.7436 | 1.6000 | 1.58313 | 59.38 | 2.317 |
| 17 | −19.6603 | 0.7000 | 1. | | 2.158 |
| 18(Stop) | ∞ | Variable | 1. | | 1.904 |
| 19 | −671.5816 | 0.5000 | 1.92286 | 20.88 | 1.800 |
| 20 | 6.5978 | 0.4000 | 1. | | 1.831 |
| 21 | 94.5840 | 1.2000 | 1.58313 | 59.38 | 1.893 |
| 22 | −12.4231 | 0.1500 | 1. | | 2.120 |
| 23 | 6.2671 | 1.5000 | 1.58313 | 59.38 | 2.321 |
| 24* | −13.3108 | Variable | 1. | | 2.324 |
| 25 | −8.3540 | 0.6000 | 1.88300 | 40.76 | 2.097 |
| 26 | 8.4163 | 0.8000 | 1. | | 2.186 |
| 27 | −56.8055 | 0.6000 | 1.77250 | 49.60 | 2.389 |
| 28 | 15.0000 | 2.2000 | 1.51742 | 52.43 | 2.613 |
| 29 | −6.7729 | Variable | 1. | | 3.037 |
| 30 | ∞ | 0.8000 | 1.51633 | 64.14 | 3.608 |
| 31 | ∞ | 0.39778 | 1. | | 3.743 |
| Image plane | ∞ | | | | |

Aspherical surface data

1st surface $K = 0., A2 = 0.0000E+00, A4 = -5.3519E-04, A6 = 4.5369E-05,$
$A8 = -1.1271E-06, A10 = 1.0066E-08$ 2nd surface $K = 0., A2 = 0.0000E+00, A4 = -5.1729E-04, A6 = 4.3348E-05,$
$A8 = -8.7937E-07, A10 = 5.9247E-09$ 5th surface $K = 0., A2 = 0.0000E+00, A4 = -2.4764E-04, A6 = -1.0102E-06,$
$A8 = 8.9665E-08, A10 = -1.3013E-09$ 6th surface $K = 0., A2 = 0.0000E+00, A4 = -9.5583E-05, A6 = 0.0000E+00,$
$A8 = 0.0000E+00, A10 = 0.0000E+00$ 7th surface $K = 0., A2 = 0.0000E+00, A4 = 9.9246E-06, A6 = -1.0102E-06,$
$A8 = 5.9480E-08, A10 = -8.4368E-10$ 10th surface $K = 0., A2 = 0.0000E+00, A4 = 6.0691E-04, A6 = -1.6979E-04,$
$A8 = 1.7728E-05, A10 = -1.2188E-06$ 12th surface $K = 0., A2 = 0.0000E+00, A4 = 1.7628E-04, A6 = 1.4362E-05,$
$A8 = 0.0000E+00, A10 = 0.0000E+00$ 13th surface $K = 0., A2 = 0.0000E+00, A4 = 2.5566E-05, A6 = -5.5581E-05,$
$A8 = 0.0000E+00, A10 = 0.0000E+00$ -continued

| 16th surface |
| --- |

K = 0., A2 = 0.0000E+00, A4 = −6.1310E−04, A6 = −4.4660E−07,
A8 = −7.2922E−07, A10 = 0.0000E+00

| 24th surface |
| --- |

K = 0., A2 = 0.0000E+00, A4 = 3.9746E−04, A6 = 1.2542E−05,
A8 = 0.0000E+00, A10 = 0.0000E+00

| Table of index of glass material | List of index per wavelength of medium used in the present embodiment | | | | |
| --- | --- | --- | --- | --- | --- |
| GLA | 587.56 | 656.27 | 486.13 | 435.84 | 404.66 |
| L11 | 1.922860 | 1.910380 | 1.954570 | 1.982810 | 2.009190 |
| L6, L8 | 1.530710 | 1.527870 | 1.537400 | 1.542740 | 1.547272 |
| L1 | 2.001700 | 1.988000 | 2.036520 | 2.067256 | 2.095660 |
| L3 | 1.633870 | 1.626381 | 1.653490 | 1.671610 | 1.688826 |
| L10, L12, L13 | 1.583126 | 1.580139 | 1.589960 | 1.595296 | 1.599721 |
| CG | 1.516330 | 1.513855 | 1.521905 | 1.526213 | 1.529768 |
| L5, L14 | 1.882997 | 1.876560 | 1.898221 | 1.910495 | 1.920919 |
| L15 | 1.772499 | 1.767798 | 1.783374 | 1.791971 | 1.799174 |
| L4 | 1.743198 | 1.738653 | 1.753716 | 1.762046 | 1.769040 |
| L16 | 1.517417 | 1.514444 | 1.524313 | 1.529804 | 1.534439 |
| L9 | 1.846660 | 1.836488 | 1.872096 | 1.894186 | 1.914294 |
| L2 | 1.903660 | 1.895260 | 1.924120 | 1.941280 | 1.956430 |
| L7 | 1.762995 | 1.750038 | 1.798323 | 1.832460 | 1.866893 |

| Numerical data | | | |
| --- | --- | --- | --- |
|  | Wide angle | Inter mediate | Telephoto |
| Focal length | 6.67868 | 11.38471 | 24.52645 |
| Fno. | 4.6193 | 4.5976 | 4.9000 |
| Lens total length | 48.5197 | 48.5202 | 48.5196 |
| BF | 0.39778 | 0.39678 | 0.39845 |
| d7 | 0.40000 | 4.63465 | 8.89213 |
| d15 | 9.09180 | 4.85627 | 0.60000 |
| d18 | 3.61041 | 3.82028 | 4.38290 |
| d24 | 2.79065 | 3.01259 | 1.10489 |
| d29 | 1.47909 | 1.04961 | 2.39125 |

| Zoom lens group data | | |
| --- | --- | --- |
| Group | Initial | Focal length |
| 1 | 1 | 12.99831 |
| 2 | 8 | −7.17024 |
| 3 | 16 | 8.80754 |
| 4 | 19 | 12.70555 |
| 5 | 25 | −7.91255 |

| 10th surface | | | |
| --- | --- | --- | --- |
| h | z1(h) | spherical component | Δz1(h) |
| 1.746 | −0.18862 | −0.19066 | 0.00204 |

| 11th surface | | | |
| --- | --- | --- | --- |
| h | z2(h) | spherical component | Δz2(h) |
| 1.746 | −0.01961 | −0.01961 | −0.00000 |

| 12th surface | | | |
| --- | --- | --- | --- |
| h | z3(h) | spherical component | Δz3(h) |
| 1.746 | −0.06810 | −0.07014 | 0.00205 |

| 13th surface | | | |
| --- | --- | --- | --- |
| h | z4(h) | spherical component | Δz4(h) |
| 1.746 | −0.01448 | −0.01314 | −0.00134 |

EXAMPLE 14

Unit mm

| Surface data | | | | | |
|---|---|---|---|---|---|
| Surface no. | r | d | nd | νd | ER |
| Object plane | ∞ | ∞ | | | |
| 1* | −32.6759 | 1.0000 | 2.00170 | 20.60 | 7.248 |
| 2* | 24.9684 | 1.3000 | 1. | | 6.629 |
| 3 | ∞ | 9.0000 | 1.90366 | 31.32 | 6.597 |
| 4 | ∞ | 0.2000 | 1. | | 6.194 |
| 5* | 10.5258 | 0.1500 | 1.63387 | 23.38 | 6.048 |
| 6* | 12.8372 | 3.6000 | 1.74320 | 49.34 | 6.037 |
| 7* | −20.4256 | Variable | 1. | | 6.000 |
| 8 | 34.0187 | 0.5000 | 2.00330 | 28.27 | 4.296 |
| 9 | 5.7477 | 2.0000 | 1. | | 3.622 |
| 10* | −7.8588 | 0.6000 | 1.63387 | 23.38 | 3.590 |
| 11* | −6.7151 | 0.6000 | 1.53071 | 55.69 | 3.584 |
| 12* | 61.1702 | 0.1500 | 1. | | 3.475 |
| 13 | 11.0345 | 1.4000 | 1.94595 | 17.98 | 3.503 |
| 14 | 179.5833 | Variable | 1. | | 3.400 |
| 15 | 9.9349 | 1.1000 | 1.58313 | 59.38 | 2.074 |
| 16 | 7415.6576 | 0.7000 | 1. | | 1.936 |
| 17(Stop) | ∞ | Variable | 1. | | 1.759 |
| 18* | 22.2382 | 1.0000 | 1.51633 | 64.14 | 2.500 |
| 19* | −19.3600 | 0.5000 | 1. | | 2.491 |
| 20 | −6.7898 | 0.5000 | 1.92286 | 20.88 | 2.500 |
| 21 | 82.7698 | 1.5000 | 1.58313 | 59.38 | 2.726 |
| 22 | −9.7359 | 0.1500 | 1. | | 3.000 |
| 23* | 176.4917 | 2.2000 | 1.74320 | 49.34 | 3.173 |
| 24* | −5.4230 | Variable | 1. | | 3.445 |
| 25 | 311.2715 | 0.6000 | 1.77250 | 49.60 | 2.764 |
| 26 | 4.9849 | Variable | 1. | | 2.654 |
| 27 | −18.0443 | 1.7465 | 1.58313 | 59.38 | 3.140 |
| 28 | −6.7852 | 0.4000 | 1. | | 3.484 |
| 29 | ∞ | 0.5000 | 1.51633 | 64.14 | 3.731 |
| 30 | ∞ | 0.39995 | 1. | | 3.790 |
| Image plane | ∞ | | | | |

Aspherical surface data

1st surface k = 0., A2 = 0.0000E+00, A4 = −1.7862E−05, A6 = 3.8648E−07,
A8 = 1.3961E−08, A10 = −1.4014E−10

2nd surface k = 0., A2 = 0.0000E+00, A4 = −1.2432E−04, A6 = 3.3187E−06,
A8 = −1.4891E−08, A10 = 2.5961E−10

5th surface k = 0., A2 = 0.0000E+00, A4 = −2.9357E−04, A6 = −1.0229E−08,
A8 = −8.8546E−10, A10 = −9.3778E−11

6th surface k = 0., A2 = 0.0000E+00, A4 = −7.0547E−05, A6 = 0.0000E+00,
A8 = 0.0000E+00, A10 = 0.0000E+00

7th surface k = 0., A2 = 0.0000E+00, A4 = −1.6118E−06, A6 = −2.1018E−07,
A8 = 6.2962E−09, A10 = −8.1553E−11

10th surface k = 0., A2 = 0.0000E+00, A4 = 3.2985E−03, A6 = −8.8576E−05,
A8 = 1.3222E−06, A10 = −9.3772E−09

11th surface k = 0., A2 = 0.0000E+00, A4 = 2.7710E−03, A6 = −1.0844E−04,
A8 = 0.0000E+00, A10 = 0.0000E+00

12th surface k = 0., A2 = 0.0000E+00, A4 = 2.7007E−03, A6 = −6.0056E−05,
A8 = 0.0000E+00, A10 = 0.0000E+00

-continued

| 18th surface |
|---|
| k = 0., A2 = 0.0000E+00, A4 = −1.5988E−04, A6 = 2.2309E−05, A8 = 0.0000E+00, A10 = 0.0000E+00 |

| 19th surface |
|---|
| k = 0., A2 = 0.0000E+00, A4 = 2.9358E−04, A6 = 1.3023E−04, A8 = 0.0000E+00, A10 = 0.0000E+00 |

| 23rd surface |
|---|
| k = 0., A2 = 0.0000E+00, A4 = −1.1892E−03, A6 = −5.8280E−06, A8 = 0.0000E+00, A10 = 0.0000E+00 |

| 24th surface |
|---|
| k = 0., A2 = 0.0000E+00, A4 = 4.0721E−04, A6 = −1.3210E−05, A8 = 0.0000E+00, A10 = 0.0000E+00 |

| Table of index of glass material | List of index per wavelength of medium used in the present embodiment | | | | |
|---|---|---|---|---|---|
| GLA | 587.56 | 656.27 | 486.13 | 435.84 | 404.66 |
| L11 | 1.922860 | 1.910380 | 1.954570 | 1.982810 | 2.009190 |
| L7 | 1.530710 | 1.527870 | 1.537400 | 1.542740 | 1.547272 |
| L8 | 1.945950 | 1.931230 | 1.983830 | 2.018254 | 2.051060 |
| L1 | 2.001700 | 1.988000 | 2.036520 | 2.067256 | 2.095660 |
| L3, L6 | 1.633870 | 1.626381 | 1.653490 | 1.671610 | 1.688826 |
| L9, L12, L15 | 1.583126 | 1.580139 | 1.589960 | 1.595296 | 1.599721 |
| L10 | 1.516330 | 1.513855 | 1.521905 | 1.526213 | 1.529768 |
| CG | 1.516330 | 1.513855 | 1.521905 | 1.526213 | 1.529768 |
| L14 | 1.772499 | 1.767798 | 1.783374 | 1.791971 | 1.799174 |
| L5 | 2.003300 | 1.993011 | 2.028497 | 2.049714 | 2.068441 |
| L4, L13 | 1.743198 | 1.738653 | 1.753716 | 1.762046 | 1.769040 |
| L2 | 1.903660 | 1.895260 | 1.924120 | 1.941280 | 1.956430 |

| Numerical data | | | |
|---|---|---|---|
| | Wide angle | Inter mediate | Telephoto |
| Focal length | 5.10614 | 11.31124 | 24.95003 |
| Fno. | 3.6480 | 4.2307 | 4.9000 |
| Lens total length | 51.7866 | 51.7867 | 51.7866 |
| BF | 0.39995 | 0.39995 | 0.39994 |
| d7 | 0.46186 | 5.35535 | 9.00888 |
| d14 | 8.89928 | 4.00592 | 0.35227 |
| d17 | 4.72521 | 3.36808 | 1.09372 |
| d24 | 3.70491 | 2.84410 | 0.98495 |
| d26 | 2.19892 | 4.41676 | 8.55038 |

| Zoom lens group data | | |
|---|---|---|
| Group | Initial | Focal length |
| 1 | 1 | 12.52546 |
| 2 | 8 | −8.42119 |
| 3 | 15 | 17.05924 |
| 4 | 18 | 7.58154 |
| 5 | 25 | −6.56354 |
| 6 | 27 | 17.64024 |

| 12th surface | | | |
|---|---|---|---|
| h | z1(h) | spherical component | Δz1(h) |
| 2.785 | 0.19797 | 0.06345 | 0.13452 |

| 11th surface | | | |
|---|---|---|---|
| h | z2(h) | spherical component | Δz2(h) |
| 2.785 | −0.48879 | −0.60494 | 0.11615 |

| 10th surface | | | |
|---|---|---|---|
| h | z3(h) | spherical component | Δz3(h) |
| 2.785 | −0.34847 | −0.51018 | 0.16171 |

EXAMPLE 15

Unit mm

| \multicolumn{6}{c}{Surface data} | | | | | |
|---|---|---|---|---|---|
| Surface no. | r | d | nd | νd | ER |
| Object plane | ∞ | ∞ | | | |
| 1 | −22.7309 | 0.9000 | 2.14352 | 17.77 | 7.227 |
| 2 | 621.5701 | 0.3000 | 1. | | 7.040 |
| 3 | ∞ | 9.0000 | 1.90366 | 31.32 | 6.994 |
| 4 | ∞ | 0.2000 | 1. | | 6.160 |
| 5* | 20.9932 | 0.7000 | 1.62263 | 58.16 | 5.990 |
| 6* | 20.9932 | 0.1000 | 1.63387 | 23.38 | 5.869 |
| 7 | 20.7303 | 2.8000 | 2.04300 | 39.00 | 5.820 |
| 8 | −30.2924 | Variable | 1. | | 6.000 |
| 9 | 16.5838 | 0.5000 | 1.88300 | 40.76 | 4.263 |
| 10 | 4.7460 | 2.2000 | 1. | | 3.476 |
| 11* | −48.0230 | 0.6000 | 1.53071 | 55.69 | 3.410 |
| 12 | 11.4647 | 0.5000 | 1.63387 | 23.38 | 3.373 |
| 13 | 35.8884 | 0.6000 | 1.53071 | 55.69 | 3.366 |
| 14* | 7.6215 | 0.5000 | 1. | | 3.327 |
| 15 | 18.2837 | 1.1000 | 1.84666 | 23.78 | 3.342 |
| 16 | −80.2498 | Variable | 1. | | 3.300 |
| 17 | 10.3908 | 1.1000 | 1.58313 | 59.38 | 2.503 |
| 18 | 55.6108 | 0.7000 | 1. | | 2.394 |
| 19(Stop) | ∞ | Variable | 1. | | 2.278 |
| 20* | 6.1157 | 2.3000 | 1.51633 | 64.14 | 2.500 |
| 21 | 32.5083 | 0.5000 | 1.92286 | 20.88 | 2.483 |
| 22 | 14.8826 | 2.0000 | 1.51633 | 64.14 | 2.471 |
| 23* | −8.2511 | 2.0000 | 1. | | 2.500 |
| 24 | 8.9582 | 0.6000 | 1.92286 | 20.88 | 2.190 |
| 25 | 3.3887 | Variable | 1. | | 2.010 |
| 26 | −21.9007 | 2.0000 | 1.51633 | 64.14 | 2.661 |
| 27 | −6.5555 | Variable | 1. | | 3.072 |
| 28 | ∞ | 0.8000 | 1.51633 | 64.14 | 3.684 |
| 29 | ∞ | 0.38479 | 1. | | 3.779 |
| Image plane | ∞ | | | | |

Aspherical surface data

5th surface

K = 0., A2 = 0.0000E+00, A4 = −8.7200E−05, A6 = −2.1549E−07,
A8 = 5.5177E−09, A10 = −8.4879E−11
6th surface K = 0., A2 = 0.0000E+00, A4 = −1.9070E−04, A6 = 1.3212E−06,
A8 = 1.2990E−08, A10 = 0.0000E+00
11th surface K = 11.1716, A2 = 0.0000E+00, A4 = −2.4606E−03, A6 = 1.4463E−04,
A8 = −5.0545E−06, A10 = 6.4239E−08
14th surface K = −6.9788, A2 = 0.0000E+00, A4 = −1.4100E−03, A6 = 1.1270E−04,
A8 = −5.7367E−06, A10 = 1.0219E−07
20th surface K = 1.2365, A2 = 0.0000E+00, A4 = −1.5144E−03, A6 = −4.4742E−05,
A8 = 3.0444E−07, A10 = −3.7998E−07
23th surface K = 0., A2 = 0.0000E+00, A4 = 1.0634E−03, A6 = −5.0730E−05,
A8 = 2.1658E−06, A10 = −2.9025E−07

| Table of index of glass material | List of index per wavelength of medium used in the present embodiment | | | | |
|---|---|---|---|---|---|
| GLA | 587.56 | 656.27 | 486.13 | 435.84 | 404.66 |
| L5 | 2.042998 | 2.035064 | 2.061804 | 2.076930 | 2.089691 |
| L13, L15 | 1.922860 | 1.910380 | 1.954570 | 1.982810 | 2.009190 |
| L7, L9 | 1.530710 | 1.527870 | 1.537400 | 1.542740 | 1.547272 |
| L1 | 2.143520 | 2.125601 | 2.189954 | 2.232324 | 2.273184 |
| L3 | 1.622630 | 1.619350 | 1.630050 | 1.635825 | 1.640600 |
| L4, L8 | 1.633870 | 1.626381 | 1.653490 | 1.671610 | 1.688826 |
| L11 | 1.583126 | 1.580139 | 1.589960 | 1.595296 | 1.599721 |

-continued

| | | | | | |
|---|---|---|---|---|---|
| L12, L14, L16 | 1.516330 | 1.513855 | 1.521905 | 1.526213 | 1.529768 |
| CG | 1.516330 | 1.513855 | 1.521905 | 1.526213 | 1.529768 |
| L6 | 1.882997 | 1.876560 | 1.898221 | 1.910495 | 1.920919 |
| L10 | 1.846660 | 1.836488 | 1.872096 | 1.894186 | 1.914294 |
| L2 | 1.903660 | 1.895260 | 1.924120 | 1.941280 | 1.956430 |

Numerical data

| | Wide angle | Inter mediate | Telephoto |
|---|---|---|---|
| Focal length | 5.11674 | 10.93691 | 24.94675 |
| Fno. | 3.4193 | 4.5117 | 4.9000 |
| Lens total length | 53.0343 | 53.0396 | 53.0342 |
| BF | 0.38479 | 0.38583 | 0.38455 |
| d8 | 0.37543 | 4.83991 | 10.13208 |
| d16 | 10.14450 | 5.68758 | 0.38771 |
| d19 | 5.04206 | 2.03832 | 0.95887 |
| d25 | 2.48587 | 6.88748 | 8.19261 |
| d27 | 2.60168 | 1.20048 | 0.97840 |

Zoom lens group data

| Group | Initial | Focal length |
|---|---|---|
| 1 | 1 | 17.62162 |
| 2 | 9 | −6.81789 |
| 3 | 17 | 21.71914 |
| 4 | 20 | 21.30535 |
| 5 | 26 | 17.35006 |

11th surface

| h | z1(h) | spherical component | Δz1(h) |
|---|---|---|---|
| 2.776 | −0.17700 | −0.08027 | −0.09673 |

12th surface

| h | z2(h) | spherical component | Δz2(h) |
|---|---|---|---|
| 2.776 | 0.34104 | 0.34104 | 0.00000 |

13th surface

| h | z3(h) | spherical component | Δz3(h) |
|---|---|---|---|
| 2.776 | 0.10749 | 0.10749 | −0.00000 |

14th surface

| h | z4(h) | spherical component | Δz4(h) |
|---|---|---|---|
| 2.776 | 0.38255 | 0.52334 | −0.14080 |

EXAMPLE 16

Unit mm

Surface data

| Surface no. | r | d | nd | νd | ER |
|---|---|---|---|---|---|
| Object plane | ∞ | ∞ | | | |
| 1 | 41.8026 | 0.8000 | 1.77250 | 49.60 | 5.933 |
| 2 | 9.2873 | 1.8000 | 1. | | 5.124 |
| 3 | ∞ | 7.0000 | 1.90366 | 31.31 | 5.057 |
| 4 | ∞ | 0.3000 | 1. | | 4.130 |
| 5* | 27.6354 | 0.7000 | 1.53071 | 55.69 | 4.027 |
| 6* | 24.5525 | 0.3500 | 1.76290 | 15.80 | 3.882 |
| 7 | 178.1062 | 0.6000 | 1.53071 | 55.69 | 3.864 |
| 8* | 13.8043 | Variable | 1. | | 3.700 |
| 9* | 7.3070 | 1.8000 | 1.80610 | 40.92 | 2.600 |
| 10* | −22.2795 | 0.1000 | 1. | | 2.262 |
| 11(Stop) | ∞ | 0.2000 | 1. | | 2.160 |

-continued

| | | | | | |
|---|---|---|---|---|---|
| 12 | 6.8649 | 1.2000 | 1.74100 | 52.64 | 2.041 |
| 13 | −73.9430 | 0.4000 | 1.84666 | 23.78 | 1.857 |
| 14 | 4.1446 | Variable | 1. | | 1.700 |
| 15 | −311.5513 | 0.6000 | 1.58313 | 59.38 | 2.667 |
| 16 | 12.1293 | Variable | 1. | | 2.807 |
| 17* | 11.3795 | 2.0000 | 1.80610 | 40.92 | 3.852 |
| 18 | −29.3636 | 2.9706 | 1. | | 3.904 |
| 19 | ∞ | 0.5000 | 1.51633 | 64.14 | 3.837 |
| 20 | ∞ | 0.38967 | 1. | | 3.830 |
| Image plane | ∞ | | | | |

Aspherical surface data

5th surface $K = -1.0000, A2 = 0.0000E+00, A4 = -9.4957E-04, A6 = 5.9841E-06,$
$A8 = 4.4992E-07, A10 = 0.0000E+00$ 6th surface $K = 0., A2 = 0.0000E+00, A4 = -1.2452E-04, A6 = 0.0000E+00,$
$A8 = 0.0000E+00, A10 = 0.0000E+00$ 8th surface $K = -1.2598, A2 = 0.0000E+00, A4 = -1.1437E-03, A6 = 1.8648E-05,$
$A8 = 4.9540E-07, A10 = 0.0000E+00$ 9th surface $K = -1.8866, A2 = 0.0000E+00, A4 = 2.3465E-04, A6 = 3.5155E-06,$
$A8 = 1.0995E-07, A10 = 0.0000E+00$ 10th surface $K = -1.0000, A2 = 0.0000E+00, A4 = 1.7570E-04, A6 = -2.5719E-06,$
$A8 = 3.2121E-07, A10 = 0.0000E+00$ 17th surface $K = 0., A2 = 0.0000E+00, A4 = -9.1445E-05, A6 = -1.4656E-07,$
$A8 = 0.0000E+00, A10 = 0.0000E+00$

| Table of index of glass material | List of index per wavelength of medium used in the present embodiment | | | | |
|---|---|---|---|---|---|
| GLA | 587.56 | 656.27 | 486.13 | 435.84 | 404.66 |
| L4 | 1.762905 | 1.750038 | 1.798323 | 1.832460 | 1.866689 |
| L3, L5 | 1.530710 | 1.527870 | 1.537400 | 1.542740 | 1.547272 |
| L9 | 1.583126 | 1.580139 | 1.589960 | 1.595296 | 1.599721 |
| CG | 1.516330 | 1.513855 | 1.521905 | 1.526213 | 1.529768 |
| L6, L10 | 1.806098 | 1.800248 | 1.819945 | 1.831173 | 1.840781 |
| L1 | 1.772499 | 1.767798 | 1.783374 | 1.791971 | 1.799174 |
| L7 | 1.740999 | 1.736727 | 1.750805 | 1.758500 | 1.764914 |
| L8 | 1.846660 | 1.836488 | 1.872096 | 1.894186 | 1.914294 |
| L2 | 1.903660 | 1.895260 | 1.924120 | 1.941278 | 1.956430 |

Numerical data

| | Wide angle | Inter mediate | Telephoto |
|---|---|---|---|
| Focal length | 6.21961 | 10.73920 | 18.59456 |
| Fno. | 3.1160 | 4.3832 | 5.9000 |
| Lens total length | 39.8656 | 39.8638 | 39.8693 |
| BF | 0.38967 | 0.39236 | 0.38762 |
| d8 | 11.44370 | 5.81199 | 0.30000 |
| d14 | 4.52788 | 5.67324 | 15.58729 |
| d16 | 2.18372 | 6.66560 | 2.27378 |

Zoom lens group data

| Group | Initial | Focal length |
|---|---|---|
| 1 | 1 | −12.46552 |
| 2 | 9 | 9.69313 |
| 3 | 15 | −20.00735 |
| 4 | 17 | 10.40187 |

8th surface

| h | z1(h) | spherical component | Δz1(h) |
|---|---|---|---|
| 2.790 | 0.22249 | 0.28484 | −0.06235 |

-continued

7th surface

| h | z2(h) | spherical component | Δz2(h) |
|---|---|---|---|
| 2.790 | 0.02185 | 0.02185 | −0.00000 |

6th surface

| h | z3(h) | spherical component | Δz3(h) |
|---|---|---|---|
| 2.790 | 0.15147 | 0.15901 | −0.00754 |

5th surface

| h | z4(h) | spherical component | Δz4(h) |
|---|---|---|---|
| 2.790 | 0.08777 | 0.14118 | −0.05341 |

EXAMPLE 17

Unit mm

Surface data

| Surface no. | r | d | nd | vd | ER |
|---|---|---|---|---|---|
| Object plane | ∞ | ∞ | | | |
| 1 | 26.3916 | 0.8000 | 1.58313 | 59.38 | 7.804 |
| 2 | 14.2860 | 2.2000 | 1. | | 7.016 |
| 3 | ∞ | 7.0000 | 1.90366 | 31.31 | 6.828 |
| 4 | ∞ | Variable | 1. | | 5.065 |
| 5* | −26.9917 | 0.7000 | 1.53071 | 55.69 | 4.706(L1) |
| 6* | 14.0407 | 0.6000 | 1.63387 | 23.38 | 4.255(L2) |
| 7* | 23.2719 | Variable | 1. | | 4.200 |
| 8* | 6.3016 | 1.2000 | 1.85135 | 40.10 | 2.033 |
| 9* | −19.4608 | 0.1000 | 1. | | 1.852 |
| 10(Stop) | ∞ | 0.2000 | 1. | | 1.749 |
| 11* | 5.5217 | 1.2000 | 2.10223 | 16.77 | 1.762 |
| 12* | 2.9744 | Variable | 1. | | 1.595 |
| 13 | −19.2403 | 2.1000 | 1.74320 | 49.34 | 2.403 |
| 14* | −7.4765 | Variable | 1. | | 2.820 |
| 15 | ∞ | 0.5000 | 1.51633 | 64.14 | 3.692 |
| 16 | ∞ | 0.39539 | 1. | | 3.744 |
| Image plane | ∞ | | | | |

Aspherical surface data

5th surface

K −1.0000, A2 = 0.0000E+00, A4 = −7.6649E−04, A6 = 3.7390E−05,
A8 = −5.3476E−07, A10 = 0.0000E+00

6th surface

K 1.3251, A2 = 0.0000E+00, A4 = 4.7769E−04, A6 = −4.0941E−05,
A8 = −9.1099E−07, A10 = 1.1856E−07

7th surface

K −1.2797, A2 = 0.0000E+00, A4 = −6.0926E−04, A6 = 3.0893E−05,
A8 = −6.1130E−08, A10 = 0.0000E+00

8th surface

K −1.8057, A2 = 0.0000E+00, A4 = 9.4518E−04, A6 = −2.3991E−05,
A8 = −2.5329E−06, A10 = 0.0000E+00

9th surface

K −1.0000, A2 = 0.0000E+00, A4 = 7.2283E−04, A6 = −7.5368E−05,
A8 = 2.5676E−06, A10 = 0.0000E+00

11th surface

K = −0.3348, A2 = 0.0000E+00, A4 = −3.2566E−03, A6 = −1.7964E−05,
A8 = 1.2113E−05, A10 = 0.0000E+00

-continued

12th surface

K = −0.8830, A2 = 0.0000E+00, A4 = −3.4462E−03, A6 = 1.1323E−04,
A8 = 2.2955E−05, A10 = 0.0000E+00

14th surface

K = −1.0476, A2 = 0.0000E+00, A4 = 2.7239E−04, A6 = −3.6171E−06,
A8 = 0.0000E+00, A10 = 0.0000E+00

| Table of index of glass material | List of index per wavelength of medium used in the present embodiment | | | | |
|---|---|---|---|---|---|
| GLA | 587.56 | 656.27 | 486.13 | 435.84 | 404.66 |
| L3 | 1.530710 | 1.527870 | 1.537400 | 1.542740 | 1.547272 |
| L6 | 2.102230 | 2.084080 | 2.149790 | 2.193956 | 2.236910 |
| L5 | 1.851350 | 1.845050 | 1.866280 | 1.878368 | 1.888684 |
| L4 | 1.633870 | 1.626381 | 1.653490 | 1.671610 | 1.688826 |
| L1 | 1.583126 | 1.580139 | 1.589960 | 1.595296 | 1.599721 |
| CG | 1.516330 | 1.513855 | 1.521905 | 1.526213 | 1.529768 |
| L7 | 1.743198 | 1.738653 | 1.753716 | 1.762046 | 1.769040 |
| L2 | 1.903660 | 1.895260 | 1.924120 | 1.941278 | 1.956430 |

| Numerical data | | | |
|---|---|---|---|
| | Wide angle | Inter mediate | Telephoto |
| Focal length | 6.20135 | 10.73772 | 18.59931 |
| Fno. | 3.1152 | 4.2339 | 5.9000 |
| Lens total length | 37.7648 | 37.7638 | 37.7583 |
| BF | 0.39539 | 0.39323 | 0.38983 |
| d4 | 1.19259 | 4.34702 | 1.00000 |
| d7 | 11.57783 | 3.84998 | 0.30000 |
| d12 | 3.00632 | 7.60862 | 14.44613 |
| d14 | 4.99264 | 4.96494 | 5.02229 |

| Zoom lens group data | | |
|---|---|---|
| Group | Initial | Focal length |
| 1 | 1 | −54.74267 |
| 2 | 5 | −25.09179 |
| 3 | 8 | 9.86806 |
| 4 | 13 | 15.28982 |

| 5th surface | | | |
|---|---|---|---|
| h | z1(h) | spherical component | Δz1(h) |
| 2.806 | −0.17718 | −0.14625 | −0.03093 |

| 6th surface | | | |
|---|---|---|---|
| h | z2(h) | spherical component | Δz2(h) |
| 2.806 | 0.29693 | 0.28324 | 0.01369 |

| 7th surface | | | |
|---|---|---|---|
| h | z3(h) | spherical component | Δz3(h) |
| 2.806 | 0.14607 | 0.16979 | −0.02372 |

EXAMPLE 18

Unit mm

| Surface data | | | | | |
|---|---|---|---|---|---|
| Surface no. | r | d | nd | vd | ER |
| Object plane | ∞ | ∞ | | | |
| 1 | 55.1968 | 0.8000 | 1.80100 | 34.97 | 7.691 |
| 2 | 13.1051 | 2.2000 | 1. | | 6.793 |
| 3 | ∞ | 7.0000 | 1.90366 | 31.31 | 6.708 |

-continued

| | | | | | |
|---|---|---|---|---|---|
| 4 | ∞ | 0.1500 | 1. | | 5.712 |
| 5 | 18.2265 | 2.0000 | 1.57200 | 33.80 | 5.440 |
| 6 | 515.9359 | Variable | 1. | | 5.092 |
| 7* | −24.3306 | 0.7000 | 1.53071 | 55.69 | 4.746 |
| 8* | 12.1202 | 0.6000 | 1.63387 | 23.38 | 4.261 |
| 9* | 22.3712 | Variable | 1. | | 4.200 |
| 10* | 4.9623 | 1.2000 | 1.78590 | 44.20 | 2.274 |
| 11* | −91.4478 | 0.1000 | 1. | | 2.118 |
| 12(Stop) | ∞ | 0.2000 | 1. | | 2.031 |
| 13* | 5.3649 | 1.2000 | 2.10223 | 16.77 | 2.018 |
| 14* | 2.9524 | Variable | 1. | | 1.718 |
| 15 | 412.8154 | 2.1000 | 1.74320 | 49.34 | 2.044 |
| 16* | −16.1981 | Variable | 1. | | 2.404 |
| 17 | ∞ | 0.5000 | 1.51633 | 64.14 | 3.694 |
| 18 | ∞ | 0.39108 | 1. | | 3.762 |
| Image plane | ∞ | | | | |

Aspherical surface data

7th surface

K = −1.0000, A2 = 0.0000E+00, A4 = −3.1727E−04, A6 = 1.8871E−05,
A8 = −1.0746E−07, A10 = 0.0000E+00

8th surface

K = 1.3434, A2 = 0.0000E+00, A4 = −9.2204E−04, A6 = 3.2320E−05,
A8 = 2.5207E−06, A10 = −8.7542E−08

9th surface

K = −1.2776, A2 = 0.0000E+00, A4 = −5.1430E−04, A6 = 3.7208E−05,
A8 = −6.3364E−08, A10 = 0.0000E+00

10th surface

K = −1.8025, A2 = 0.0000E+00, A4 = 3.9235E−04, A6 = −1.1264E−04,
A8 = −6.7804E−06, A10 = 0.0000E+00

11th surface

K = −1.0000, A2 = 0.0000E+00, A4 = −1.4207E−03, A6 = −1.0773E−05,
A8 = −2.4151E−06, A10 = 0.0000E+00

13th surface

K = −0.3324, A2 = 0.0000E+00, A4 = −3.2536E−04, A6 = 4.6645E−05,
A8 = 1.4331E−05, A10 = 0.0000E+00

14th surface

K = −0.8736, A2 = 0.0000E+00, A4 = 4.1630E−03, A6 = 1.4286E−04,
A8 = 3.5255E−05, A10 = 0.0000E+00

16th surface

K = −0.9768, A2 = 0.0000E+00, A4 = −2.4685E−04, A6 = 8.1195E−07,
A8 = 0.0000E+00, A10 = 0.0000E+00

| Table of index of glass material | List of index per wavelength of medium used in the present embodiment | | | | |
|---|---|---|---|---|---|
| GLA | 587.56 | 656.27 | 486.13 | 435.84 | 404.66 |
| L3 | 1.571998 | 1.567089 | 1.584010 | 1.594103 | 1.602966 |
| L4 | 1.530710 | 1.527870 | 1.537400 | 1.542740 | 1.547272 |
| L6 | 2.102230 | 2.084080 | 2.149790 | 2.193956 | 2.236910 |
| L5 | 1.633870 | 1.626381 | 1.653490 | 1.671610 | 1.688826 |
| CG | 1.516330 | 1.513855 | 1.521905 | 1.526213 | 1.529768 |
| L | 1.785896 | 1.780584 | 1.798364 | 1.808375 | 1.816868 |
| L8 | 1.743198 | 1.738653 | 1.753716 | 1.762046 | 1.769040 |
| L1 | 1.800999 | 1.794275 | 1.817182 | 1.830612 | 1.842361 |
| L2 | 1.903660 | 1.895260 | 1.924120 | 1.941278 | 1.956430 |

Numerical data

| | Wide angle | Inter mediate | Telephoto |
|---|---|---|---|
| Focal length | 6.21180 | 10.72860 | 18.59750 |
| Fno. | 2.8769 | 4.0588 | 5.9000 |
| Lens total length | 38.5193 | 38.5170 | 38.5195 |
| BF | 0.39108 | 0.38954 | 0.39144 |
| d6 | 1.18137 | 2.58778 | 1.00000 |
| d9 | 10.73328 | 4.43577 | 0.30000 |
| d14 | 1.48380 | 8.38483 | 16.08260 |
| d16 | 5.97977 | 3.96908 | 1.99542 |

-continued

Zoom lens group data

| Group | Initial | Focal length |
|---|---|---|
| 1 | 1 | −129.65847 |
| 2 | 7 | −23.82629 |
| 3 | 10 | 10.33788 |
| 4 | 15 | 21.01608 |

7th surface

| h | z1(h) | spherical component | Δz1(h) |
|---|---|---|---|
| 2.797 | −0.17153 | −0.16128 | −0.01025 |

8th surface

| h | z2(h) | spherical component | Δz2(h) |
|---|---|---|---|
| 2.797 | 0.29936 | 0.32710 | −0.02774 |

9th surface

| h | z3(h) | spherical component | Δz3(h) |
|---|---|---|---|
| 2.797 | 0.16074 | 0.17551 | −0.01477 |

Next, parameter and values of conditional expression in each embodiments are described.

Index in d-line at each of temperature (A-D denotes a glass medium)

| | Index at 20° C. 60% | Adde number at 20 degree | 0° C. |
|---|---|---|---|
| A | 1.53071 | 55.69 | 1.53286 |
| B | 1.63387 | 23.38 | 1.63728 |
| C | 1.63494 | 23.22 | 1.63837 |
| D | 1.76290 | 15.80 | 1.76607 |

| | 40° C. | Temperature dispersion | Reciprocal |
|---|---|---|---|
| A | 1.52856 | 0.81024e−2 | 123.42 |
| B | 1.63047 | 1.07435e−2 | 93.08 |
| C | 1.63151 | 1.08042e−2 | 92.56 |
| D | 1.75973 | 0.83104e−2 | 120.33 |

Refractive index of base line spectrum of each mediums at 20° C.

| | C line | d line | e line | F line | g line | h line |
|---|---|---|---|---|---|---|
| A | 1.52787 | 1.53071 | 1.53296 | 1.53740 | 1.54274 | 1.54727 |
| B | 1.62638 | 1.63387 | 1.64022 | 1.65349 | 1.67161 | 1.68883 |
| C | 1.62729 | 1.63494 | 1.64139 | 1.65464 | 1.67291 | 1.68988 |
| D | 1.75004 | 1.76290 | 1.77413 | 1.79832 | 1.83246 | 1.86669 |

Refractive index of base line spectrum of each mediums at 0° C.

| | C line | d line | e line | F line | g line | h line |
|---|---|---|---|---|---|---|
| A | 1.53000 | 1.53286 | 1.53512 | 1.53958 | 1.54495 | 1.54951 |
| B | 1.62973 | 1.63728 | 1.64368 | 1.65698 | 1.67532 | 1.69283 |
| C | 1.63080 | 1.63837 | 1.64502 | 1.65837 | 1.67694 | 1.69379 |
| D | 1.75301 | 1.76607 | 1.77749 | 1.80211 | 1.83731 | 1.87291 |

Refractive index of base line spectrum of each mediums at 40° C.

| | C line | d line | e line | F line | g line | h line |
|---|---|---|---|---|---|---|
| A | 1.52573 | 1.52856 | 1.53081 | 1.53522 | 1.54052 | 1.54500 |
| B | 1.62304 | 1.63047 | 1.63676 | 1.65001 | 1.66792 | 1.68487 |
| C | 1.62377 | 1.63151 | 1.63775 | 1.65091 | 1.66888 | 1.68547 |
| D | 1.74707 | 1.75973 | 1.77078 | 1.79455 | 1.82877 | 1.86279 |

| | | Example 1 | Example 2 | Example 3 |
|---|---|---|---|---|
| 1 | fw (Wide angle) | 6.308 | 6.308 | 5.980 |
| 2 | fs (Inter mediate) | 9.871 | 9.871 | 10.170 |
| 3 | ft (Telephoto) | 17.688 | 17.692 | 17.298 |
| 4 | half angle of field (Wide angle) with DT | 33.9 | 34.1 | 34.8 |
| 5 | half angle of field (Inter mediate) with DT | 20.7 | 20.9 | 20.5 |
| 6 | half angle of field (Telephoto) with DT | 12.0 | 12.0 | 12.4 |
| 7 | γ(=ft/fw) | 2.804 | 2.805 | 2.893 |

-continued

| | | | | |
|---|---|---|---|---|
| 8 | y10 | 3.82 | 3.82 | 3.84 |
| 9 | 1/v2 − 1/v1 | *** | *** | *** |
| 10 | 1/v2 − 1/v13 | 0.02511 | 0.02511 | 0.02482 |
| 11 | 1/v13 | 55.69 | 55.69 | 55.69 |
| 12 | v2/v1 | *** | *** | *** |
| 13 | v2/v13 | 0.41695 | 0.41695 | 0.41982 |
| 14 | Tv2/Tv1 | *** | *** | *** |
| 15 | Tv2/Tv13 | 0.74996 | 0.74996 | 0.75417 |
| 16 | n2 − n1 | 0.10423 | 0.10423 | 0.10316 |
| 17 | n2 − n3 | 0.10423 | 0.10423 | 0.10316 |
| 18 | θgF | 0.6680 | 0.6680 | 0.6684 |
| 19 | θhg | 0.6205 | 0.6205 | 0.6351 |
| 20 | βgF | 0.7293 | 0.7293 | 0.7301 |
| 21 | βhg | 0.7106 | 0.7106 | 0.7258 |
| 22 | log(φ3/φ1) | −0.00431 | −0.53255 | −0.02597 |
| 23 | m | 2.5 | 2.5 | 2.5 |
| 24 | a = (y10)2 × log10γ/fw | 1.0359 | 1.0362 | 1.1376 |
| 25 | h = m × a | 2.5898 | 2.5905 | 2.8440 |
| 26 | z2(h) | 0.30510 | 0.05595 | −0.30550 |
| 27 | z3(h) | 0.19842 | 0.16528 | −0.04194 |
| 28 | |z2(h) − z3(h)| | 0.10668 | 0.10933 | 0.26356 |
| 29 | Δz2(h) | −0.00000 | 0.00000 | −0.00000 |
| 30 | Δz3(h) | −0.00000 | 0.00000 | 0.00763 |
| 31 | Δz2(h) × {(1/v1) − (1/v2)} | −0.00000 | −0.00000 | −0.00000 |
| 32 | Δz3(h) × {(1/v2) − (1/v3)} | −0.00000 | −0.00000 | 0.18938e−3 |
| 33 | P | 0.00000 | 0.00000 | 0.18938e−3 |
| 34 | φ | −0.061151 | −0.063132 | −0.064757 |
| 35 | P × φ | 0.00000 | 0.00000 | −0.1226e−4 |
| 36 | t2 | 0.35 | 0.514 | 0.8 |
| 37 | |z2(h) − z3(h)|/t2 | 0.30480 | 0.21270 | 0.32945 |
| 38 | nBn1 | *** | *** | *** |
| 39 | nBn1 − nBp | *** | *** | *** |
| 40 | φBn2/φBn1 | *** | *** | *** |
| 41 | Δz1(h) | −0.06564 | −0.09672 | 0.07295 |
| 42 | Δz4(h) | −0.09271 | −0.06732 | 0.08622 |
| 43 | {Δz1(h) − Δz4(h)}/(fw × tanω10w) | 6.3862e−3 | −6.8839e−3 | −3.1928e−3 |
| 44 | {Δz1(h) − Δz3(h)}/(fw × tanω10w) | *** | *** | *** |

| | | Example 4 | Example 5 | Example 6 |
|---|---|---|---|---|
| 1 | fw (Wide angle) | 5.000 | 3.202 | 3.203 |
| 2 | fs (Inter mediate) | 8.660 | 5.529 | 5.533 |
| 3 | ft (Telephoto) | 15.000 | 9.602 | 9.596 |
| 4 | half angle of field (Wide angle) with DT | 41.1 | 38.6 | 38.6 |
| 5 | half angle of field (Inter mediate) with DT | 23.8 | 21.7 | 21.8 |
| 6 | half angle of field (Telephoto) with DT | 14.1 | 12.9 | 12.9 |
| 7 | γ(=ft/fw) | 3.000 | 2.999 | 2.996 |
| 8 | y10 | 3.84 | 2.25 | 2.25 |
| 9 | 1/v2 − 1/v1 | *** | 0.02482 | 0.04533 |
| 10 | 1/v2 − 1/v13 | 0.04533 | *** | *** |
| 11 | 1/v13 | 55.69 | *** | *** |
| 12 | v2/v1 | *** | 0.41982 | 0.28371 |
| 13 | v2/v13 | 0.28371 | *** | *** |
| 14 | Tv2/Tv1 | *** | 0.75417 | 0.97496 |
| 15 | Tv2/Tv13 | 0.97496 | *** | *** |
| 16 | n2 − n1 | 0.23219 | 0.10316 | 0.23219 |
| 17 | n2 − n3 | 0.23219 | *** | *** |
| 18 | θgF | 0.7070 | 0.6684 | 0.7070 |
| 19 | θhg | 0.7089 | 0.6351 | 0.7089 |
| 20 | βgF | 0.7487 | 0.7301 | 0.7487 |
| 21 | βhg | 0.7702 | 0.7258 | 0.7702 |
| 22 | log(φ3/φ1) | −0.66563 | *** | *** |
| 23 | m | 2.5 | 2.5 | 2.5 |
| 24 | a = (y10)2 × log10γ/fw | 1.4071 | 0.7541 | 0.7532 |
| 25 | h = m × a | 3.5178 | 1.8853 | 1.8830 |
| 26 | z2(h) | 0.74073 | 0.43208 | 0.28273 |
| 27 | z3(h) | 0.34312 | 0.26552 | 0.21039 |
| 28 | |z2(h) − z3(h)| | 0.39761 | 0.16656 | 0.07234 |
| 29 | Δz2(h) | −0.00793 | −0.04711 | 0.00529 |
| 30 | Δz3(h) | −0.00000 | −0.05894 | −0.00816 |
| 31 | Δz2(h) × {(1/v1) − (1/v2)} | 0.35947e−3 | 1.16927e−3 | 0.23940e−3 |
| 32 | Δz3(h) × {(1/v2) − (1/v3)} | −0.00000 | −2.52096e−3 | −0.51646e−3 |
| 33 | P | 0.35947e−3 | −1.35169e−3 | −0.75586e−3 |
| 34 | φ | −0.095796 | −0.10779 | −0.11166 |
| 35 | P × φ | −0.3444e−4 | 1.455e−4 | 0.8440e−4 |
| 36 | t2 | 0.7 | 0.5 | 0.25 |
| 37 | |z2(h) − z3(h)|/t2 | 0.56891 | 0.33312 | 0.28936 |
| 38 | nBn1 | *** | *** | *** |
| 39 | nBn1 − nBp | *** | *** | *** |
| 40 | φBn2/φBn1 | *** | *** | *** |

-continued

| | | | |
|---|---|---|---|
| 41 $\Delta z1(h)$ | 0.18520 | −0.02612 | 0.00986 |
| 42 $\Delta z4(h)$ | 0.16091 | *** | *** |
| 43 $\{\Delta z1(h) - \Delta z4(h)\}/(fw \times \tan\omega 10w)$ | 5.5688e-3 | *** | *** |
| 44 $\{\Delta z1(h) - \Delta z3(h)\}/(fw \times \tan\omega 10w)$ | *** | 0.012840 | 7.0475e-3 |

| | Example 7 | Example 8 | Example 9 |
|---|---|---|---|
| 1 fw (Wide angle) | 5.980 | 6.417 | 5.025 |
| 2 fs (Inter mediate) | 10.170 | 10.741 | 14.485 |
| 3 ft (Telephoto) | 17.300 | 18.473 | 47.857 |
| 4 half angle of field (Wide angle) with DT | 36.2 | 34.8 | 41.3 |
| 5 half angle of field (Inter mediate) with DT | 20.4 | 21.3 | 14.8 |
| 6 half angle of field (Telephoto) with DT | 12.3 | 12.6 | 4.6 |
| 7 $\gamma(=ft/fw)$ | 2.893 | 2.879 | 9.524 |
| 8 y10 | 3.84 | 3.82 | 3.83 |
| 9 $1/\nu 2 - 1/\nu 1$ | *** | *** | *** |
| 10 $1/\nu 2 - 1/\nu 13$ | 0.04533 | 0.02482 | 0.02482 |
| 11 $1/\nu 13$ | 55.69 | 55.69 | 55.69 |
| 12 $\nu 2/\nu 1$ | *** | *** | *** |
| 13 $\nu 2/\nu 13$ | 0.28371 | 0.41982 | 0.41982 |
| 14 $T\nu 2/T\nu 1$ | *** | *** | *** |
| 15 $T\nu 2/T\nu 13$ | 0.97496 | 0.75417 | 0.75417 |
| 16 $n2 - n1$ | 0.23219 | 0.10316 | 0.10316 |
| 17 $n2 - n3$ | 0.23219 | 0.10316 | 0.10316 |
| 18 $\theta gF$ | 0.7070 | 0.6684 | 0.6684 |
| 19 $\theta hg$ | 0.7089 | 0.6351 | 0.6351 |
| 20 $\beta gF$ | 0.7487 | 0.7301 | 0.7301 |
| 21 $\beta hg$ | 0.7702 | 0.7258 | 0.7258 |
| 22 $\log(\phi 3/\phi 1)$ | −0.42809 | x | −1.40288 |
| 23 m | 2.5 | 2.5 | 1.0 |
| 24 $a = (y10)2 \times \log 10\gamma/fw$ | 1.1376 | 1.0498 | 2.8574 |
| 25 $h = m \times a$ | 2.8440 | 2.6245 | 2.8574 |
| 26 $z2(h)$ | 0.39391 | 0.29077 | 0.79377 |
| 27 $z3(h)$ | 0.19970 | 0.14407 | 0.41693 |
| 28 $|z2(h) - z3(h)|$ | 0.19421 | 0.14670 | 0.37684 |
| 29 $\Delta z2(h)$ | −0.02024 | −0.02044 | −0.22816 |
| 30 $\Delta z3(h)$ | 0.00000 | 0.00000 | −0.00000 |
| 31 $\Delta z2(h) \times \{(1/\nu 1) - (1/\nu 2)\}$ | 0.91748e-3 | 0.50732e-3 | 5.66293e-3 |
| 32 $\Delta z3(h) \times \{(1/\nu 2) - (1/\nu 3)\}$ | −0.00000 | −0.00000 | −0.00000 |
| 33 P | 0.91748e-3 | 0.50732e-3 | 5.66293e-3 |
| 34 $\phi$ | −0.074908 | −0.062702 | −0.057487 |
| 35 $P \times \phi$ | −0.6873e-4 | −0.3181e-4 | −0.3255e-4 |
| 36 t2 | 0.7 | 0.4 | 0.6 |
| 37 $|z2(h) - z3(h)|/t2$ | 0.27744 | 0.36675 | 0.62807 |
| 38 nBn1 | *** | *** | 1.88300 |
| 39 nBn1 − nBp | *** | *** | 0.07490 |
| 40 $\phi Bn2/\phi Bn1$ | *** | *** | 0.34084 |
| 41 $\Delta z1(h)$ | −0.00022 | 0.04549 | −0.00091 |
| 42 $\Delta z4(h)$ | −0.05258 | 0.03931 | −0.03809 |
| 43 $\{\Delta z1(h) - \Delta z4(h)\}/(fw \times \tan\omega 10w)$ | 0.011963 | 1.3857e-3 | 8.4221e-3 |
| 44 $\{\Delta z1(h) - \Delta z3(h)\}/(fw \times \tan\omega 10w)$ | *** | *** | *** |

| | Example 10 | Example 11 | Example 12 |
|---|---|---|---|
| 1 fw (Wide angle) | 5.100 | 5.272 | 5.168 |
| 2 fs (Inter mediate) | 14.614 | 11.118 | 11.098 |
| 3 ft (Telephoto) | 47.878 | 24.978 | 24.980 |
| 4 half angle of field (Wide angle) with DT | 40.8 | 39.7 | 40.2 |
| 5 half angle of field (Inter mediate) with DT | 14.6 | 18.7 | 18.8 |
| 6 half angle of field (Telephoto) with DT | 4.6 | 8.8 | 8.7 |
| 7 $\gamma(=ft/fw)$ | 9.384 | 4.738 | 4.834 |
| 8 y10 | 3.83 | 3.84 | 3.84 |
| 9 $1/\nu 2 - 1/\nu 1$ | 0.04533 | *** | 0.04533 |
| 10 $1/\nu 2 - 1/\nu 13$ | *** | 0.02482 | *** |
| 11 $1/\nu 13$ | 55.69 | 55.69 | 55.69 |
| 12 $\nu 2/\nu 1$ | 0.28371 | *** | 0.28371 |
| 13 $\nu 2/\nu 13$ | *** | 0.41982 | *** |
| 14 $T\nu 2/T\nu 1$ | 0.97496 | *** | 0.97496 |
| 15 $T\nu 2/T\nu 13$ | *** | 0.75417 | *** |
| 16 $n2 - n1$ | 0.23219 | 0.10316 | 0.23219 |
| 17 $n2 - n3$ | *** | 0.10316 | *** |
| 18 $\theta gF$ | 0.7070 | 0.6684 | 0.7070 |
| 19 $\theta hg$ | 0.7089 | 0.6351 | 0.7089 |
| 20 $\beta gF$ | 0.7487 | 0.7301 | 0.7487 |
| 21 $\beta hg$ | 0.7702 | 0.7258 | 0.7702 |
| 22 $\log(\phi 3/\phi 1)$ | *** | −0.12968 | *** |
| 23 m | 1.0 | 1.4 | 1.4 |
| 24 $a = (y10)2 \times \log 10\gamma/fw$ | 2.7968 | 1.8896 | 1.9525 |
| 25 $h = m \times a$ | 2.7968 | 2.6454 | 2.7335 |
| 26 $z2(h)$ | 0.52978 | 0.22021 | 0.35390 |

-continued

| | | | | |
|---|---|---|---|---|
| 27 | z3(h) | 0.23015 | 0.10012 | 0.17367 |
| 28 | \|z2(h) − z3(h)\| | 0.29963 | 0.12009 | 0.18023 |
| 29 | Δz2(h) | −0.11326 | 0.00000 | −0.01891 |
| 30 | Δz3(h) | −0.04747 | 0.00000 | −0.06054 |
| 31 | Δz2(h) × {(1/ν1) − (1/ν2)} | 5.13408e−3 | −0.00000 | 0.85719e−3 |
| 32 | Δz3(h) × {(1/ν2) − (1/ν3)} | −3.00443e−3 | −0.00000 | −3.83165e−3 |
| 33 | P | 2.12965e−3 | 0.00000 | −2.97446e−3 |
| 34 | φ | −0.042548 | −0.048299 | −0.025825 |
| 35 | P × φ | −0.9061e−4 | 0.00000 | 0.7682e−4 |
| 36 | t2 | 0.7 | 0.3 | 0.6 |
| 37 | \|z2(h) − z3(h)\|/t2 | 0.42804 | 0.40030 | 0.28945 |
| 38 | nBn1 | 2.0033 | 2.0033 | 2.0033 |
| 39 | nBn1 − nBp | 0.05735 | 0.05735 | 0.05735 |
| 40 | φBn2/φBn1 | 0.24638 | 0.30075 | 0.16963 |
| 41 | Δz1(h) | −0.03007 | −0.07435 | −0.07752 |
| 42 | Δz4(h) | *** | −0.07937 | *** |
| 43 | {Δz1(h) − Δz4(h)}/(fw × tanω10w) | *** | 1.1469e−3 | *** |
| 44 | {Δz1(h) − Δz3(h)}/(fw × tanω10w) | 3.9526e−3 | *** | −3.8880e−3 |

| | | Example 13 | Example 14 | Example 15 |
|---|---|---|---|---|
| 1 | fw (Wide angle) | 6.679 | 5.106 | 5.117 |
| 2 | fs (Inter mediate) | 11.385 | 11.311 | 10.937 |
| 3 | ft (Telephoto) | 24.526 | 24.950 | 24.947 |
| 4 | half angle of field (Wide angle) with DT | 33.1 | 40.6 | 40.5 |
| 5 | half angle of field (Inter mediate) with DT | 18.6 | 18.5 | 19.4 |
| 6 | half angle of field (Telephoto) with DT | 8.5 | 8.9 | 8.6 |
| 7 | γ(=ft/fw) | 3.672 | 4.886 | 4.875 |
| 8 | y10 | 3.84 | 3.84 | 3.84 |
| 9 | 1/ν2 − 1/ν1 | *** | 0.02482 | *** |
| 10 | 1/ν2 − 1/ν13 | 0.04533 | *** | 0.02482 |
| 11 | 1/ν13 | 55.69 | 55.69 | 55.69 |
| 12 | ν2/ν1 | *** | 0.41982 | *** |
| 13 | ν2/ν13 | 0.28371 | *** | 0.41982 |
| 14 | Tν2/Tν1 | *** | 0.75417 | *** |
| 15 | Tν2/Tν13 | 0.97496 | *** | 0.75417 |
| 16 | n2 − n1 | 0.23219 | 0.10316 | 0.10316 |
| 17 | n2 − n3 | 0.23219 | *** | 0.10316 |
| 18 | θgF | 0.7070 | 0.6684 | 0.6684 |
| 19 | θhg | 0.7089 | 0.6351 | 0.6351 |
| 20 | βgF | 0.7487 | 0.7301 | 0.7301 |
| 21 | βhg | 0.7702 | 0.7258 | 0.7258 |
| 22 | log(φ3/φ1) | −0.47123 | *** | −0.02407 |
| 23 | m | 1.4 | 1.4 | 1.4 |
| 24 | a = (y10)2 × log10γ/fw | 1.2472 | 1.9896 | 1.9825 |
| 25 | h = m × a | 1.7461 | 2.7854 | 2.7755 |
| 26 | z2(h) | −0.01961 | −0.48879 | 0.34104 |
| 27 | z3(h) | −0.06810 | −0.34847 | 0.10749 |
| 28 | \|z2(h) − z3(h)\| | 0.04849 | 0.14032 | 0.23355 |
| 29 | Δz2(h) | −0.00000 | 0.11615 | 0.00000 |
| 30 | Δz3(h) | 0.00205 | 0.16171 | −0.00000 |
| 31 | Δz2(h) × {(1/ν1) − (1/ν2)} | −0.00000 | −2.88284e−3 | −0.00000 |
| 32 | Δz3(h) × {(1/ν2) − (1/ν3)} | 0.09293e−3 | 6.91660e−3 | −0.00000 |
| 33 | P | 0.09293e−3 | 4.03376e−3 | 0.00000 |
| 34 | φ | −0.052681 | −0.073994 | −0.075015 |
| 35 | P × φ | −0.0490e−4 | −2.9847e−4 | 0.00000 |
| 36 | t2 | 0.4 | 0.6 | 0.5 |
| 37 | \|z2(h) − z3(h)\|/t2 | 0.12123 | 0.23387 | 0.46710 |
| 38 | nBn1 | 1.88300 | 2.0033 | 1.88300 |
| 39 | nBn1 − nBp | 0.03634 | 0.05735 | 0.03634 |
| 40 | φBn2/φBn1 | 0.40789 | 0.51460 | 0.57604 |
| 41 | Δz1(h) | 0.00204 | 0.13452 | −0.09673 |
| 42 | Δz4(h) | −0.00134 | *** | −0.14080 |
| 43 | {Δz1(h) − Δz4(h)}/(fw × tanω10w) | 0.77630e−3 | *** | 0.010084 |
| 44 | {Δz1(h) − Δz3(h)}/(fw × tanω10w) | *** | −6.2129e−3 | *** |

| | | Example 16 | Example 17 | Example 18 |
|---|---|---|---|---|
| 1 | fw (Wide angle) | 6.220 | 6.201 | 6.212 |
| 2 | fs (Inter mediate) | 10.739 | 10.738 | 10.729 |
| 3 | ft (Telephoto) | 18.595 | 18.599 | 18.598 |
| 4 | half angle of field (Wide angle) with DT | 35.0 | 35.0 | 35.0 |
| 5 | half angle of field (Inter mediate) with DT | 19.6 | 19.1 | 20.4 |
| 6 | half angle of field (Telephoto) with DT | 11.3 | 11.0 | 12.0 |
| 7 | γ(=ft/fw) | 2.990 | 2.999 | 2.994 |
| 8 | y10 | 3.82 | 3.82 | 3.82 |
| 9 | 1/ν2 − 1/ν1 | *** | 0.02482 | 0.02482 |
| 10 | 1/ν2 − /ν13 | 0.04533 | *** | *** |
| 11 | 1/ν13 | 55.69 | 55.69 | 55.69 |
| 12 | ν2/ν1 | *** | 0.41982 | 0.41982 |

-continued

| | | | | |
|---|---|---|---|---|
| 13 | $v2/v13$ | 0.28371 | *** | *** |
| 14 | $Tv2/Tv1$ | *** | 0.75417 | 0.75417 |
| 15 | $Tv2/Tv13$ | 0.97496 | *** | *** |
| 16 | $n2 - n1$ | 0.23219 | 0.10316 | 0.10316 |
| 17 | $n2 - n3$ | 0.23219 | *** | *** |
| 18 | $\theta gF$ | 0.7070 | 0.6684 | 0.6684 |
| 19 | $\theta hg$ | 0.7089 | 0.6351 | 0.6351 |
| 20 | $\beta gF$ | 0.7487 | 0.7301 | 0.7301 |
| 21 | $\beta hg$ | 0.7702 | 0.7258 | 0.7258 |
| 22 | $\log(\phi 3/\phi 1)$ | −1.20658 | *** | *** |
| 23 | m | 2.5 | 2.5 | 2.5 |
| 24 | $a = (y10)2 \times \log10\gamma/fw$ | 1.1159 | 1.1224 | 1.1187 |
| 25 | $h = m \times a$ | 2.7898 | 2.8060 | 2.7968 |
| 26 | $z2(h)$ | 0.02185 | 0.29693 | 0.29936 |
| 27 | $\Delta z3(h)$ | 0.15147 | 0.14607 | 0.16074 |
| 28 | $|z2(h) - z3(h)|$ | 0.12962 | 0.15086 | 0.13862 |
| 29 | $\Delta z2(h)$ | −0.00000 | 0.01369 | −0.02774 |
| 30 | $\Delta z3(h)$ | −0.00754 | −0.02372 | −0.01477 |
| 31 | $\Delta z2(h) \times \{(1/v1) - (1/v2)\}$ | −0.00000 | −0.33979e-3 | 0.68851e-3 |
| 32 | $\Delta z3(h) \times \{(1/v2) - (1/v3)\}$ | −0.34179e-3 | −1.01454e-3 | −0.63175e-3 |
| 33 | P | −0.34179e-3 | −1.35433e-3 | 0.05676e-3 |
| 34 | $\phi$ | −0.010185 | −0.039854 | −0.041970 |
| 35 | $P \times \phi$ | 0.03481e-4 | 0.5396e-4 | −0.0238e-4 |
| 36 | t2 | 0.35 | 0.6 | 0.6 |
| 37 | $|z2(h) - z3(h)|/t2$ | 0.37034 | 0.25143 | 0.23103 |
| 38 | nBn1 | *** | *** | *** |
| 39 | nBn1 − nBp | *** | *** | *** |
| 40 | $\phi Bn2/\phi Bn1$ | *** | *** | *** |
| 41 | $\Delta z1(h)$ | 0.06235 | −0.03093 | −0.01025 |
| 42 | $\Delta z4(h)$ | −0.05341 | *** | *** |
| 43 | $\{\Delta z1(h) - \Delta z4(h)\}/(fw \times \tan\omega 10w)$ | 0.026579 | *** | *** |
| 44 | $\{\Delta z1(h) - \Delta z3(h)\}/(fw \times \tan\omega 10w)$ | *** | −1.66053e-3 | 1.03915e-3 |

Thus, it is possible to use such image forming optical system of the present invention in a photographic apparatus in which an image of an object is photographed by an electronic image pickup element such as a CCD and a CMOS, particularly a digital camera and a video camera, a personal computer, a telephone, and a portable terminal which are examples of an information processing unit, particularly a portable telephone which is easy to carry. Embodiments thereof will be exemplified below.

Figure 37:
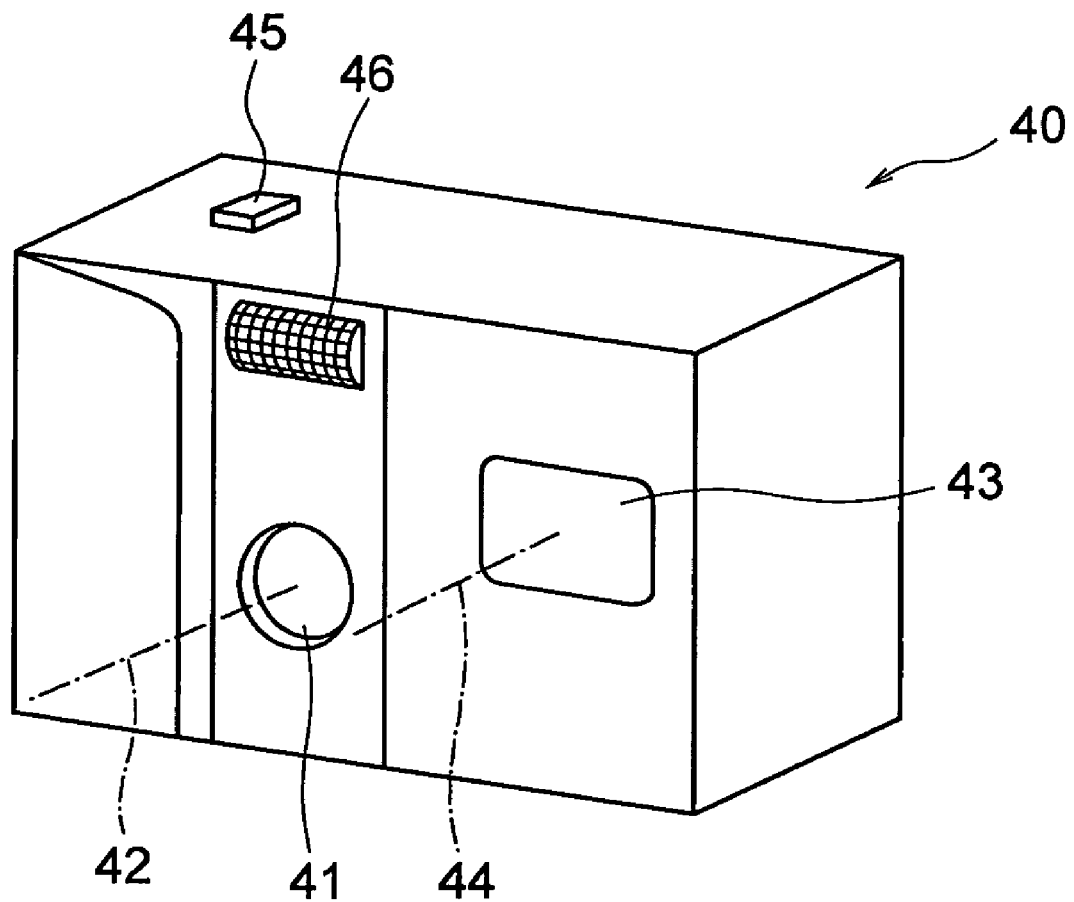
FIG. 37 is a front perspective view showing an appearance of a digital camera 40 in which, a zoom lens according to the present invention is incorporated.
Figure 38:
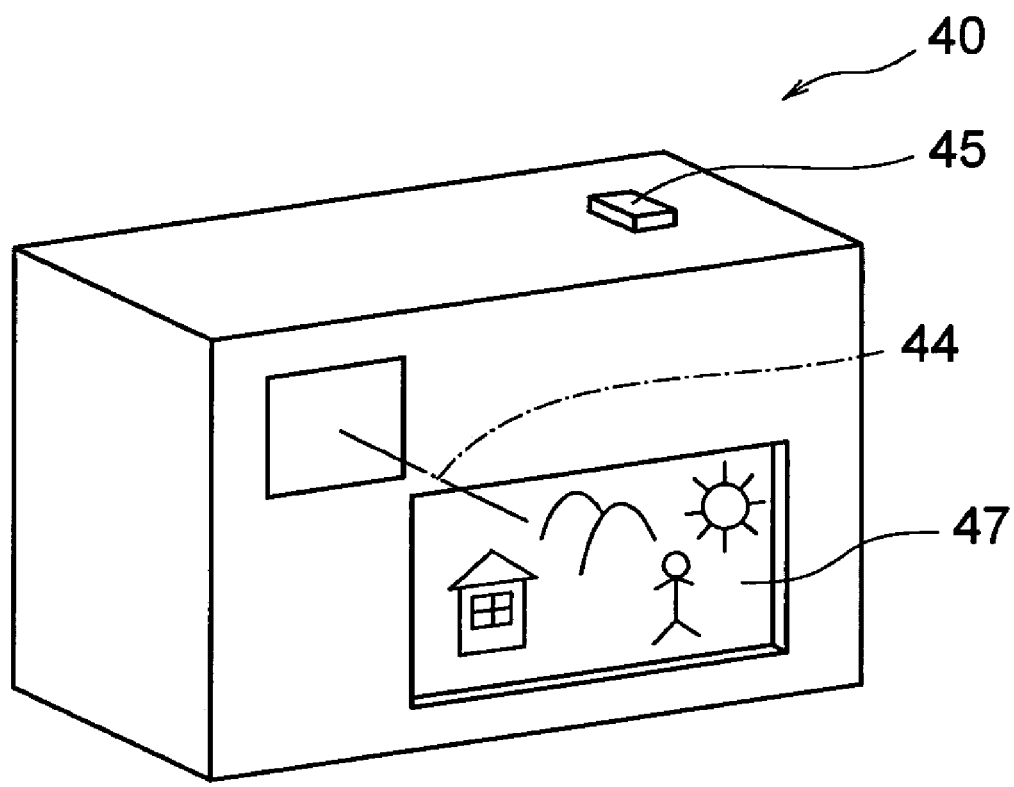
FIG. 38 is a rear perspective view of the digital camera 40.
Figure 39:
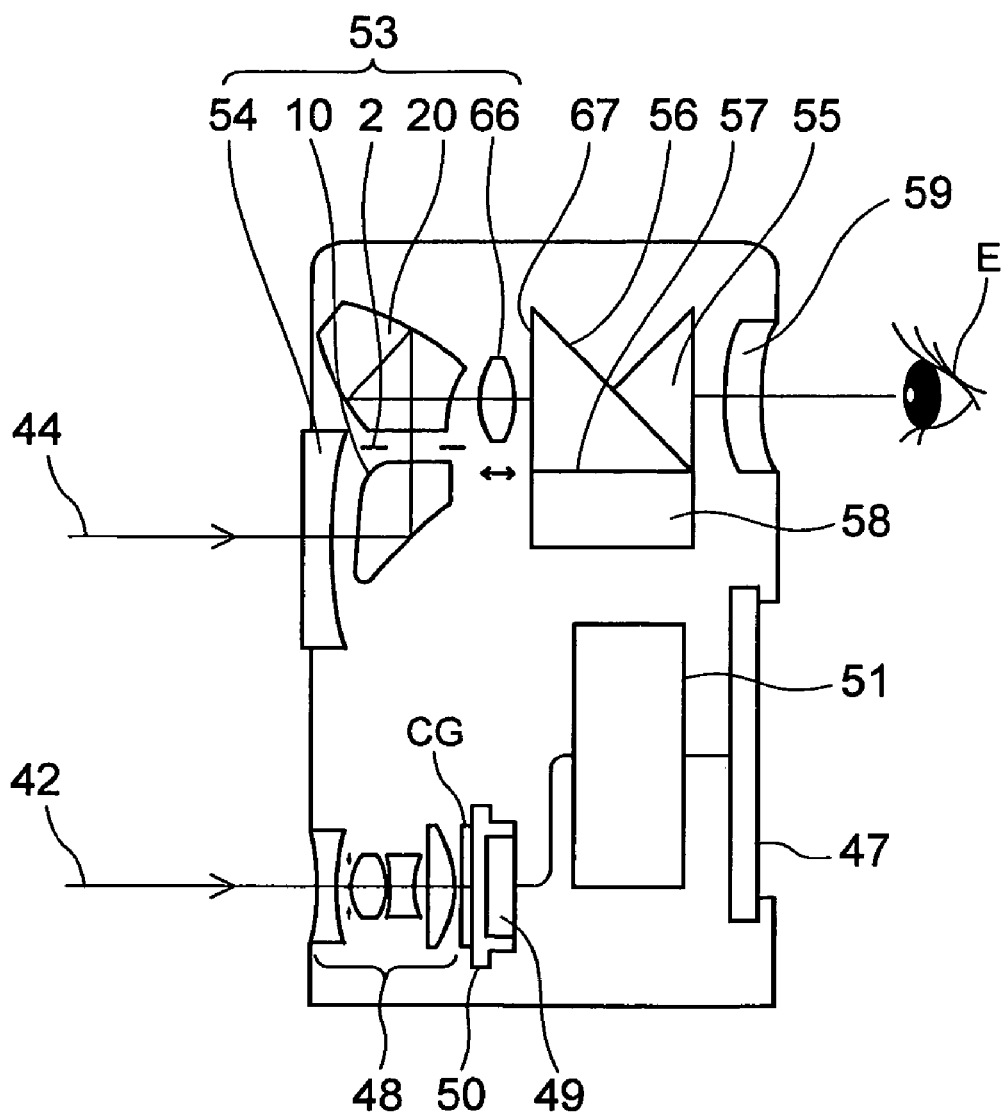
FIG. 39 is a cross-sectional view showing an optical arrangement of the digital camera 40.

In FIG. 37 to FIG. 39 show conceptual diagrams of structures in which the image forming optical system according to the present invention is incorporated in a photographic optical system 41 of a digital camera. FIG. 37 is a frontward perspective view showing an appearance of a digital camera 40, FIG. 38 is a rearward perspective view of the same, and FIG. 39 is a cross-sectional view showing an optical arrangement of the digital camera 40.

The digital camera 40, in a case of this example, includes the photographic optical system 41 (an objective optical system for photography 48) having an optical path for photography 42, a finder optical system 43 having an optical path for finder 44, a shutter 45, a flash 46, and a liquid-crystal display monitor 47. Moreover, when the shutter 45 disposed at an upper portion of the camera 40 is pressed, in conjugation with this, a photograph is taken through the photographic optical system 41 (objective optical system for photography 48) such as the zoom lens in the first embodiment.

An object image formed by the photographic optical system 41 (photographic objective optical system 48) is formed on an image pickup surface 50 of a CCD 49. The object image photoreceived at the CCD 49 is displayed on the liquid-crystal display monitor 47 which is provided on a camera rear surface as an electronic image, via an image processing means 51. Moreover, a memory etc. is disposed in the image processing means 51, and it is possible to record the electronic image photographed. This memory may be provided separately from the image processing means 51, or may be formed by carrying out by writing by recording (recorded writing) electronically by a floppy (registered trademark) disc, memory card, or an MO etc.

Furthermore, an objective optical system for finder 53 is disposed in the optical path for finder 44. This objective optical system for finder 53 includes a cover lens 54, a first prism 10, an aperture stop 2, a second prism 20, and a lens for focusing 66. An object image is formed on an image forming surface 67 by this objective optical system for finder 53. This object image is formed in a field frame of a Porro prism which is an image erecting member equipped with a first reflecting surface 56 and a second reflecting surface 58. On a rear side of this Porro prism, an eyepiece optical system 59 which guides an image formed as an erected normal image is disposed.

By the digital camera 40 structured in such manner, it is possible to realize an optical image pickup apparatus having a zoom lens with a reduced size and thickness, in which the number of structural components is reduced.

Figure 40:
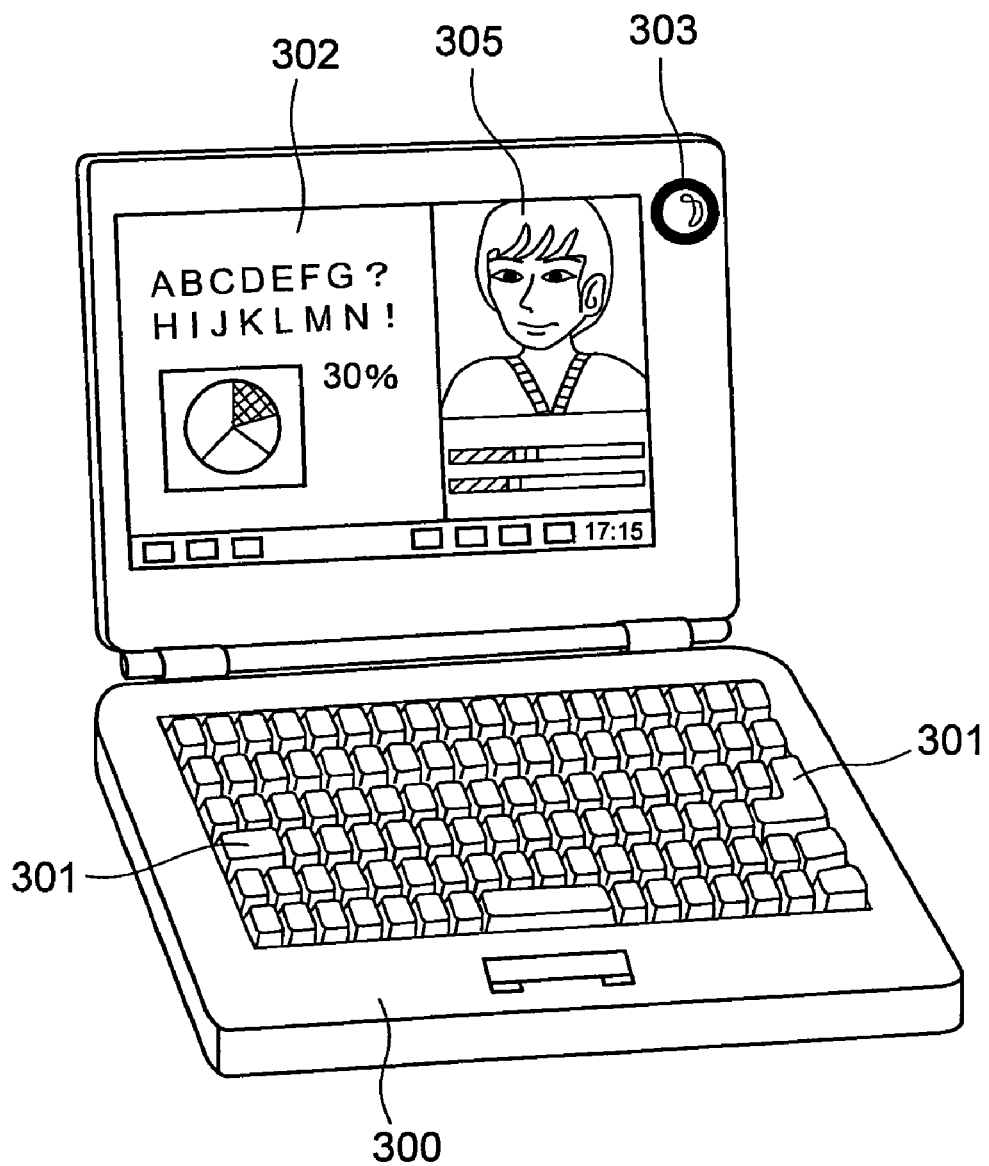
FIG. 40 is a front perspective view of a state in which, a cover of a personal computer 300 which is an example of an information processing unit in which, the zoom lens of the present invention is built-in as an objective optical system, is opened.
Figure 41:
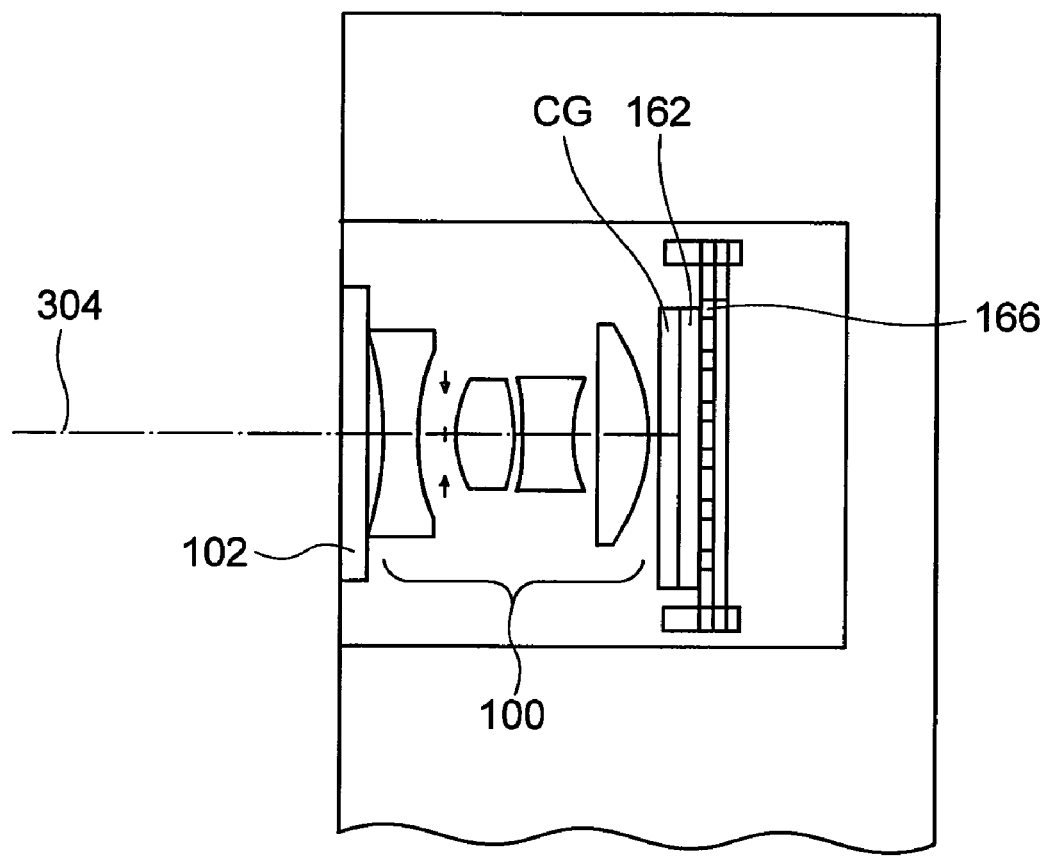
FIG. 41 is a cross-sectional view of a photographic optical system 303 of the personal computer 300.
Figure 42:
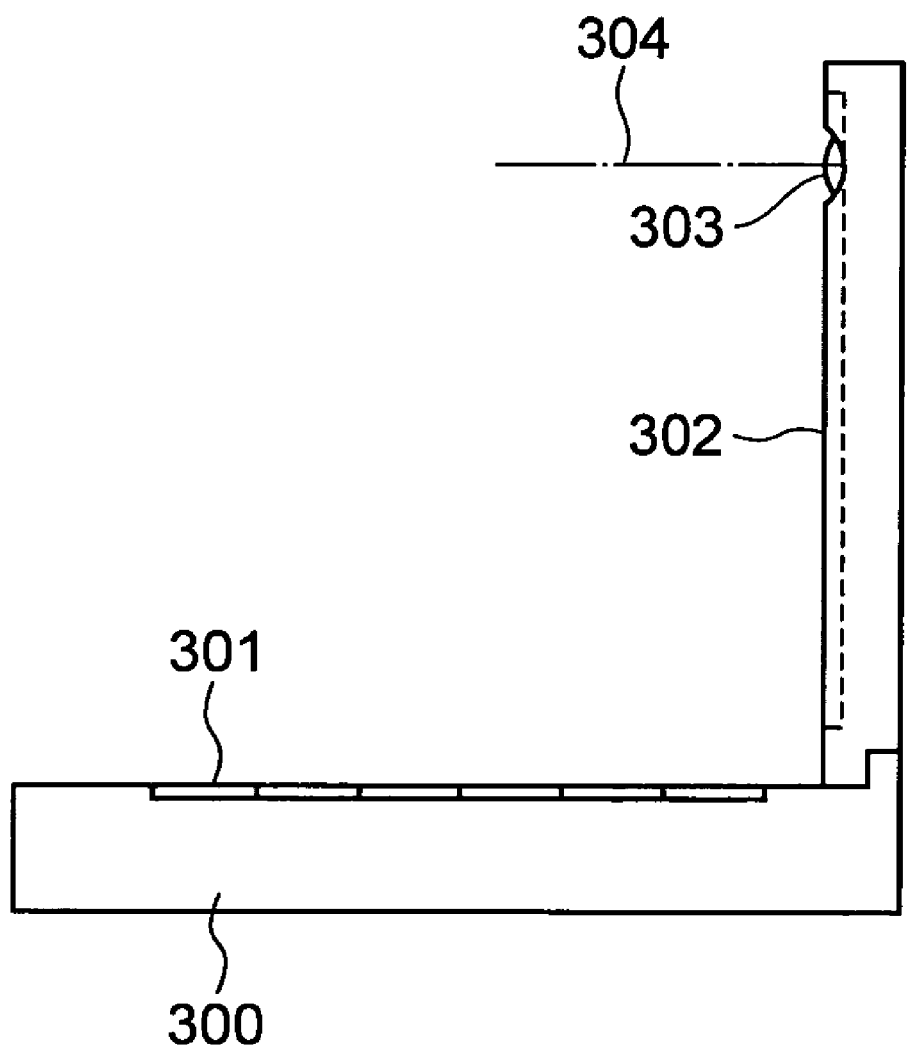
FIG. 42 is a side view of the personal computer 300.

Next, a personal computer which is an example of an information processing apparatus with a built-in image forming system as an objective optical system is shown in FIG. 40 to FIG. 42. FIG. 40 is a frontward perspective view of a personal computer 300 with its cover opened, FIG. 41 is a cross-sectional view of a photographic optical system 303 of the personal computer 300, and FIG. 42 is a side view of FIG. 40. As it is shown in FIG. 80 to FIG. 82, the personal computer 300 has a keyboard 301, an information processing means and a recording means, a monitor 302, and a photographic optical system 303.

Here, the keyboard 301 is for an operator to input information from an outside. The information processing means and the recording means are omitted in the diagram. The monitor 302 is for displaying the information to the operator. The photographic optical system 303 is for photographing an image of the operator or a surrounding. The monitor 302 may be a display such as a liquid-crystal display or a CRT display.

As the liquid-crystal display, a transmission liquid-crystal display device which illuminates from a rear surface by a backlight not shown in the diagram, and a reflection liquid-crystal display device which displays by reflecting light from a front surface are available. Moreover, in the diagram, the photographic optical system 303 is built-in at a right side of the monitor 302, but without restricting to this location, the photographic optical system 303 may be anywhere around the monitor 302 and the keyboard 301.

This photographic optical system 303 has an objective optical system 100 which includes the zoom lens in the first embodiment for example, and an electronic image pickup element chip 162 which receives an image. These are built into the personal computer 300.

At a front end of a mirror frame, a cover glass 102 for protecting the objective optical system 100 is disposed.

An object image received at the electronic image pickup element chip 162 is input to a processing means of the personal computer 300 via a terminal 166. Further, the object image is displayed as an electronic image on the monitor 302. In FIG. 40, an image 305 photographed by the user is displayed as an example of the electronic image. Moreover, it is also possible to display the image 305 on a personal computer of a communication counterpart from a remote location via a processing means. For transmitting the image to the remote location, the Internet and telephone are used.

Figure 43A:
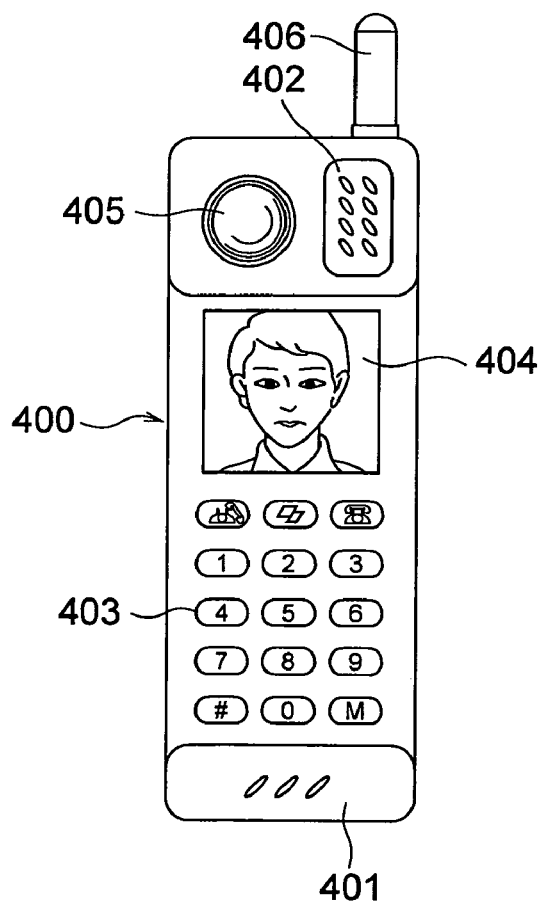
FIG. 43A, FIG. 43B, and FIG. 43C are diagrams showing a mobile telephone which is an example of an information processing apparatus in which, the zoom lens of the present invention is incorporated as a photographic optical system, where.
Figure 43B:
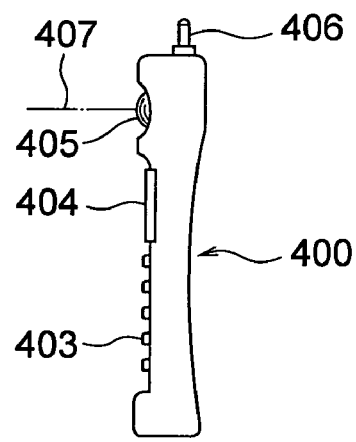
Figure 43C:
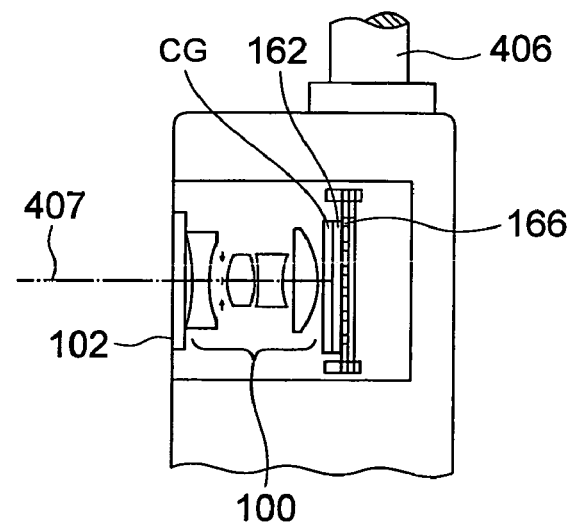

Next, a telephone which is an example of an information processing apparatus in which the image forming optical system of the present invention is built-in as a photographic optical system, particularly a portable telephone which is easy to carry is shown in FIG. 43A, FIG. 43B, and FIG. 43C. FIG. 43A is a front view of a portable telephone 400, FIG. 43B is a side view of the portable telephone 400, and FIG. 43C is a cross-sectional view of a photographic optical system 405. As shown in FIG. 83A to FIG. 83C, the portable telephone 400 includes a microphone section 401, a speaker section 402, an input dial 403, a monitor 404, the photographic optical system 405, an antenna 406, and a processing means.

Here, the microphone section 401 is for inputting a voice of the operator as information. The speaker section 402 is for outputting a voice of the communication counterpart. The input dial 403 is for the operator to input information. The monitor 404 is for displaying a photographic image of the operator himself and the communication counterpart, and information such as a telephone number. The antenna 406 is for carrying out a transmission and a reception of communication electric waves. The processing means (not shown in the diagram) is for carrying out processing of image information, communication information, and input signal etc.

Here, the monitor 404 is a liquid-crystal display device. Moreover, in the diagram, a position of disposing each structural element is not restricted in particular to a position in the diagram. This photographic optical system 405 has an objective optical system 100 which is disposed in a photographic optical path 407 and an image pickup element chip 162 which receives an object image. As the objective optical system 100, the zoom lens in the first embodiment for example, is used.

These are built into the portable telephone 400. At a front end of a mirror frame, a cover glass 102 for protecting the objective optical system 100 is disposed.

An object image received at the electronic image pickup element chip 162 is input to an image processing means which is not shown in the diagram, via a terminal 166. Further, the object image finally displayed as an electronic image on the monitor 404 or a monitor of the communication counterpart, or both. Moreover, a signal processing function is included in the processing means. In a case of transmitting an image to the communication counterpart, according to this function, information of the object image received at the electronic image pickup element chip 162 is converted to a signal which can be transmitted.

Various modifications can be made to the present invention without departing from its essence.

As it has been described above, the lens component, the image forming optical system, and the electronic image pickup apparatus according to the present invention are useful for realizing specification such as small-sizing, thinning, weight reduction and cost reduction, and for securing optical performance which sufficiently can withstand increase in the number of pixels.

According to the present invention, there can be provided a lens component for realizing an optical system in which various aberrations are corrected favorably even when functional specifications of the optical system become high, and an image forming optical system and an electronic image pickup apparatus having such lens component.

What is claimed is:

1. A lens component which is a cemented lens comprising:
a lens LA; and
a lens LB, wherein
an absolute value of a refracting power of the lens LB is smaller than an absolute value of a refracting power of the lens LA, and the lens component satisfies the following conditional expressions (1) and (3)

$$0.01 \leq 1/v2 - 1/v1 \leq 0.06 \quad (1)$$

$$0.5 \times v2/v1 < Tv2/Tv1 < 10 \times v2/v1 \quad (3)$$

where,
v1 denotes Abbe's number (nd1−1)/(nF1−nC1) of the lens LA,
v2 denotes Abbe's number (nd2−1)/(nF2−nC2) of the lens LB,
nd1, nC1, nF1, and ng1 denote refractive indices of the lens LA for a d-line, a C-line, an F-line, and a g-line respectively,
nd2, nC2, nF2, and ng2 denote refractive indices of the lens LB for the d-line, the c-line, the F-line, and the g-line respectively,
Tv1 denotes a reciprocal of a temperature dispersion of the lens LA,
Tv2 is a reciprocal of a temperature dispersion of the lens LB, and
a reciprocal Tvd of the temperature dispersion is expressed by the following expression $$Tvd = (nd20 - 1)/(nd00 - nd40)$$

where,
nd00 is a refractive index of the d-line of a lens medium at 0° C.,
nd20 is a refractive index of the d-line of the lens medium at 20° C., and
nd40 is a refractive index of the d-line of the lens medium at 40° C.

2. The lens component according to claim 1, wherein a cemented surface of the cemented lens is an aspheric surface, and satisfies the following conditional expression (5)

$$-0.05 < n2 - n1 < 0.3 \quad (5)$$

where,
n1 denotes a refractive index of the lens LA for the d-line, and
n2 denotes a refractive index of the lens LB for the d-line.

3. The lens component according to claim 1, further comprising:
a lens LC, wherein
in the cemented lens, the lens LA, the lens LB, and the lens LC are cemented in order of the lens LA, the lens LB, and the lens LC, and satisfies the following conditional expression (2) and (4)

$$0.01 \leq 1/v2 - 1/v13 \leq 0.06 \quad (2)$$

$$0.5 \times v2/v13 < Tv2/Tv13 < 10 \times v2/v13 \quad (4)$$

where,
v3 denotes Abbe's number $(nd3-1)/(nF3-nC3)$ of the lens LC for the d-line as a base line,
nd3, nC3, nF3, and ng3 denote refractive indices of the lens LC for the d-line, the C-line, the F-line, and the g-line respectively,
v13 denotes a harmonic mean value of Abbe's number v1 and Abbe's number v3,
Tv3 denotes a reciprocal of a temperature dispersion of the lens LC, and Tv13 denotes a harmonic mean value of Tv1 and Tv3.

4. The lens component according to claim 3, wherein a cemented surface of the cemented lens is an aspheric surface, and satisfies the following conditional expressions (5) and (6)

$$-0.05 < n2 - n1 < 0.3 \quad (5)$$

$$-0.05 < n2 - n3 < 0.3 \quad (6).$$

5. The lens component according to claim 1, wherein when a straight line indicated by $$\theta gF = \alpha gF \times v2 + \beta gF$$

is set in an orthogonal coordinate system in which, a horizontal axis is let to be vd and a vertical axis is let to be θgF,
θgF and v2 of the lens LB are included in both areas namely, an area which is determined by a straight line when θgF and v2 of the lens LB are lower limit values of a range in the following conditional expression (7) and a straight line when θgF and v2 of the lens LB are upper limit values of the range in the following conditional expression (7), and an area which is determined by the following conditional expression (8)

$$0.7000 < \beta gF < 0.8000 \quad (7)$$

$$3 \leq v2 \leq 27 \quad (8)$$

where,
αgF=−0.00264, and
θgF is a partial dispersion ratio $(ng2-nF2)/(nF2-nC2)$ of the lens LB.

6. The lens component according to claim 1, wherein when a straight line indicated by $$\theta hg = \alpha hg \times v2 + \beta hg$$

is set in an orthogonal coordinate system in which, a horizontal axis is let to be vd and a vertical axis is let to be θhg,
θhg and v2 of the lens LB are included in both areas namely, an area which is determined by a straight line when θhg and v2 of the lens LB are lower limit values of a range in the following conditional expression (9) and a straight line when θhg and v2 of the lens LB are upper limit values of the range in the following conditional expression (9), and an area which is determined by the following conditional expression (8)

$$0.6900 < \beta hg < 0.8200 \quad (9)$$

$$3 \leq v2 \leq 27 \quad (8)$$

where,
αhg=−0.00388,
θhg is a partial dispersion ratio $(nh2-ng2)/(nF2-nC2)$ of the lens LB, and
nh2 is a refractive index of the lens LB at an h-line.

7. The lens component according to claim 1, wherein the lens LA and the lens LB have a refracting power of mutually opposite signs.

8. The lens component according to claim 1, wherein the lens LA and the lens LB have a refracting power of the same sign.

9. The lens component according to claim 3, wherein the lens LC and the lens LA have a refracting power of the same sign, and satisfy the following conditional expression (10)

$$-2.0 < \log(\phi 3/\phi 1) < 0 \quad (10)$$

where,
φ1 denotes the refracting power of the lens LA, and
φ3 denotes the refracting power of the lens LC.

10. An image forming optical system comprising in order from an object side:
a lens group B having a negative refracting power;
a lens group C having a positive refracting power; and
one or two more lens groups additionally, wherein
the lens group C moves only toward the object side at the time of zooming from a wide angle end to a telephoto end, and
a lens component which is according to claim 1 is used in the lens group B.

11. The image forming optical system according to claim 10, wherein the lens group B includes only the lens component.

12. The image forming optical system according to claim 10, wherein the lens component is used in a negative lens component Bn2 which is second from the object side, of the lens group B.

13. The image forming optical system according to claim 10, wherein the lens group A is on the object side than the lens group B.

14. The image forming optical system according to claim 13, wherein the lens group A has a negative lens and a reflecting optical element for folding an optical path, in order from the object side, along a direction of traveling of light.

15. An image forming optical system comprising in order from an object side:
a lens group A having a positive refracting power;
a lens group B having a negative refracting power;
a lens group C having a positive refracting power and which moves only toward the object side at the time of zooming from a wide angle end to a telephoto end; and
one or two more lens groups, wherein
a lens component which is according to claim 1 is used for a second negative lens component Bn2 from the object side, of the lens group B.

16. The image forming optical system according to claim 10, comprising:
a negative lens component Bn1 which is first from the object side, of the lens group B, and which satisfies the following conditional expression (17)

$$1.85 < nBn1 < 2.35 \quad (17)$$

where,
nBn1 denotes a refractive index for a d-line of the negative lens component Bn1.

17. The image forming optical system according to claim 10, comprising:
a negative lens component Bn1 which is first from the object side, of the lens group B; and
a positive lens component Bp which is disposed toward an image side of the negative lens component Bn2, wherein the following conditional expression is satisfied $$-0.10 < nBn1 - nBp < 0.40 \quad (18)$$

where,
nB1 denotes a refractive index for d-line of the negative lens component Bn1, and
nBp denotes a refractive index for d-line of the positive lens component Bp.

18. The image forming optical system according to claim 10, comprising:
a negative lens component Bn1 which is first from the object side of the lens group B; and
a negative lens component Bn2, wherein
the following conditional expression (19) is satisfied $$0.05 < \phi Bn2/\phi Bn1 < 0.80 \quad (19)$$

where,
$\phi Bn1$ denotes a refracting power of the negative lens component Bn1, and
$\phi Bn2$ denotes a refracting power of the negative lens component Bn2.

19. The image forming optical system according to claim 10, wherein the image forming optical system satisfies the following conditional expression (20)

$$-0.05 < (\Delta z_1(h) - \Delta z_4(h))/(fw \cdot \tan \omega_{10w}) < 0.08 \quad (20)$$

where,
$z_1$ denotes a shape of an air-contact surface I of the lens LA, and is a shape according to conditional expression (11) when a paraxial radius of curvature R is let to be $R_1$,
$\Delta z_1$ denotes an aspheric surface component of the air-contact surface I of the lens LA, and is a component according to conditional expression (12) when the paraxial radius of curvature R is let to be $R_1$,
$z_4$ denotes a shape of an air-contact surface IV of the lens LC, and is a shape according to conditional expression (11) when the paraxial radius of curvature R is let to be $R_4$,
$\Delta z_4$ denotes an aspheric surface component of the air-contact surface IV of the lens LC, and is a component according to conditional expression (12) when the paraxial radius of curvature R is let to be $R_4$,
$\omega_{10w}$ denotes a maximum angle of field at the wide angle end,
fw denotes a focal length of the overall system at the wide angle end, of the image forming optical system, and
when the lens LC is not there, $z_3$ which denotes a shape of an air-contact surface III of the lens LB, $\Delta z_3$, and $R_3$ are to be used instead of $z_4$ which denote the shape of the air-contact surface IV of the lens LC, and $\Delta z_4$ and $R_4$.

20. An electronic image pickup apparatus comprising:
an image forming optical system according to claim 10; and
an electronic image pickup element which picks up an image which has been formed through the image forming optical system.

21. The electronic image pickup apparatus according to claim 20, comprising:
a lens LC, wherein
a cemented surface II is formed by the lens LA and the lens LB, and
a cemented surface III is formed by the lens LB and the lens LC, and
when coordinate axes are let to be such that, an optical axial direction is let to be z and a direction perpendicular to the optical axis is let to be h, R is let to be a radius of curvature on the optical axis of an aspheric surface component, k is let to be a conical constant, and A4, A6, A8, A10, . . . are let to be aspheric surface coefficients,
when a shape of the aspheric surface is expressed by the following expression (11)

$$z = h^2/R/[1+\{1-(1+k)h^2/R^2\}^{1/2}] + A_4 h^4 + A_6 h^6 + A_8 h^8 + + A_{10} h^{10} + \ldots \quad (11) \text{ and}$$

when an amount of deviation is expressed by the following expression (12), $$\Delta z = z - h^2/R/[1+\{1-h^2/R^2\}^{1/2}] \quad (12)$$

the following conditional expression (14) is satisfied $$-5.0e-4 < P \cdot \phi < 5.0e-4 \quad (14)$$

where,
P denotes a parameter related to a dispersion and the aspheric surface of the cemented surface II, and is expressed by the following expression (13)

$$P = \Delta z_2(h) \cdot \{(1/v1) - (1/v2)\} + \Delta z_3(h) \cdot \{(1/v2) - (1/v3)\} \quad (13)$$

where,
$R_2$ denotes a paraxial radius of curvature of the cemented surface II,
$R_3$ denotes a paraxial radius of curvature of the cemented surface III,
$z_2$ denotes a shape of the cemented surface II, and is according to expression (11),
$\Delta z_2$ denotes an aspheric surface component of the cemented surface II, and is a component according to expression (12),
$z_3$ denotes a shape of the cemented surface III, and is according to expression (11), and
$\Delta z_3$ denotes an aspheric surface component of the cemented lens III, and is a component according to expression (12), and
when 1/v3 is let to be 0 (1/v3=0) when the lens LC is not there, $$h = m \cdot a$$

where,
$\phi$ is a refracting power of the lens component,
m=1 only when the lens group A is on the object side of the lens group B,
m=1.4 when has a prism for folding an optical path to the lens group A, and
m=2.5 in rest of the cases, and
the lens group A is a lens group having a focal length shorter than a focal length of the overall system at the telephoto end, and a is an amount according to the following expression (15)

$$a = (y_{10})^2 \cdot \log_{10} \gamma / fw \quad (15)$$

where,
$y_{10}$ denotes a distance from a center up to the farthest point in an effective image pickup surface of the electronic image pickup element which is disposed near an image forming position of the image forming optical system, fw denotes a focal length of the overall system at the wide angle end of the image forming optical system, and γ denotes a zoom ratio (a focal length of the overall system at the telephoto end/a focal length of the overall system at the wide angle end), and for letting an apex of each surface (plane) to be an origin, z(0) is 0 all the time (z(0)=0).

22. The electronic image pickup apparatus according to claim 20, comprising:

a lens LC, wherein a cemented surface II is formed by the lens LA and the lens LB, and a cemented surface III is formed by the lens LB and the lens LC, and when coordinate axes are let to be such that, an optical axial direction is let to be z and a direction perpendicular to the optical axis is let to be h, R is let to be a radius of curvature on the optical axis of an aspheric surface component, k is let to be a conical constant, and A4, A6, A8, A10, . . . are let to be aspheric surface coefficients, when a shape of the aspheric surface is expressed by the following expression (11)

$$z = h^2/R[1+\{1-(1+k)h^2/R^2\}^{1/2}] + A_4 h^4 + A_6 h^6 + A_8 h^8 + A_{10} h^{10} + \quad (11)$$

and the following conditional expression (16) is satisfied $$0.05 \leq |z_2(h) - z_3(h)|/t_2 \leq 0.95 \quad (16)$$

where, $z_2$ denotes a shape of the cemented surface II, and is according to expression (11), $z_3$ denotes a shape of the cemented surface III or a shape of an air-contact surface of the lens LB, and is according to expression (11), $t_2$ denotes an optical axial thickness of the lens LB, and $$h = m \cdot a$$

where, m=1 only when the lens group A is on the object side of the lens group B, m=1.4 when has a prism for folding an optical path to the lens group A, and m=2. in rest of the cases, and the lens group A is a lens group having a focal length shorter than a focal length of the overall system at the telephoto end, and a is an amount according to the following expression (15)

$$a = (y_{10})^2 \cdot \log_{10} \gamma / fw \quad (15)$$

where, $y_{10}$ denotes a distance from a center up to the farthest point in an effective image pickup surface of the electronic image pickup element which is disposed near an image forming position of the image forming optical system, fw denotes a focal length of the overall system at the wide angle end of the image forming optical system, and γ denotes a zoom ratio (a focal length of the overall system at the telephoto end/a focal length of the overall system at the wide angle end), and for letting an apex of each surface (plane) to be an origin, z(0) is let to be 0 all the time (z(0)=0).

23. An electronic image pickup apparatus comprising:

an image forming optical system according to claim 10;

an image pickup element; and an image processing means which outputs data as image data in which, a shape of the image has been changed by processing image data obtained by picking up an image by the electronic image pickup element, which has been formed through the image forming optical system, wherein the image forming optical system satisfies the following conditional expression (A) at the time of infinite object point focusing $$0.7 < y_{07}/(fw \cdot \tan \omega_{07w}) < 0.97 \quad (A)$$

where, $y_{07}$ is expressed as $y_{07} = 0.7 \cdot y_{10}$ when a distance from a center up to the farthest point in an effective image pickup surface of the electronic image pickup element is let to be $y_{10}$, $\omega_{07w}$ denotes an angle with an optical axis in a direction of object point corresponding to an image point connecting to a position of $y_{07}$ from a center on the image pickup surface at the wide angle end, and fw denotes a focal length of the overall image forming optical system at the wide angle end.

* * * * *